(12) United States Patent
Kim et al.

(10) Patent No.: US 9,215,306 B2
(45) Date of Patent: Dec. 15, 2015

(54) MOBILE TERMINAL AND DISPLAY CONTROL METHOD THEREOF

(75) Inventors: Jong-Hwan Kim, Suwon (KR); Nam-Yong Park, Uiwang (KR)

(73) Assignee: LG ELECTRONICS INC., Seoul (KR)

(*) Notice: Subject to any disclaimer, the term of this patent is extended or adjusted under 35 U.S.C. 154(b) by 319 days.

(21) Appl. No.: 12/354,028

(22) Filed: Jan. 15, 2009

(65) Prior Publication Data

US 2009/0298547 A1 Dec. 3, 2009

(30) Foreign Application Priority Data

May 29, 2008 (KR) .................. 10-2008-0050460
Jun. 3, 2008 (KR) .................. 10-2008-0052331

(51) Int. Cl.
*H04M 3/42* (2006.01)
*H04M 1/00* (2006.01)
(Continued)

(52) U.S. Cl.
CPC .......... *H04M 1/72522* (2013.01); *G06F 1/162* (2013.01); *G06F 1/163* (2013.01);
(Continued)

(58) Field of Classification Search
CPC .............. H04M 2250/16; H04M 2250/22; H04M 2250/52; H04M 1/22; H04M 1/72519; H04M 1/0266; H04M 1/576; H04M 1/72522; H04M 1/72544; H04M 1/0247; H04M 1/72583; H04M 1/0214; H04M 1/0245; H04M 1/7258; G09G 3/3413; G09G 5/02; G09G 2300/023; G09G 2320/0626; G09G 2320/0666; G09G 2320/08; G09G 2320/103; G09G 2360/144; G09G 2360/04; G09G 2360/145; G09G 3/3225; G09G 3/3406; G09G 3/03; G09G 3/3611; H04W 52/027; G06F 1/1616; G06F 1/1622; G06F 1/1624; G06F 1/1626; G06F 1/1632; G06F 1/16; G06F 1/162; G06F 1/163; G06F 3/0481; G06F 3/0482; G06F 3/0486; G06F 1/1637; G06F 1/1641; G06F 1/1643; G06F 1/1647; G06F 1/1649; G06F 3/0317; G06F 3/04882; G06F 3/04883; G06F 1/1677; G06F 1/1686; G06F 1/3203; G06F 1/3265; G06F 2203/04804; H01L 27/3211; H01L 27/3234; H01L 27/3267; H01L 27/322; H04N 13/0468; H04N 13/0495; H04N 7/142; H04N 7/147; H04N 13/049; G02F 1/13338
USPC .............. 455/41.3, 145, 154.2, 158.4, 158.5, 455/405, 414.4, 550.1, 566, 574; 345/4, 20, 345/42, 48, 63, 77, 84–90, 102, 159, 169, 345/173, 204–207, 690, 211–215; 715/841, 715/843; 348/655, 673; 349/109, 114; 353/20, 38; 701/211
See application file for complete search history.

(56) References Cited

U.S. PATENT DOCUMENTS 5,160,920 A 11/1992 Harris
5,469,185 A 11/1995 Lebby et al.
(Continued)

FOREIGN PATENT DOCUMENTS

CN 1247675 A 3/2000
CN 1295316 A 5/2001
(Continued)

*Primary Examiner* — Yuwen Pan
*Assistant Examiner* — Paul P Tran
(74) *Attorney, Agent, or Firm* — Birch, Stewart, Kolasch & Birch, LLP

(57) ABSTRACT

A mobile terminal including a transparent display, a sensing unit configured to detect a surrounding environment of the transparent display, and a controller configured to change a transparency of at least one of a background and an object displayed on the transparent display according to the sensed surrounding environment.

18 Claims, 72 Drawing Sheets

(51) Int. Cl.

| | | |
|---|---|---|
| *G09G 3/36* | (2006.01) | |
| *G09G 5/00* | (2006.01) | |
| *G06F 3/02* | (2006.01) | |
| *H04N 7/14* | (2006.01) | |
| *H04N 5/222* | (2006.01) | |
| *G02F 1/1335* | (2006.01) | |
| *C09K 19/02* | (2006.01) | |
| *G06F 3/048* | (2013.01) | |
| *H04M 1/725* | (2006.01) | |
| *G06F 1/16* | (2006.01) | |
| *G06F 3/0481* | (2013.01) | |
| *H04W 52/02* | (2009.01) | |
| *G02F 1/133* | (2006.01) | |
| *G02F 1/1333* | (2006.01) | |
| *G09G 3/34* | (2006.01) | |
| *H04M 1/02* | (2006.01) | |

(52) U.S. Cl.
CPC ............ *G06F 1/1622* (2013.01); *G06F 1/1624* (2013.01); *G06F 1/1626* (2013.01); *G06F 1/1637* (2013.01); *G06F 1/1643* (2013.01); *G06F 3/0481* (2013.01); *H04W 52/027* (2013.01); *G02F 1/13318* (2013.01); *G02F 1/13338* (2013.01); *G06F 2203/04804* (2013.01); *G09G 3/3406* (2013.01); *G09G 2360/145* (2013.01); *H04M 1/0208* (2013.01); *H04M 1/0214* (2013.01); *H04M 1/0233* (2013.01); *H04M 1/0247* (2013.01); *H04M 1/72544* (2013.01)

(56) References Cited

U.S. PATENT DOCUMENTS

| | | | |
|---|---|---|---|
| 5,798,744 A | | 8/1998 | Tanaka et al. |
| 5,801,758 A | | 9/1998 | Heirich |
| 5,896,575 A | | 4/1999 | Higginbotham et al. |
| 6,132,048 A | | 10/2000 | Gao et al. |
| 6,327,482 B1 | | 12/2001 | Miyashita |
| 6,456,323 B1 | * | 9/2002 | Mancuso et al. ............ 348/218.1 |
| 6,466,202 B1 | * | 10/2002 | Suso et al. .................... 345/169 |
| 6,662,244 B1 | | 12/2003 | Takahashi |
| 6,753,842 B1 | * | 6/2004 | Williams et al. ............. 345/102 |
| 6,998,772 B2 | | 2/2006 | Terumoto |
| 7,205,959 B2 | | 4/2007 | Henriksson |
| 7,420,585 B2 | | 9/2008 | Fredlund et al. |
| 7,460,108 B2 | | 12/2008 | Tamura |
| 7,504,770 B2 | | 3/2009 | Choong |
| 7,532,173 B2 | | 5/2009 | Yamazaki et al. |
| 7,573,522 B2 | | 8/2009 | Kim |
| 7,724,208 B1 | | 5/2010 | Engel et al. |
| 7,738,912 B1 | * | 6/2010 | Hawkins et al. ............ 455/550.1 |
| 7,876,288 B1 | * | 1/2011 | Huang ............................... 345/4 |
| 8,022,977 B2 | | 9/2011 | Kanade et al. |
| 2002/0094846 A1 | | 7/2002 | Kishimoto et al. |
| 2003/0227254 A1 | | 12/2003 | Terumoto |
| 2004/0017524 A1 | | 1/2004 | Li |
| 2004/0100510 A1 | | 5/2004 | Milic-Frayling et al. |
| 2004/0189630 A1 | * | 9/2004 | Huh et al. ...................... 345/418 |
| 2004/0214612 A1 | | 10/2004 | Park et al. |
| 2004/0240056 A1 | * | 12/2004 | Tomisawa et al. ............ 359/462 |
| 2004/0257473 A1 | | 12/2004 | Miyagawa |
| 2005/0001796 A1 | | 1/2005 | Liu |
| 2005/0012842 A1 | | 1/2005 | Miyagawa et al. |
| 2005/0024339 A1 | | 2/2005 | Yamazaki et al. |
| 2005/0030518 A1 | | 2/2005 | Nishi et al. |
| 2005/0037815 A1 | | 2/2005 | Besharat et al. |
| 2005/0078227 A1 | | 4/2005 | Kobayashi et al. |
| 2005/0083642 A1 | | 4/2005 | Senpuku et al. |
| 2005/0117096 A1 | | 6/2005 | Voloschenko et al. |
| 2005/0146600 A1 | * | 7/2005 | Chipchase et al. ........ 348/14.02 |
| 2005/0183040 A1 | * | 8/2005 | Kondo et al. .................. 715/841 |
| 2005/0251760 A1 | | 11/2005 | Sato et al. |
| 2005/0264984 A1 | | 12/2005 | Lee |
| 2006/0044286 A1 | * | 3/2006 | Kohlhaas et al. ............. 345/173 |
| 2006/0044399 A1 | | 3/2006 | Fredlund et al. |
| 2006/0079302 A1 | | 4/2006 | Kota et al. |
| 2006/0280363 A1 | * | 12/2006 | Umeda ......................... 382/167 |
| 2007/0002130 A1 | | 1/2007 | Hartkop |
| 2007/0013871 A1 | * | 1/2007 | Marshall et al. ................ 353/20 |
| 2007/0075915 A1 | | 4/2007 | Cheon et al. |
| 2007/0078598 A1 | * | 4/2007 | Watanabe et al. ............. 701/211 |
| 2007/0188439 A1 | * | 8/2007 | Kimura et al. ................. 345/102 |
| 2007/0188450 A1 | | 8/2007 | Hernandez et al. |
| 2007/0287506 A1 | | 12/2007 | Kim et al. |
| 2007/0291334 A1 | * | 12/2007 | Nakanishi ...................... 358/509 |
| 2008/0068450 A1 | * | 3/2008 | Choi ................................. 348/28 |
| 2008/0106591 A1 | | 5/2008 | Border et al. |
| 2008/0129719 A1 | * | 6/2008 | Jonsson et al. ................ 345/206 |
| 2008/0204438 A1 | * | 8/2008 | Song et al. .................... 345/207 |
| 2008/0220821 A1 | | 9/2008 | Okuzako et al. |
| 2009/0009628 A1 | | 1/2009 | Janicek |
| 2009/0091513 A1 | | 4/2009 | Kuhn |
| 2009/0231244 A1 | | 9/2009 | Lee |
| 2009/0298546 A1 | | 12/2009 | Kim et al. |
| 2010/0039350 A1 | | 2/2010 | Wakefield et al. |
| 2010/0039372 A1 | | 2/2010 | Futter |
| 2010/0060587 A1 | | 3/2010 | Freund |
| 2010/0194931 A1 | * | 8/2010 | Kawaguchi et al. ...... 348/240.99 |
| 2010/0222110 A1 | | 9/2010 | Kim et al. |
| 2011/0171942 A1 | | 7/2011 | Kokubo |
| 2012/0233561 A1 | | 9/2012 | Cheon et al. |

FOREIGN PATENT DOCUMENTS

| | | | |
|---|---|---|---|
| CN | 1517972 A | | 8/2004 |
| CN | 1551596 A | | 12/2004 |
| CN | 1574904 A | | 2/2005 |
| CN | 1610874 A | | 4/2005 |
| CN | 1627765 A | | 6/2005 |
| CN | 1949530 A | | 4/2007 |
| CN | 101021766 A | | 8/2007 |
| CN | 101052179 A | | 10/2007 |
| EP | 0 967 511 A1 | | 12/1999 |
| EP | 1298909 A1 | | 4/2003 |
| EP | 1 510 994 A1 | | 3/2005 |
| EP | 1 770 473 A2 | | 4/2007 |
| EP | 1 804 113 A1 | | 7/2007 |
| EP | 1 843 563 A1 | | 10/2007 |
| JP | 61-21561 A | | 1/1986 |
| JP | 2000-253113 A | | 9/2000 |
| JP | 2003-167233 A | | 6/2003 |
| JP | 2007-220109 A | | 8/2007 |
| JP | 2008-11575 A | | 1/2008 |
| KR | 2000-0031622 A | | 6/2000 |
| KR | 2002-0084368 A | | 11/2002 |
| KR | 10-2004-0043495 A | | 5/2004 |
| KR | 10-0630162 B1 | | 12/2005 |
| KR | 10-2006-0028297 A | | 3/2006 |
| KR | 10-2006-0038680 A | | 5/2006 |
| KR | 10-2006-0053187 A | | 5/2006 |
| KR | 10-2006-0055644 A | | 5/2006 |
| KR | 10-2006-0086778 A | | 8/2006 |
| KR | 10-2007-0034767 A | | 3/2007 |
| KR | 10-2007-0045311 A | | 5/2007 |
| KR | 10-0753041 B1 | | 8/2007 |
| KR | 10-2008-0006338 A | | 1/2008 |
| WO | WO-98/38822 A1 | | 9/1998 |
| WO | WO 2007/047685 A2 | | 4/2007 |
| WO | WO 2007/138543 A2 | | 12/2007 |

* cited by examiner

FIG. 5
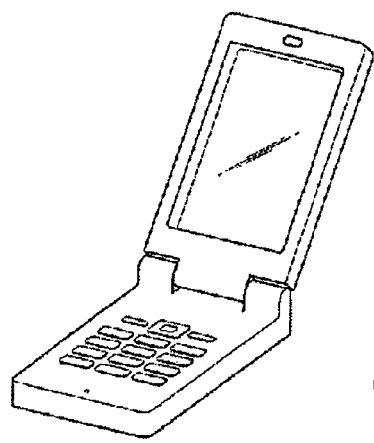
(a)
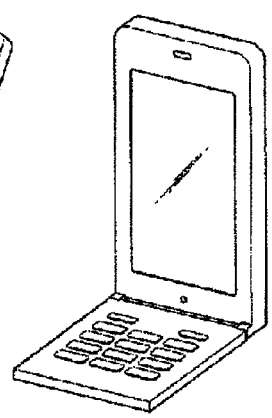
(b)
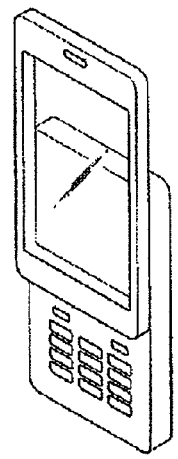
(c)
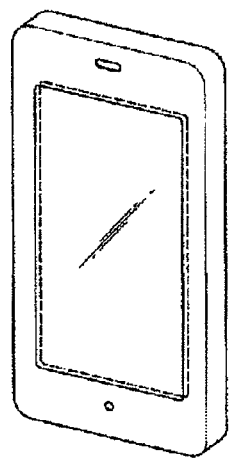
(d)
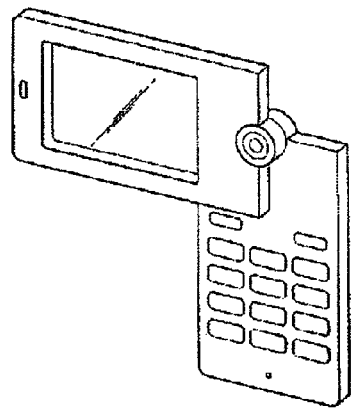
(e)
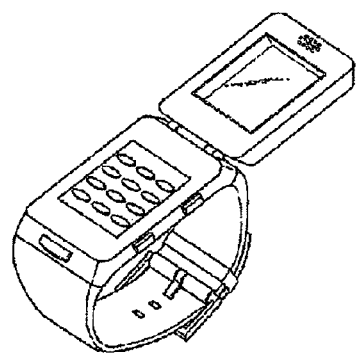
(f)

FIG. 6
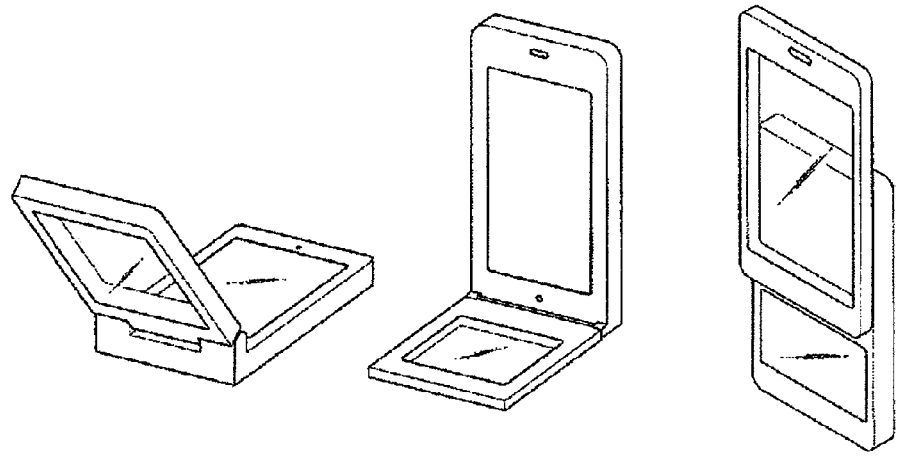
(a)  (b)  (c)
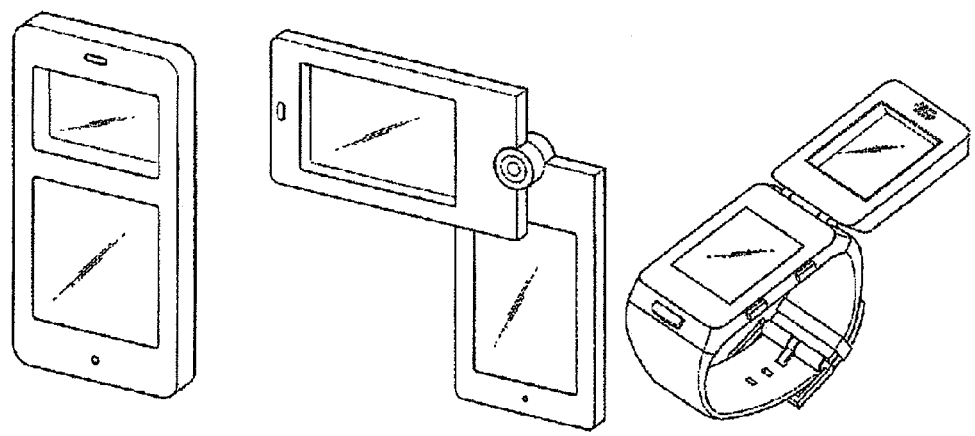
(d)  (e)  (f)

FIG. 7A
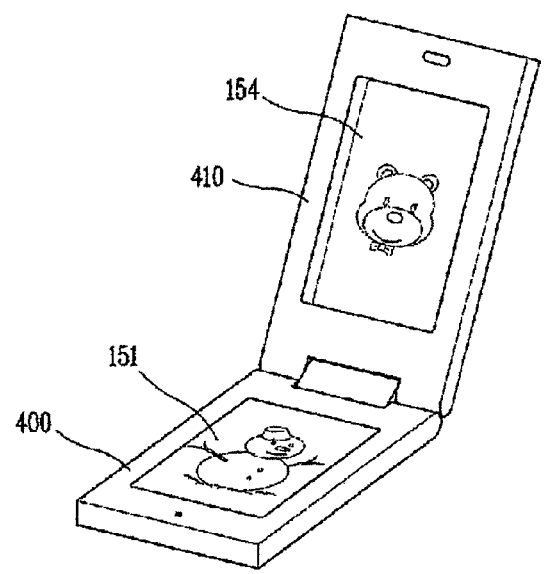
(a)
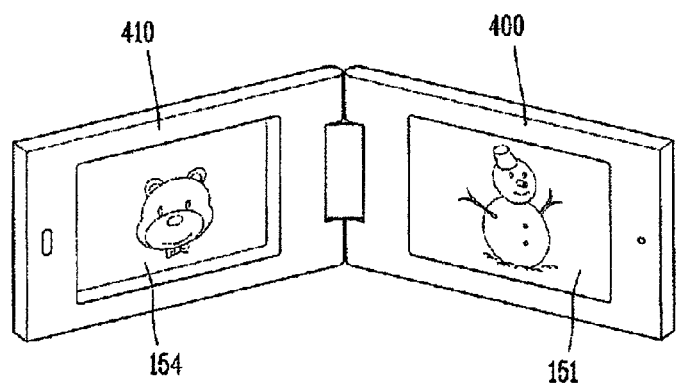
(b)

FIG. 7B
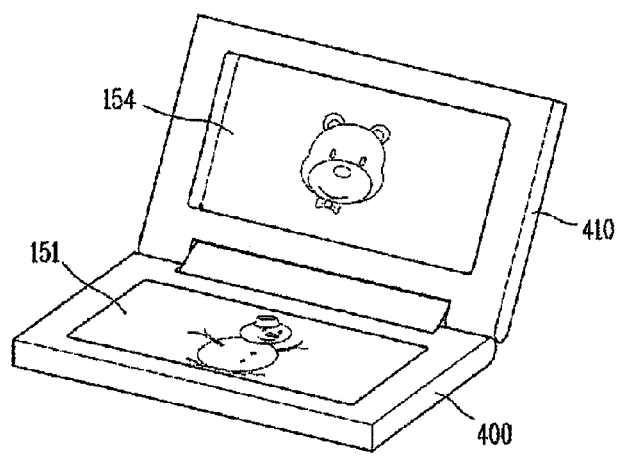
(a)
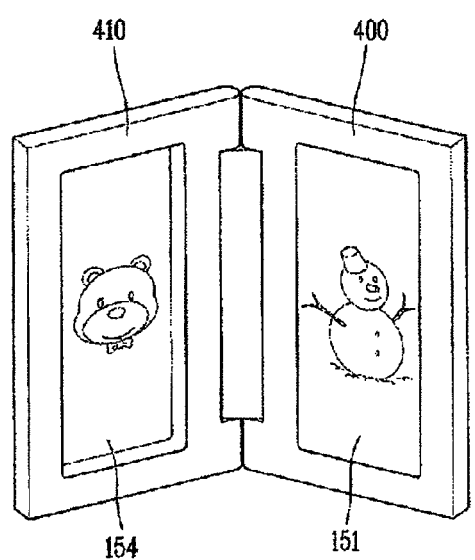
(b)

FIG. 8
(a) 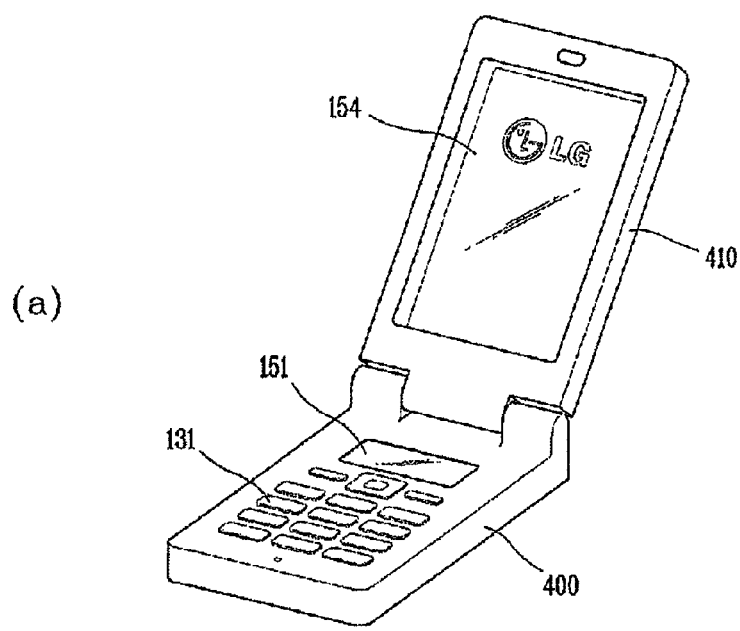
(b) 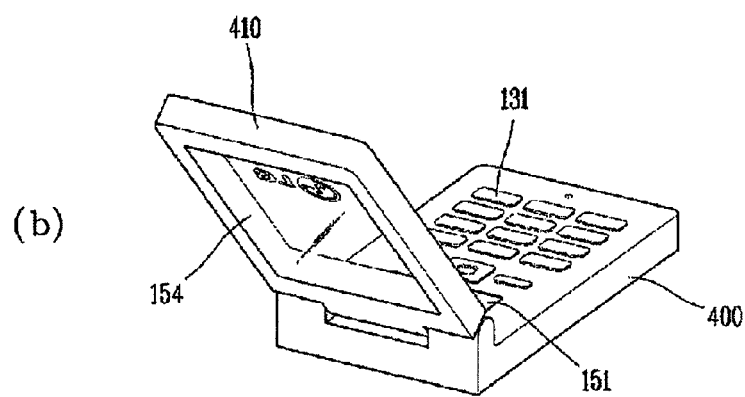

FIG. 9
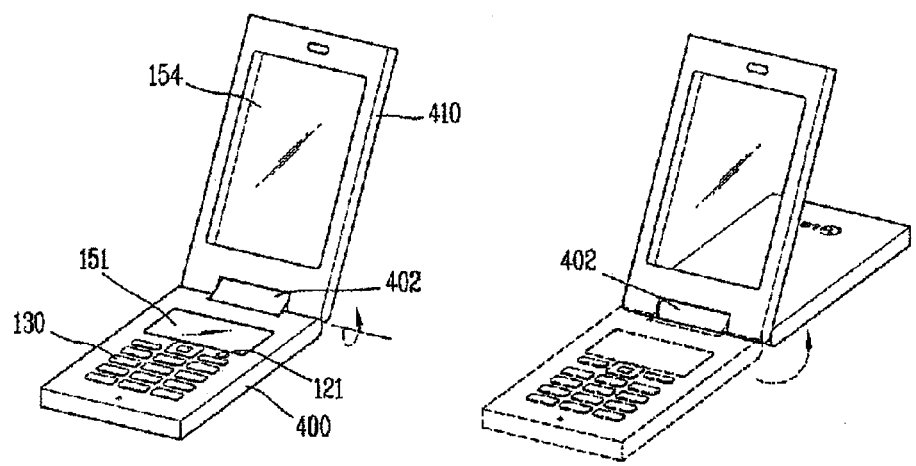
(a)  (b)
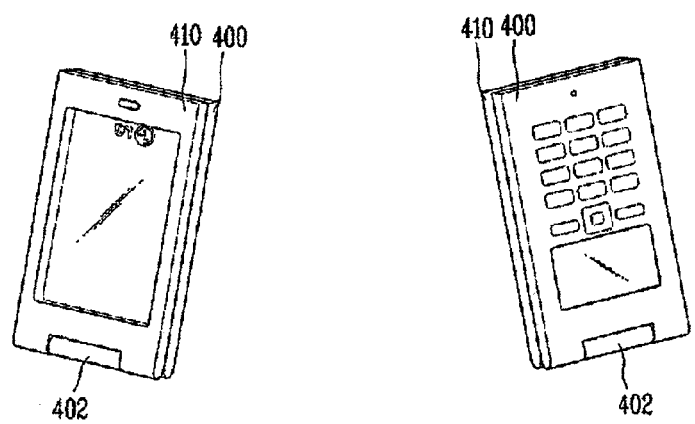
(c)  (d)

FIG. 10
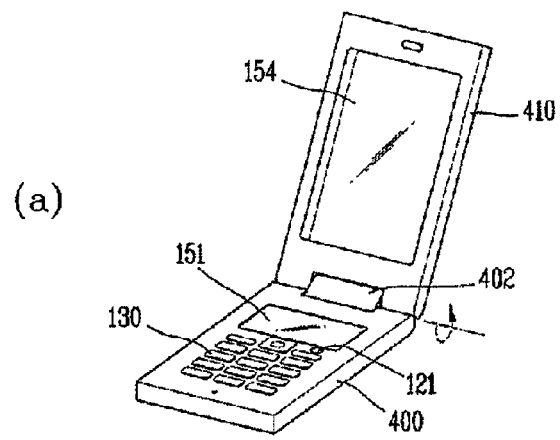
(a)
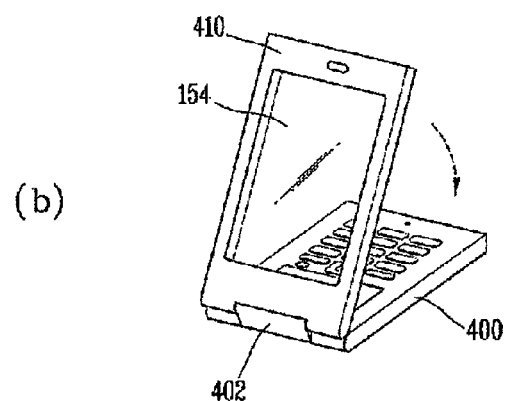
(b)
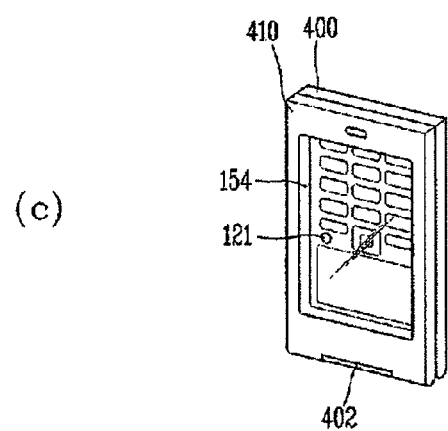
(c)

FIG. 11
(a) 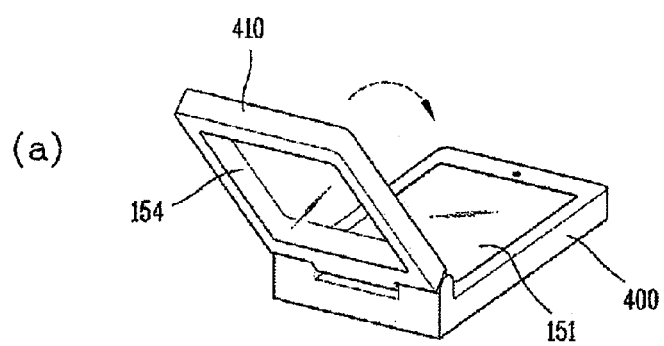
(b) 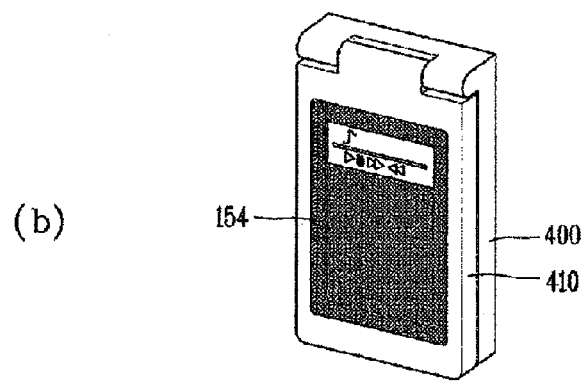
(c) 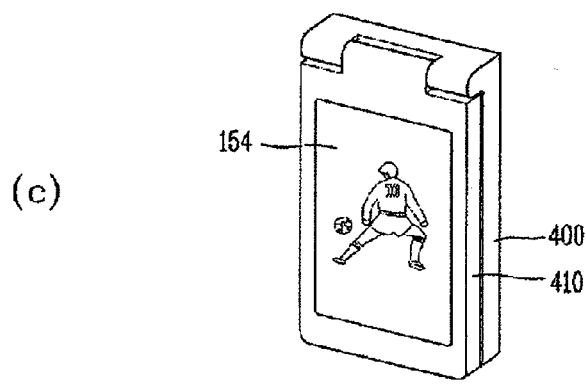

FIG. 12A
(a)
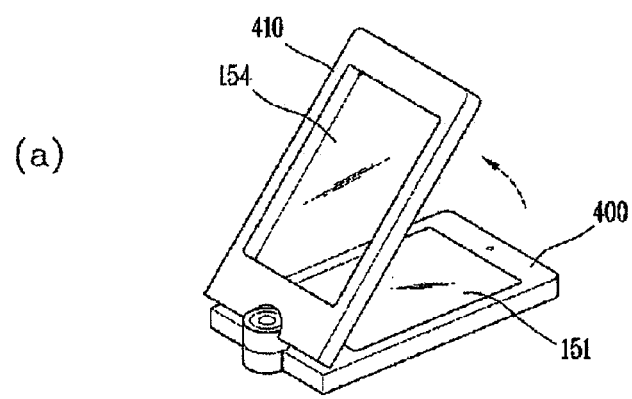
(b)
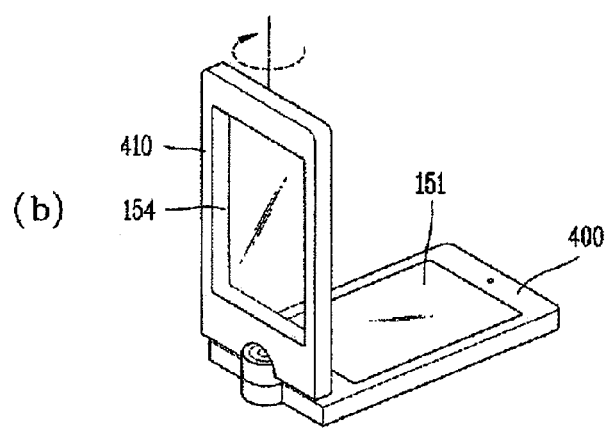
(c)
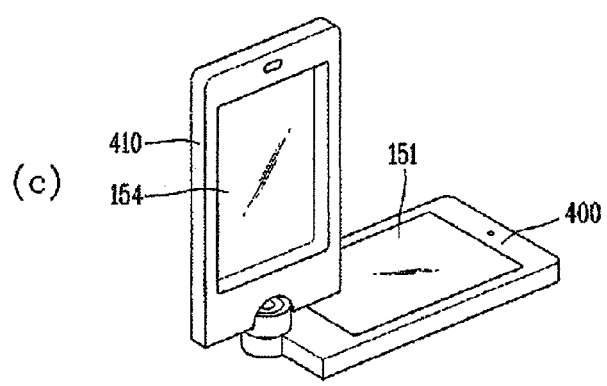

FIG. 12B
(a)
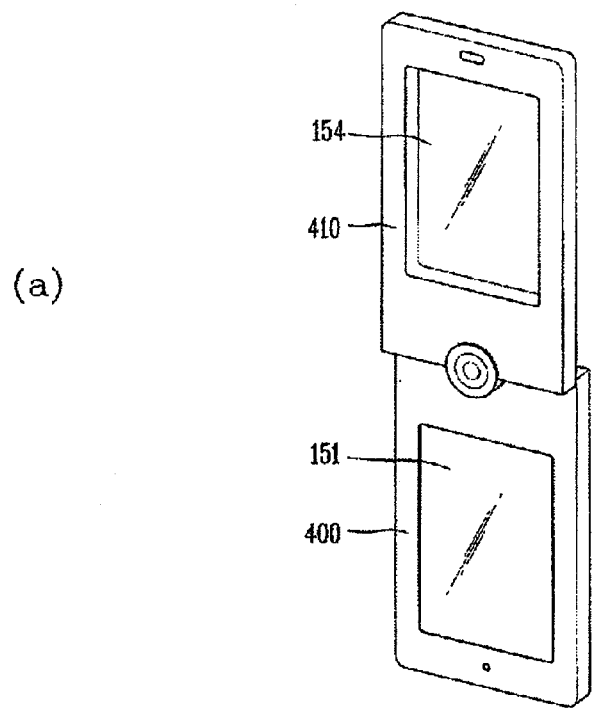
(b)
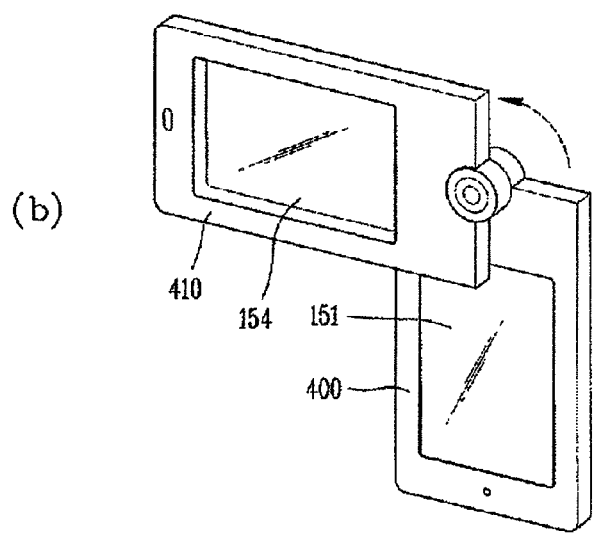

FIG. 13
(a) 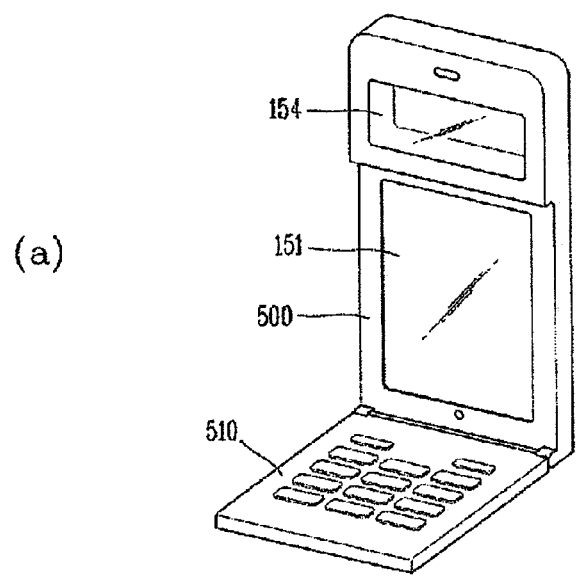
(b) 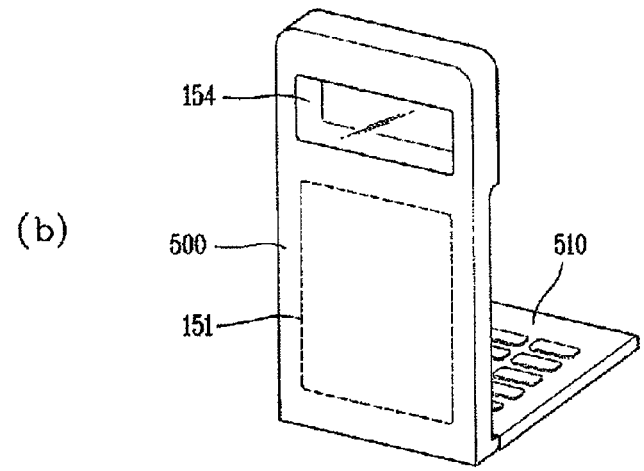

FIG. 14
(a) 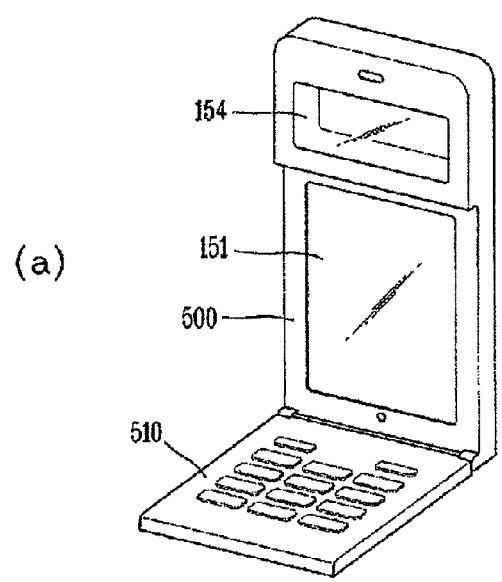
(b) 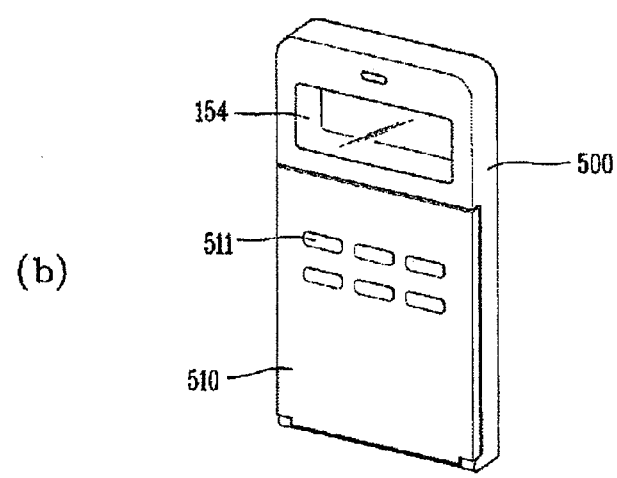

FIG. 15
(a) 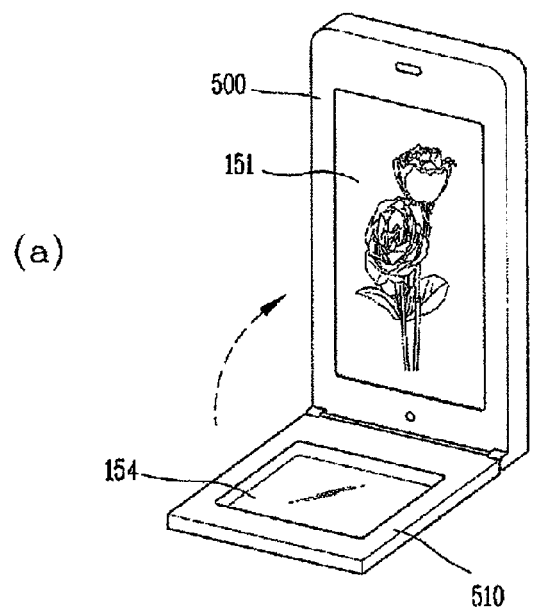
(b) 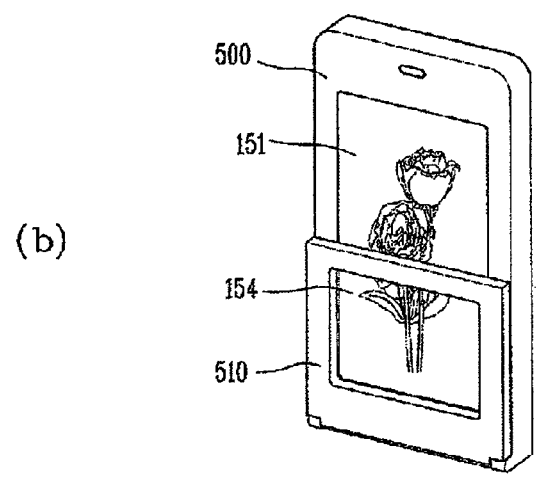

(a)                 (b)

FIG. 20
(a) 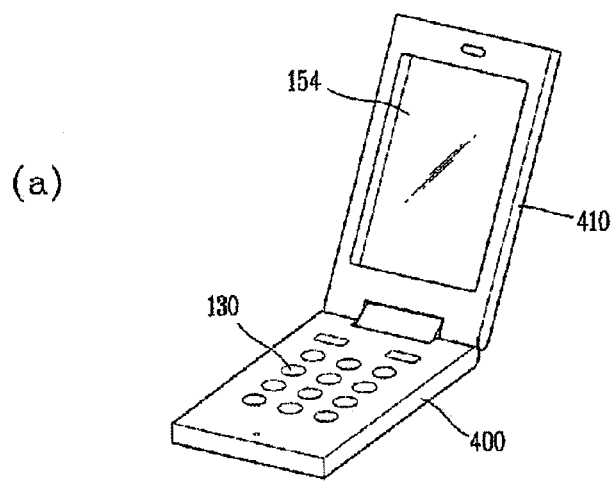
(b) 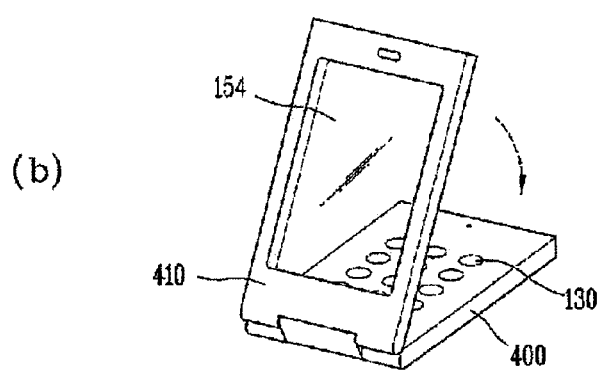
(c) 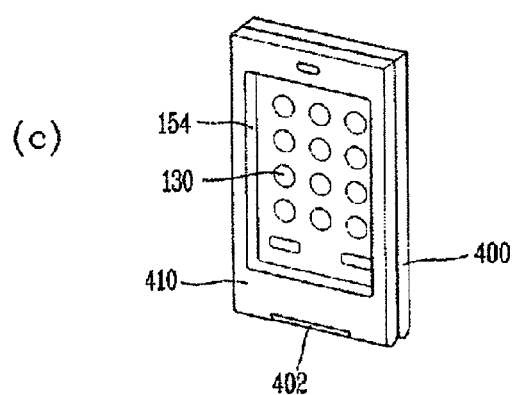

FIG. 21
(a) 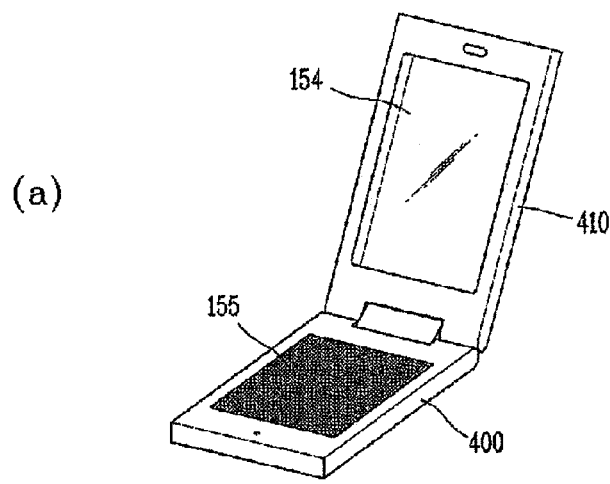
(b) 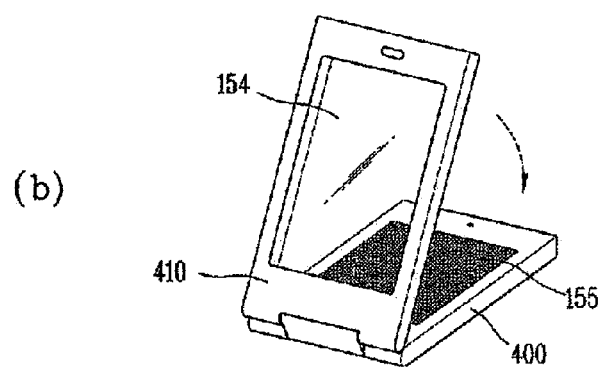
(c) 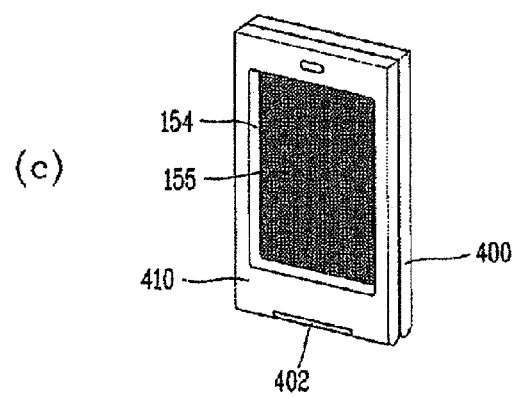

FIG. 22
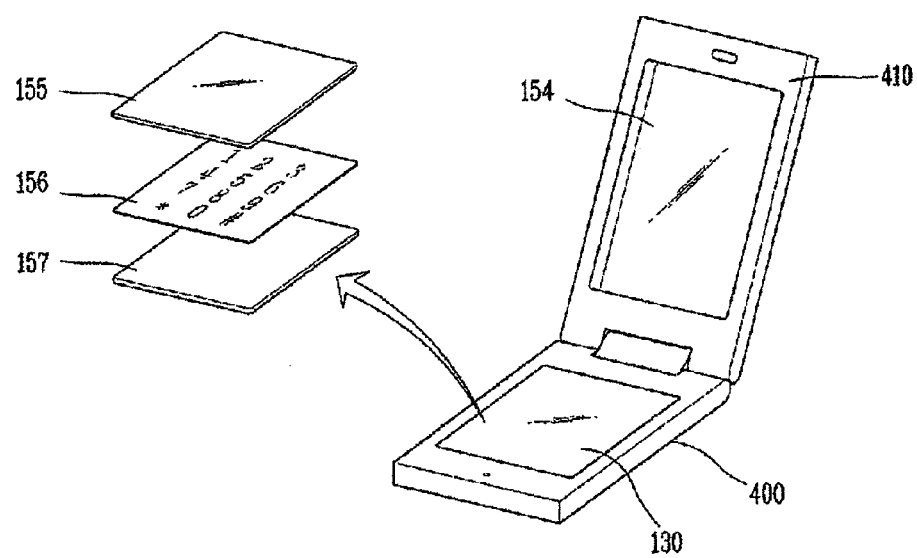
(a)
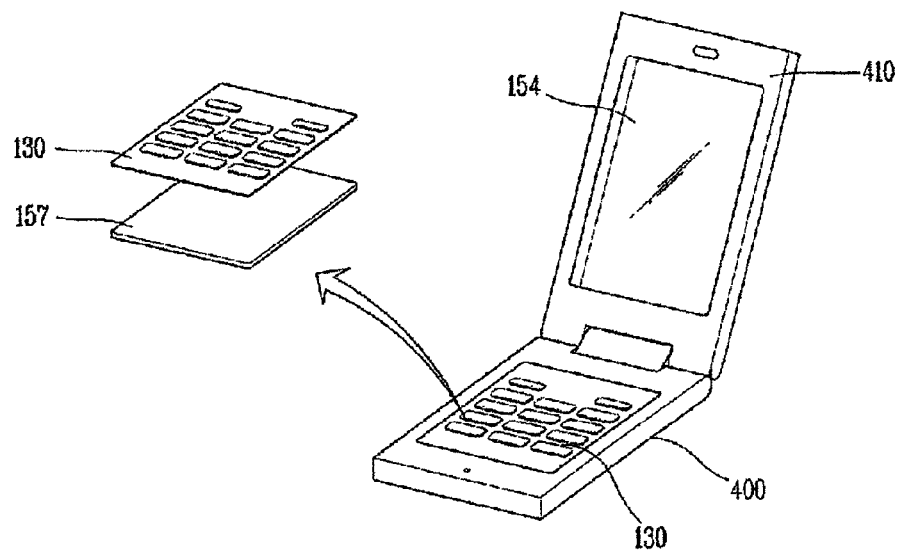
(b)

FIG. 23
(a) 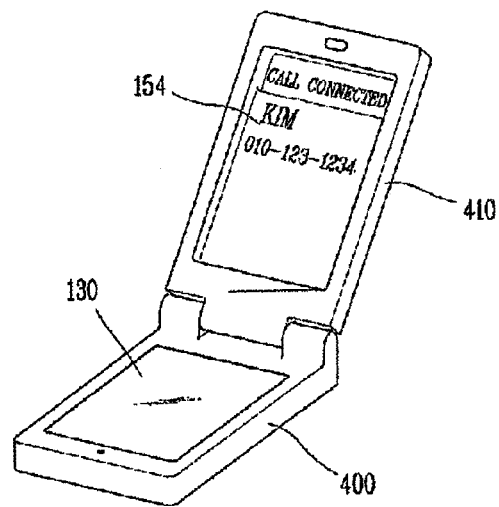
(b) 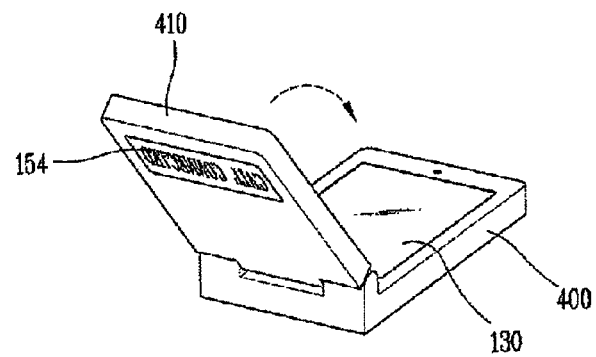

FIG. 24
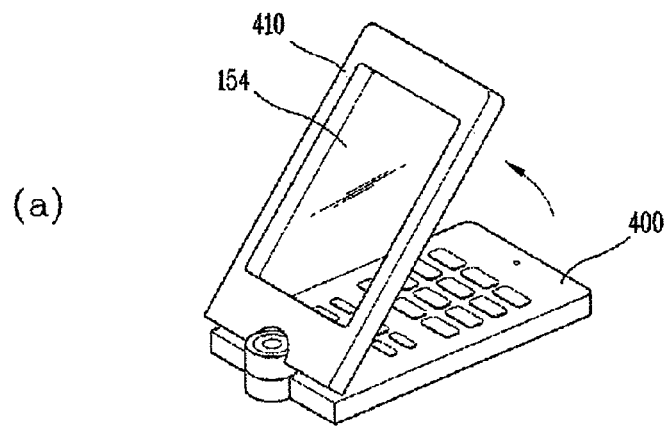
(a)
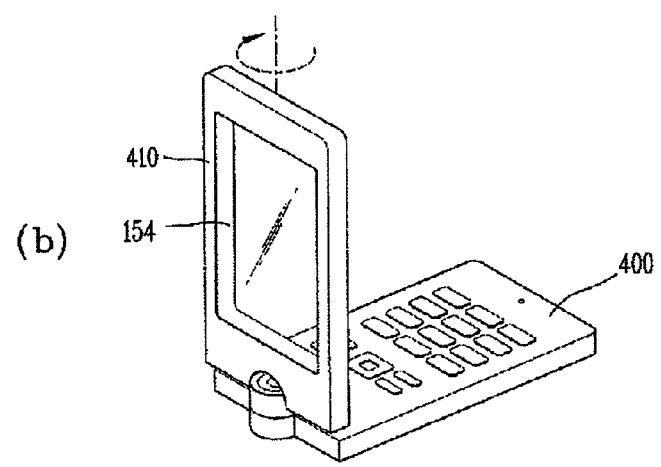
(b)
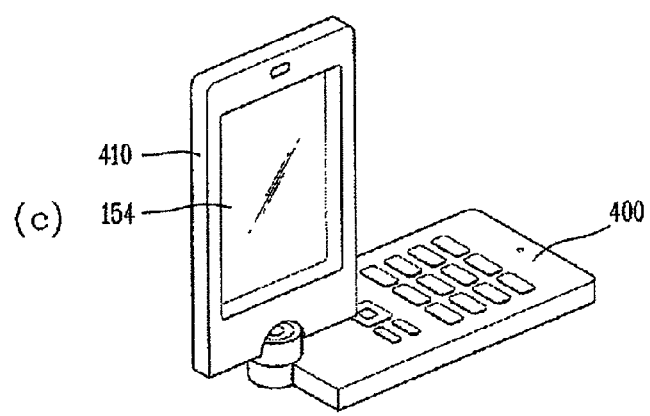
(c)

(a)           (b)

FIG. 40
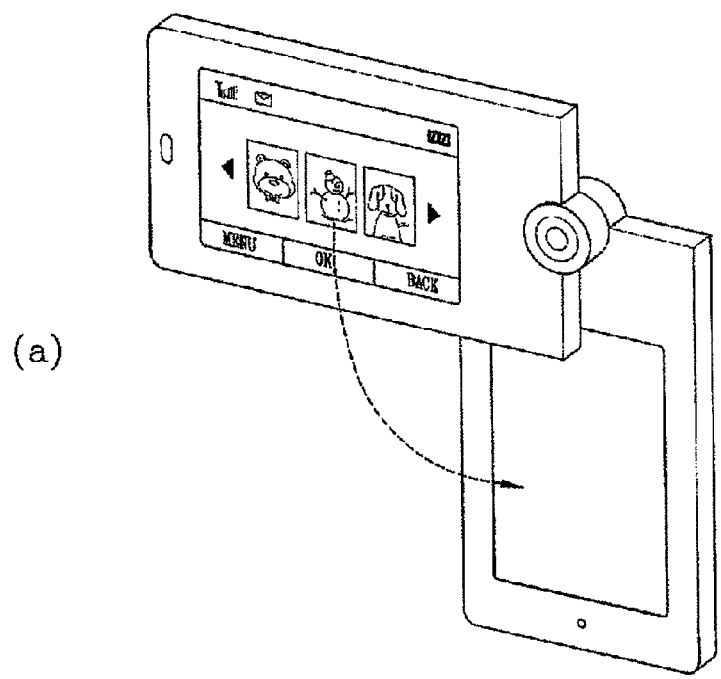
(a)
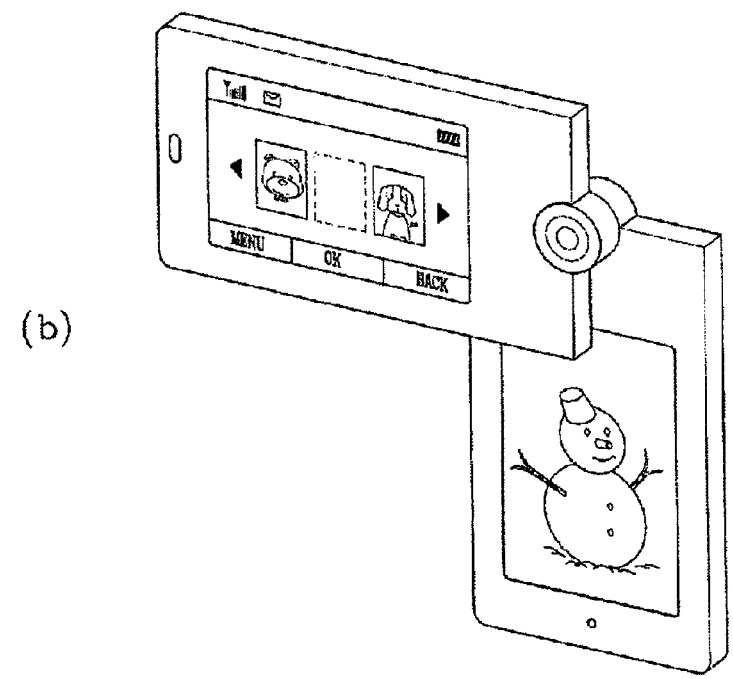
(b)

FIG. 41
(a) 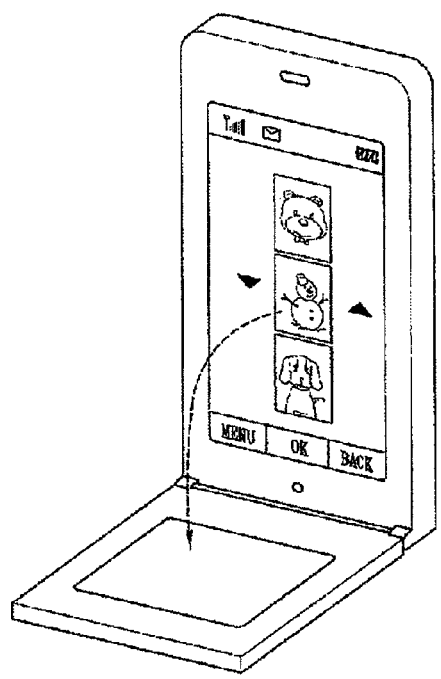
(b) 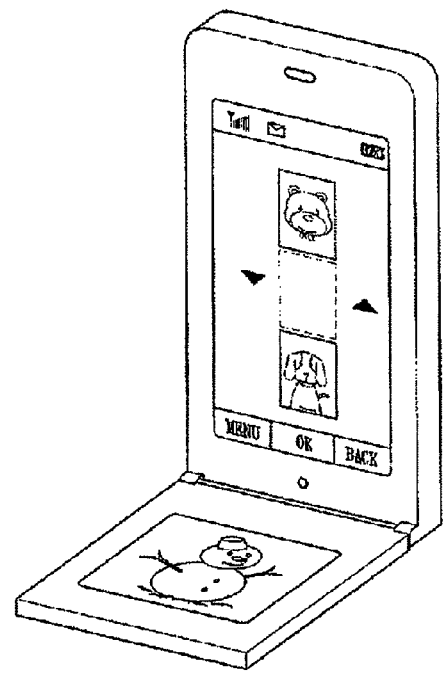

FIG. 42
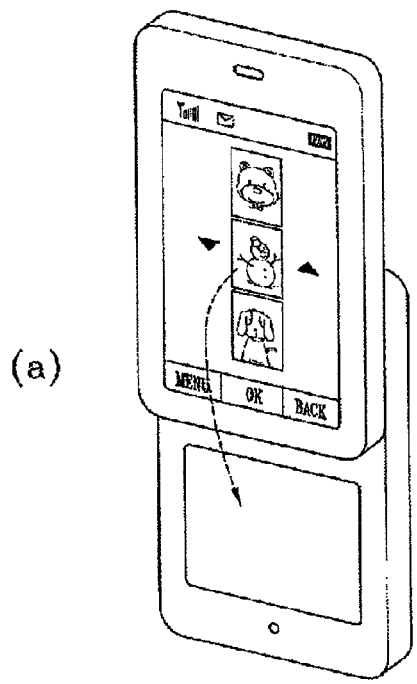
(a)
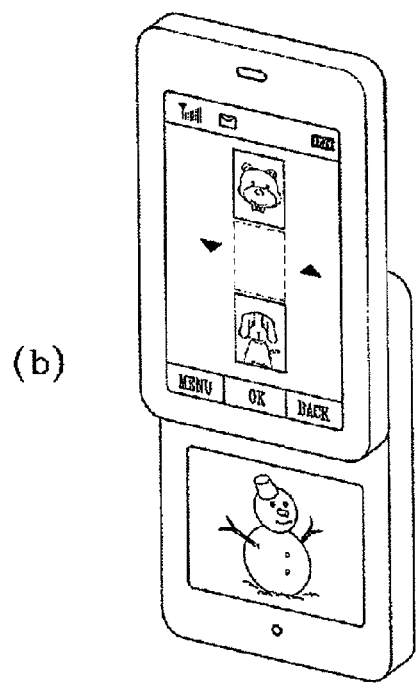
(b)

FIG. 43
(a) 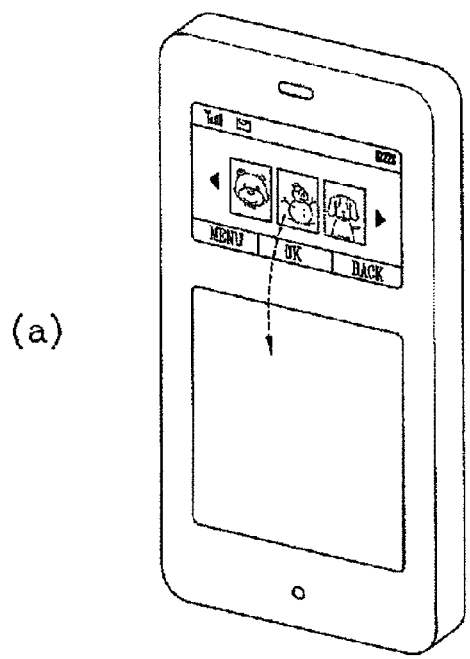
(b) 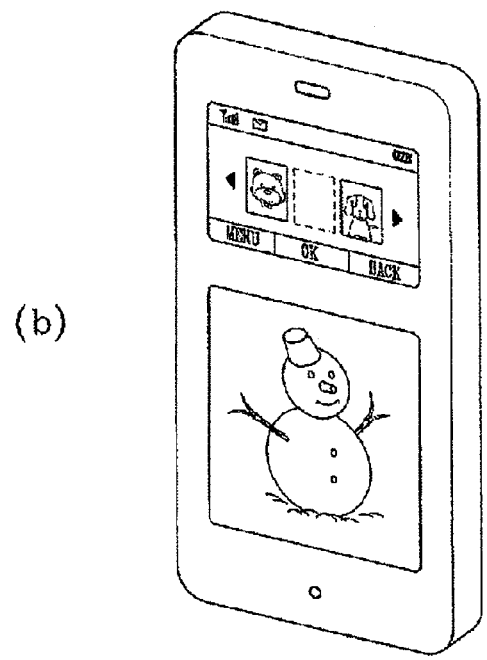

FIG. 44
(a) 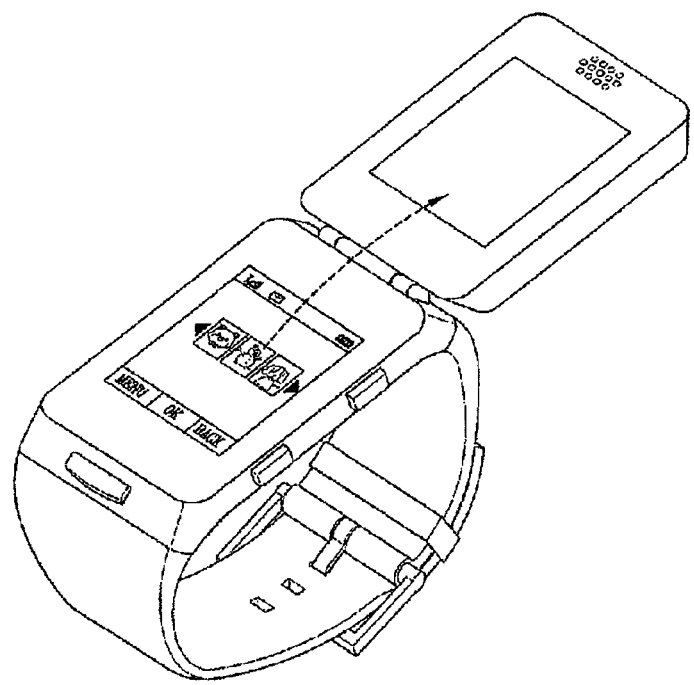
(b) 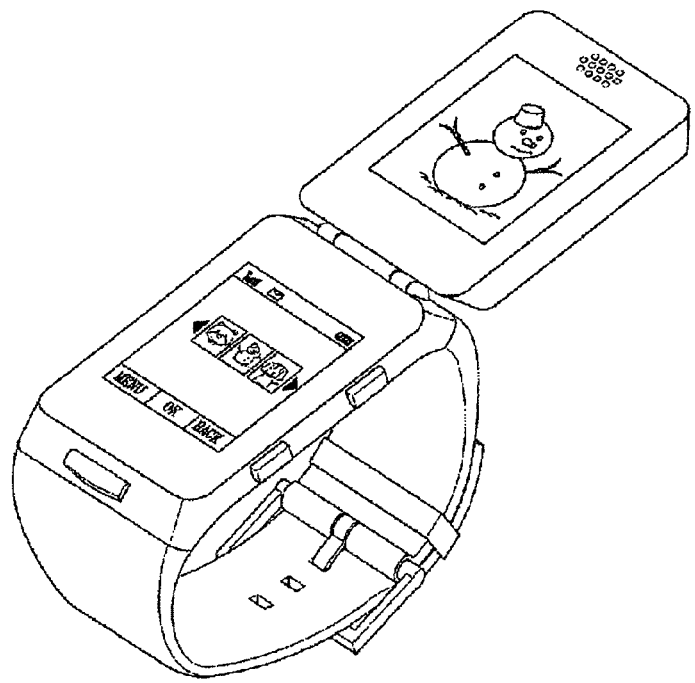

FIG. 45
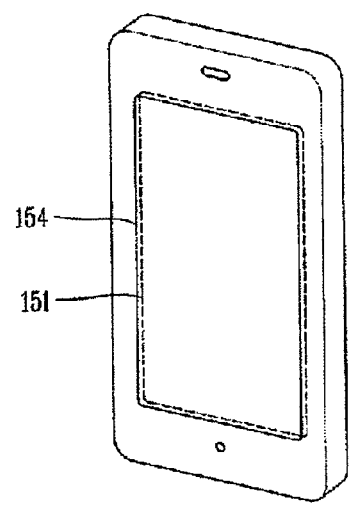
(a)
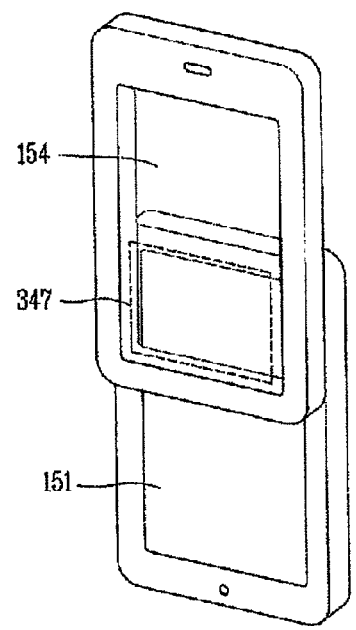
(b)
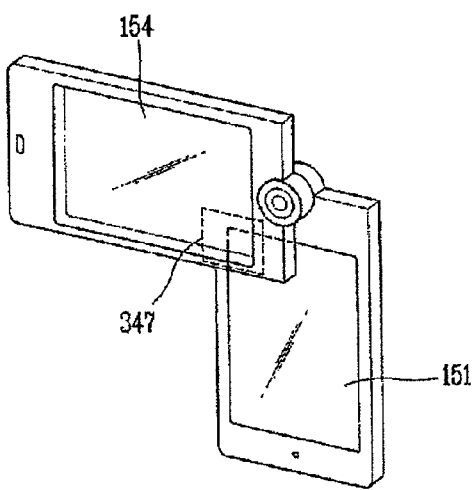
(c)
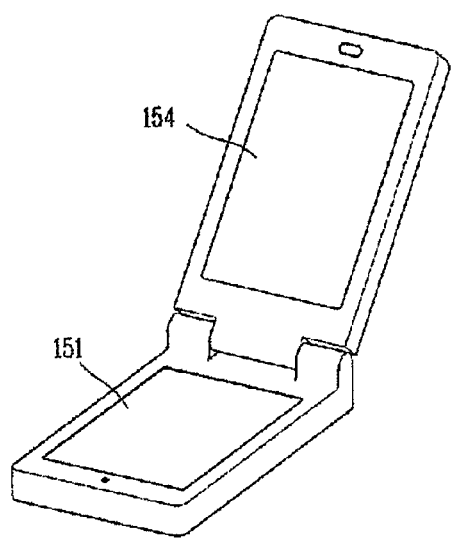
(d)

FIG. 65
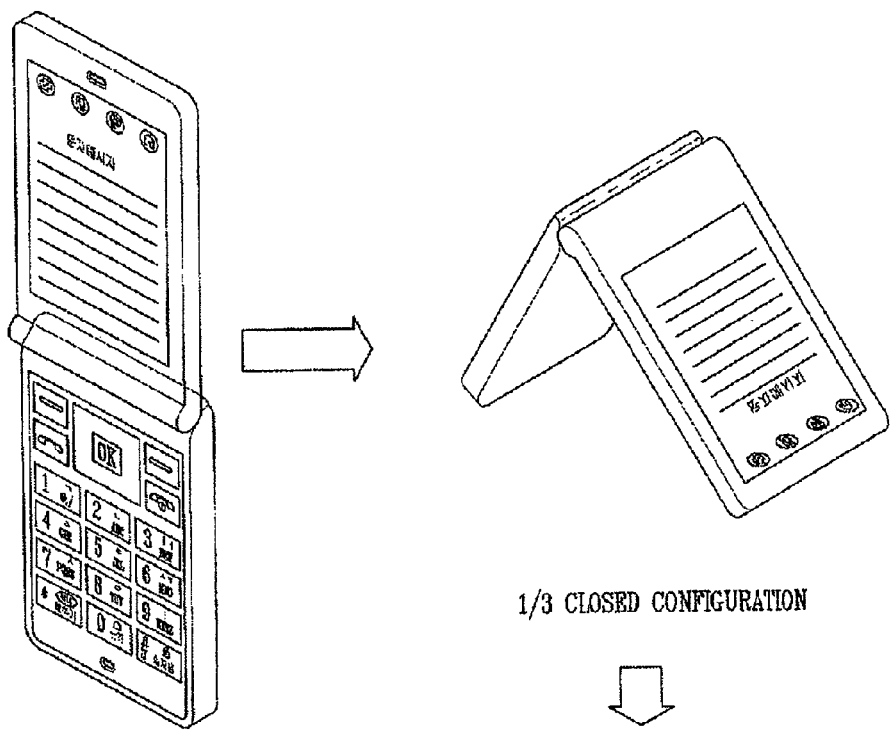
1/3 CLOSED CONFIGURATION
OPEN CONFIGURATION
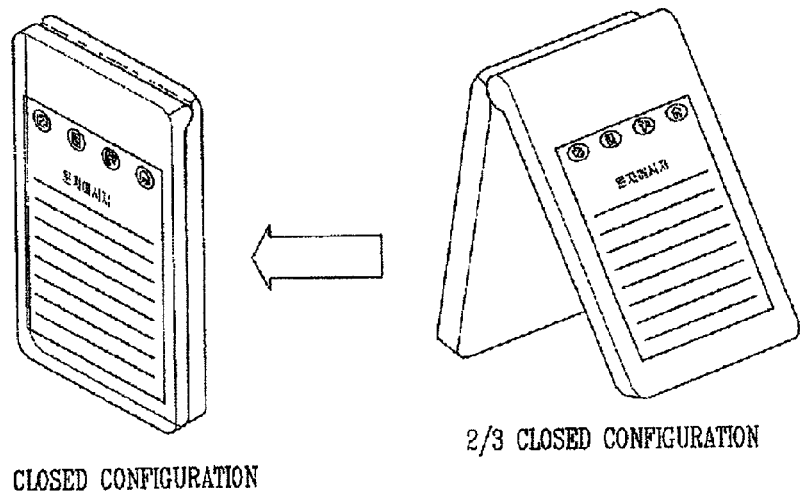
2/3 CLOSED CONFIGURATION
CLOSED CONFIGURATION

MOBILE TERMINAL AND DISPLAY CONTROL METHOD THEREOF

CROSS REFERENCE TO RELATED APPLICATIONS

The present application claims priority to Korean Application No. 10-2008-0050460 filed in Korea on May 29, 2008, and No. 10-2008-0052331 filed in Korea on Jun. 3, 2008, the entire contents of both which are hereby incorporated by reference in its entirety.

BACKGROUND OF THE INVENTION

1. Field of the Invention

The present invention relates to a mobile terminal and corresponding method for controlling a display according to conditions of a surrounding environment.

2. Description of the Related Art

A mobile terminal is a device which may be configured to perform various functions. Examples of such functions include data and voice communications, capturing images and video via a camera, recording audio, playing music files via a speaker system, and displaying images and video on a display. Some terminals include additional functionality which supports game playing, while other terminals are configured as multimedia players. More recently, mobile terminals have been configured to receive broadcast and multicast signals which permit viewing of content such as videos and television programs.

Efforts are ongoing to support and increase the functionality of mobile terminals. Such efforts include software and hardware improvements, as well as changes and improvements in the structural components which form the mobile terminal.

SUMMARY OF THE INVENTION

Accordingly, one object of the present invention is to address certain drawbacks of the related art.

Another object of the present invention is to provide a mobile terminal and corresponding method for controlling a transparency of a background of a transparent display according to an ambient illumination.

Still another object of the present invention is to provide a mobile terminal and corresponding method for controlling transparency of a background of a transparent display by a time zone.

Yet another object of the present invention is to provide a mobile terminal and corresponding method for controlling a brightness of an object displayed on a transparent display according to a surrounding environment.

Another object of the present invention is to provide a mobile terminal and corresponding method for controlling a color tone of an object displayed on a transparent display according to an ambient color.

To achieve these and other advantages and in accordance with the purpose of the present invention, as embodied and broadly described herein, the present invention provides in one aspect a mobile terminal including: a transparent display, a sensing unit operable to detect a surrounding environment, and a controller operable to change one or more values of a color tone, saturation and brightness with respect to one or more of a background of the transparent display and an object according to the sensed surrounding environment.

To achieve these and other advantages and in accordance with the purpose of the present invention, as embodied and broadly described herein, the present invention provides in another aspect a method for controlling a display of a mobile terminal including detecting a surrounding environment, and changing one or more values of a color tone, saturation and brightness with respect to one or more of a background of a transparent display and an object according to the sensed surrounding environment.

In still another aspect, the present invention provides a mobile terminal including a transparent display, a sensing unit configured to detect a surrounding environment of the transparent display, and a controller configured to change a transparency of at least one of a background and an object displayed on the transparent display according to the sensed surrounding environment. The present invention also provides a corresponding method of controlling a mobile terminal.

Further scope of applicability of the present invention will become apparent from the detailed description given hereinafter. However, it should be understood that the detailed description and specific examples, while indicating preferred embodiments of the invention, are given by illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings, which are given by illustration only, and thus are not limitative of the present invention, and wherein:

FIG. 5 is an exemplary view of mobile terminals each having a single transparent display according to an embodiment of the present invention;

FIG. 6 is an overview of mobile terminals each having a dual transparent display according to an embodiment of the present invention;

FIGS. 7A and 7B are overviews of a folder-type mobile terminal having a dual transparent display according to an embodiment of the present invention, which shows a mobile terminal having variable directions to display information according the posture of the mobile terminal;

FIG. 8 is an overview of a folder-type mobile terminal having a dual transparent display according to an embodiment of the present invention, which shows a mobile terminal further having a keypad;

FIG. 9 is an overview of a mobile terminal having a dual transparent display according to an embodiment of the present invention, which shows a mobile terminal having a folder rotatable by 360°;

FIG. 10 is an overview of a mobile terminal having a dual transparent display according to an embodiment of the present invention, which shows a mobile terminal capable of photographing even in the state of the folder being closed;

FIG. 11 is a perspective view of a mobile terminal having a dual transparent display according to an embodiment of the present invention, which shows a mobile terminal capable of controlling a size of information output in cooperation with an opening/closing of a folder;

FIG. 12A and 12B are overviews of a swivel-type mobile terminal having a dual transparent display according to an embodiment of the present invention;

FIG. 13 is an overview of a flip-type mobile terminal having a dual transparent display according to an embodiment of the present invention;

FIG. 14 is another overview of the flip-type mobile terminal of FIG. 13;

FIG. 15 is another overview of the flip-type mobile terminal of FIG. 13;

FIG. 20 is an overview of a folder-type mobile terminal having a single transparent display according to an embodiment of the present invention;

FIG. 21 is an overview showing a method for inputting information in a folder-type mobile terminal having a single transparent display according to an embodiment of the present invention;

FIG. 22 is an overview showing a configuration of a keypad for a folder-type mobile terminal having a single transparent display according to an embodiment of the present invention;

FIG. 23 is an overview of a folder-type mobile terminal having a transparent display according to an embodiment of the present invention, which shows a mobile terminal having a configuration in which information displayed on any one surface of the transparent display can be restricted;

FIG. 24 is an overview of a swivel-type mobile terminal having a single transparent display according to an embodiment of the present invention;

FIGS. 39 to 44 are overviews showing a method for controlling a display of a mobile terminal having a dual transparent display according to an embodiment of the present invention;

FIG. 45 is an overview of a mobile terminal having a dual transparent display according to an embodiment of the present invention, which shows a method for controlling displays according to an overlapped state between the displays;

FIG. 65 is an overview showing the process of opening/closing a folder of a mobile terminal according to an embodiment of the present invention;

DETAILED DESCRIPTION OF THE INVENTION

Reference will now be made in detail to the preferred embodiments of the present invention, examples of which are illustrated in the accompanying drawings.

A mobile terminal may be implemented using a variety of different types of terminals. Examples of such terminals include mobile phones, smart phones, notebook computers, digital broadcast terminals, Personal Digital Assistants (PDA), Portable Multimedia Players (PMP), navigators and the like.

Figure 1:
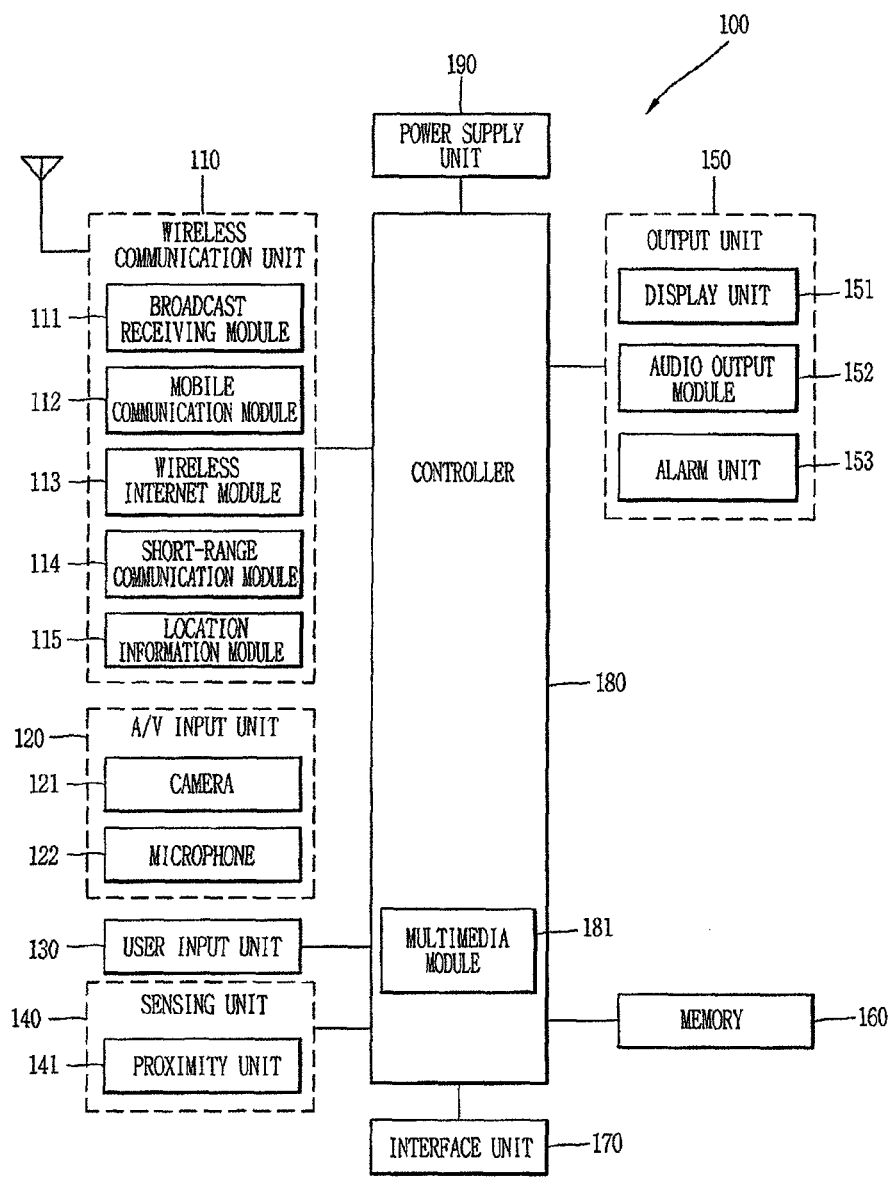
FIG. 1 is a schematic block diagram of a mobile terminal implementing an embodiment of the present invention.

FIG. 1 is a block diagram illustrating a mobile terminal according to one embodiment of the present invention. As shown, the mobile terminal 100 may include components such as a wireless communication unit 110, an Audio/Video (A/V) input unit 120, a user input unit 130, a sensing unit 140, an output unit 150, a memory 160, an interface unit 170, a controller 180, a power supply 190 and the like. Further, FIG. 1 shows the mobile terminal 100 having various components, but it is understood that implementing all of the illustrated components is not a requirement. Greater or fewer components may alternatively be implemented.

In addition, the wireless communication unit 110 may include one or more components which permit wireless communications between the mobile terminal 100 and a wireless communication system or between the mobile terminal 100 and a network within which the mobile terminal 100 is located. For example, the wireless communication unit 110 may include at least one of a broadcast receiving module 111, a mobile communication module 112, a wireless Internet module 113, a short-range communication module 114 and a position location module 115.

The broadcast receiving module 111 receives a broadcast signal and/or broadcast associated information from an external broadcast managing entity via a broadcast channel. The broadcast channel may include a satellite channel and a terrestrial channel. Further, the broadcast managing entity may indicate a server which generates and transmits a broadcast signal and/or broadcast associated information or a server which receives a pre-generated broadcast signal and/or broadcast associated information and sends them to the mobile terminal. Examples of broadcast associated information may include information associated with a broadcast channel, a broadcast program, a broadcast service provider, and the like.

The broadcast signal may be implemented as a TV broadcast signal, a radio broadcast signal, and a data broadcast signal, among others. The broadcast signal may further include a data broadcast signal combined with a TV or radio broadcast signal. Also, the broadcast associated information may be provided via a mobile communication network, and received by the mobile communication module 112. In addition, the broadcast associated information may be implemented in various formats. For instance, broadcast associated information may include Electronic Program Guide (EPG) of Digital Multimedia Broadcasting (DMB), Electronic Service Guide (ESG) of Digital Video Broadcast-Handheld (DVB-H), and the like.

The broadcast receiving module 111 may be configured to receive digital broadcast signals transmitted from various types of broadcast systems. Such broadcast systems may include the Digital Multimedia Broadcasting-Terrestrial (DMB-T) system, the Digital Multimedia Broadcasting-Satellite (DMB-S) system, the Media Forward Link Only (MediaFLO) system, the Digital Video Broadcast-Handheld (DVB-H) system, the Integrated Services Digital Broadcast-Terrestrial (ISDB-T) system, and the like. The broadcast receiving module 111 may be configured to be suitable for all broadcast system transmitting broadcast signals as well as the digital broadcasting systems. Broadcast signals and/or broadcast associated information received via the broadcast receiving module 111 may also be stored in a suitable device, such as a memory 160.

Further, the mobile communication module 112 transmits/receives wireless signals to/from at least one of network entities (e.g., base station, an external mobile terminal, a server, etc.) on a mobile communication network. In addition, the wireless signals may include audio call signal, video call signal, or various formats of data according to transmission/reception of text/multimedia messages. Also, the wireless Internet module 113 supports wireless Internet access for the mobile terminal, and may be internally or externally coupled to the mobile terminal. Examples of such wireless Internet access may include Wireless LAN (WLAN) (Wi-Fi), Wireless Broadband (Wibro), World Interoperability for Microwave Access (Wimax), High Speed Downlink Packet Access (HSDPA), and the like.

Further, the short-range communication module 114 denotes a module for short-range communications. Suitable technologies for implementing this module may include BLUETOOTH, Radio Frequency IDentification (RFID), Infrared Data Association (IrDA), Ultra-WideBand (UWB), ZigBee, and the like. The position location module 115 denotes a module for detecting or calculating a position of a mobile terminal. An example of the position location module 115 may include a Global Position System (GPS) module.

In addition, the GPS module may receive position information in cooperation with associated multiple satellites. Further, the position information may include coordinates information represented by latitude and longitude. For example, the GPS module can measure accurate time and distance respectively from more than three satellites so as to accurately calculate a current position of the mobile terminal based on such three different distances according to a triangulation scheme. A scheme may be used to obtain time information and distance information from three satellites and correct error by one satellite. Specifically, the GPS module can further obtain three-dimensional speed information and an accurate time, as well as position on latitude, longitude and altitude, from the position information received from the satellites.

In addition, the A/V input unit 120 is configured to provide audio or video signal input to the mobile terminal. The A/V input unit 120 may include a camera 121 and a microphone 122. Further, the camera 121 receives and processes image frames of still pictures or video obtained by image sensors in a video call mode or a capturing mode. The processed image frames may then be displayed on a display 151.

Also, the image frames processed by the camera 121 may be stored in the memory 160 or transmitted to the exterior via the wireless communication unit 110. Two or more cameras 121 may be provided according to the configuration of the mobile terminal. The microphone 122 may receive an external audio signal via a microphone while the mobile terminal is in a particular mode, such as a phone call mode, a recording mode, a voice recognition mode, or the like. This audio signal is processed into digital data, and the processed digital data is converted for output into a format transmittable to a mobile communication base station via the mobile communication module 112 for the phone call mode. The microphone 122 may also include assorted noise removing algorithms to remove noise generated in the course of receiving the external audio signal.

In addition, the user input unit 130 may generate input data input by a user to control the operation of the mobile terminal. The user input unit 130 may include a keypad, a dome switch, a touchpad (e.g., static pressure/capacitance), a jog wheel, a jog switch and the like. A specific example can be one in which the touchpad is layered with the display 151 to be explained later so as to be in cooperation with the display 151, which is referred to as a touch screen. Further, the sensing unit 140 provides status measurements of various aspects of the mobile terminal. For instance, the sensing unit 140 may detect an open/close status of the mobile terminal, a change in a location of the mobile terminal 100, a presence or absence of user contact with the mobile terminal 100, the location of the mobile terminal 100, acceleration/deceleration of the mobile terminal 100, and the like, so as to generate a sensing signal for controlling the operation of the mobile terminal 100.

For example, regarding a slide-type mobile terminal, the sensing unit 140 may sense whether a sliding portion of the mobile terminal is open or closed. Other examples include sensing functions, such as the sensing unit 140 sensing the presence or absence of power provided by the power supply 190, the presence or absence of a coupling or other connection between the interface unit 170 and an external device. Here, the sensing unit 140 may include a proximity sensor.

In addition, the interface unit 170 is generally implemented to couple the mobile terminal to external devices. The interface unit 170 may include, for example, wired/wireless headset ports, external charger ports, wired/wireless data ports, memory card ports, ports for coupling devices having an identification module, etc.), audio Input/Output (I/O) ports, video I/O ports, earphone ports, and the like. The identification module may be configured as a chip for storing various information required to authenticate an authority to use the mobile terminal 100, which may include a User Identity Module (UIM), a Subscriber Identity Module (SIM), a Universal Subscriber Identity Module (USIM), and the like. Also, the device having the identification module (hereinafter, referred to as 'identification device') may be implemented in a type of smart card. Hence, the identification device can be coupled to the mobile terminal 100 via a port.

In addition, the interface unit 170 may receive data from an external device, or be provided with power and accordingly transfer the received data or power to each component within the mobile terminal 100 or transfer data of the mobile terminal 100 to an external device. Also, the interface unit 170 may serve as a path for power to be supplied from an external cradle to the mobile terminal 100 when the mobile terminal 100 is connected to the external cradle or as a path for transferring various command signals inputted from the cradle by a user to the mobile terminal 100. Such various command signals and power inputted from the cradle may operate as a signal for recognizing that the mobile terminal 100 has accurately been mounted to the cradle.

The output unit 150 is configured to output an audio signal, a video signal or an alarm signal, and may include the display 151, an audio output module 152, an alarm 153, and the like. Further, the display 151 may output information processed in the mobile terminal 100. For example, when the mobile terminal is operating in a phone call mode, the display 151 provides a User Interface (UI) or a Graphic User Interface (GUI) which includes information associated with the call. As another example, if the mobile terminal is in a video call mode or a capturing mode, the display 151 may additionally or alternatively display images captured and/or received, UI, or GUI.

Meanwhile, as mentioned above, a touch screen can be configured as the display 151 and the touchpad are layered with each other to work in cooperation with each other. This configuration permits the display 151 to function both as an input device and an output device. The display 151 may be implemented using, for example, a Liquid Crystal Display (LCD), a Thin Film Transistor-Liquid Crystal Display (TFT-LCD), an Organic Light-Emitting Diode (OLED), a flexible display, a three-dimensional (3D) display, or the like.

Some of the displays according to embodiments of the present invention can be configured to be transparent such that it is possible to see the exterior therethrough. These displays may be called transparent displays. A representative example of the transparent display may include a Transparent Organic Light Emitting Diode (TOLED), and the like. Further, the mobile terminal 100 may include two or more of such displays 151. For example, the mobile terminal 100 may simultaneously include an external display (not shown) and an internal display (not shown).

In addition, the touch screen may be configured so as to detect a touch input pressure as well as touch input position and touch input area. Also, the proximity sensor 141 may be disposed inside the touch screen or near the touch screen. The proximity sensor 141 denotes a sensor for detecting whether there is an object approaching a certain detection surface or existing near the certain detection surface by using a force of an electromagnetic field or infrared rays, without any mechanical contact. Therefore, the proximity sensor 141 has a considerably long lifespan as compared to a contact sensor and also implement considerably high utility.

Examples of the proximity sensor 141 include a transmission type photo sensor, a direct reflection type photo sensor, a mirror reflection type photo sensor, a high frequency oscillation type proximity sensor, a capacitive proximity sensor, a magnetic proximity sensor, an infrared proximity sensor and the like. Also, even without the proximity sensor 141 mounted, if an electrostatic touch screen is provided, the proximity of a pointer can be detected based upon the change in an electric field due to the proximity of the pointer.

Therefore, if the pointer is located near the touch screen without actually contacting the touch screen, the location of the pointer and the distance (gap) between the pointer and the touch screen can be detected. Hereinafter, the behavior that the pointer is located near the touch screen so as to be recognized as being located above the touch screen is referred to as a "proximity touch," and the behavior that the pointer is actually contacts the touch screen is referred to as "contact touch." Also, the location at which the proximity touch of the pointer is recognized above the touch screen denotes a location at which the pointer is located perpendicularly to the touch screen for the proximity touch of the pointer.

The use of the proximity sensor 141 allows the detection of proximity touch and proximity touch patterns (e.g., proximity touch distance, proximity touch direction, proximity touch speed, proximity touch time, proximity touch location, proximity touch movement state and the like), and also allows the output on the touch screen of information related to the detected proximity touch operation and the proximity touch pattern.

Further, the audio output module 152 may output audio data which is received from the wireless communication unit 110 in various modes including a call-receiving mode, call-placing mode, recording mode, voice recognition mode, broadcast reception mode, and the like, or audio data stored in the memory 160. Also, the audio output module 152 may output an audio signal relating to a particular function (e.g., call received, message received, etc.) performed in the mobile terminal 100. The audio output module 152 may be implemented using a speaker, a buzzer, or the like.

In addition, the alarm 153 may output a signal to inform a generation of event associated with the mobile terminal 100. Alarm events may include a call received, message received, user input received and the like. In addition to generating the audio or video signal, the alarm 153 may also inform the event generation in different manners, for example, by providing tactile sensations (e.g., vibration) to a user. The alarm 153 may also be configured to vibrate responsive to the mobile terminal receiving a call or message. As another example, vibration is provided by the alarm 153 responsive to receiving user input at the mobile terminal, thus providing a tactile feedback mechanism. Such vibration can also be provided to make a user recognize the event generation. The signal informing the event generation may be output via the display 151 or the audio output module 152.

Further, the memory 160 may store a program for the processing and control of the controller 180. Alternatively, the memory 160 may temporarily store input/output data (e.g., phonebook data, messages, still images, video and the like). Also, the memory 160 may store data related to various patterns of vibrations and audio outputted upon the touch input on the touch screen. In addition, the memory 160 may be implemented using any type of suitable storage medium including a flash memory type, a hard disk type, a multimedia card micro type, a memory card type (e.g., SD or DX memory), Random Access Memory (RAM), Static Random Access Memory (SRAM), Read-Only Memory (ROM), Electrically Erasable Programmable Read-Only Memory (EEPROM), Programmable Read-Only Memory (PROM), magnetic memory, magnetic disk, optical disk, and the like. Also, the mobile terminal 100 may operate a web storage which performs the storage function of the memory 160 on the Internet.

In addition, the controller 180 generally controls the overall operations of the mobile terminal. For example, the controller 180 performs the control and processing associated with voice calls, data communications, video calls, and the like. The controller 180 may also include a multimedia module 181 which provides multimedia playback. The multimedia module 181 may be configured as part of the controller 180 or as a separate component. The controller 180 can also perform a pattern recognition processing so as to recognize writing or drawing input on the touch screen as text or image. Further, the power supply 190 provides power required by various components under the control of the controller 180. The provided power may be internal power, external power, or combination thereof.

The internal components of the mobile terminal related to an embodiment of the present invention have been described from the perspective of their functions. Hereinafter, external components of the mobile terminal related to an embodiment of the present invention will be described from the perspective of their functions with reference to FIGS. 2 and 3. Further, the mobile terminal may be implemented in a variety of different configurations. Examples of such configurations include a folder type, slide type, bar type, rotating type, swing type or the like. The present description in FIGS. 2 and 3 relates to a slide-type mobile terminal, but the present invention is not limited to the slide-type mobile terminal, and can be applied to other types of terminals including the above-mentioned types of terminals.

Figure 2:
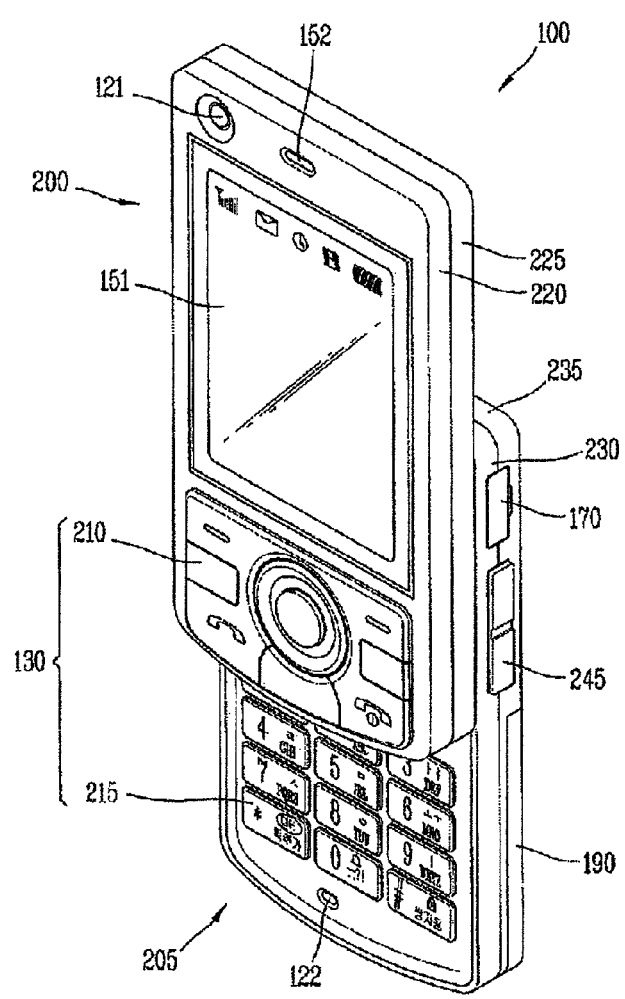
FIG. 2 is a front perspective view of a mobile terminal implementing an embodiment of the present invention.

FIG. 2 is a front perspective view of a mobile terminal according to an embodiment of the present invention. As shown, the mobile terminal 100 includes a first body 200, and a second body 205 configured to slidably cooperate with the first body 200 in at least one direction. For a folder-type mobile terminal, the mobile terminal 100 may include the first body 200, and the second body 205 configured to have at least one side folded or unfolded with respect to the first body 200.

Also, the first body 200 is positioned over the second body 205 in a manner that the second body 205 is obscured by the first body 200. This state can be referred to as a closed configuration (position). As illustrated in FIG. 2, the state where the first body 200 exposes at least part of the second body 205 can be referred to as an open configuration (position). In addition, when the mobile terminal is a folder-type mobile terminal including a first body and a second body having one side folded or unfolded with respect to the first body, the folded state of the second body can be referred to as the closed configuration, whereas the unfolded state of the second body can be referred to as the open configuration.

In addition, when the mobile terminal is a swing-type mobile terminal including a first body and a second body capable of being swung with respect to the first body, the state that the first body is overlapped with the second body can be referred to as the closed configuration whereas the state that the second body is swung thus to make the first body partially exposed can be referred to as the open configuration. Also, even though a specific description is not given of the folder-type mobile terminal and the swing-type mobile terminal with respect to FIGS. 2 and 3, it can be easily understood by those skilled in the art and thus a detailed description thereof will not be repeated.

In addition, the mobile terminal may be operable in a standby (idle) mode when in the closed configuration, but this mode can be released by the user's manipulation. Also, the mobile terminal may be operable in an active (phone call) mode in the open configuration. This mode may also be changed into the idle mode according to the user's manipulation or after a certain time elapses. As shown in FIG. 2, a case (housing, casing, cover, etc.) forming the outside of the first body 200 is formed by a first front case 220 and a first rear case 225. In addition, various electronic components may be disposed in a space between the first front case 220 and the first rear case 225. One or more intermediate cases may additionally be disposed between the first front case 220 and the first rear case 225.

Further, the cases can be formed of resin in a manner of injection molding, or formed using metallic materials such as stainless steel (STS) and titanium (Ti). Also, a display 151, an audio output module 152, a camera 121 or a first user input unit 210 may be disposed at the first front case 220 of the first body 200. In addition, the display 151 may include LCD, OLED, and the like, which can visibly display information. The display 151 and a touchpad can also be layered with each other such that the display 151 can be configured to function as a touch screen so as to allow a user to input information in a touching manner.

Further, the audio output module 152 may be implemented as a speaker, and the camera 121 may be implemented to be suitable for a user to capture still images or video. In addition, like the first body 200, a case configuring the outside of the second body 205 may be formed by a second front case 230 and a second rear case 235. Also, the second user input unit 215 may be disposed at the second body 205, and in more detail, at a front face of the second front case 230. A third user input unit 245, a microphone 122 and an interface unit 170 may also be disposed either at the second front case 230 or at the second rear case 235.

Further, the first to third user input units 210, 215 and 245 may be referred to as a user input unit 130. Any tactile manner that a user can touch, e.g., the display 151, for manipulation can be employed for the user input unit 130. For example, the user input unit 130 can be implemented as a dome switch or touchpad which a user can input information in a pushing or touching manner, or implemented in a manner of using a wheel, a jog or a joystick to rotate keys.

Regarding each function, the first user input unit 210 can be used for inputting commands such as START, END, SCROLL or the like, and the second user input unit 215 can be used for inputting numbers, characters, symbols, or the like. The first user input unit 210 may also include so-called soft keys used in cooperation with icons displayed on the display module 151, and navigation keys (usually composed of four navigation keys and a central key) for indicating and confirming an orientation. Also, the third user input unit 245 can be operated as a hot key for activating a specific function within the mobile terminal, and the microphone 122 may be implemented to be suitable for receiving user's voice or various sounds.

In addition, the interface unit 170 may be used as a passage through which the terminal related to the present invention can exchange data or the like with an external device. For example, the interface unit 170 may be implemented as one of a wired/wireless connection port for connecting an earphone to the mobile terminal, a port for short-range communications (e.g., an Infrared Data Association (IrDA) port, a BLUETOOTH port, a wireless LAN port, etc.), power supply ports for providing power to the mobile terminal, or the like.

The interface unit 170 can be a card socket for receiving an external card, such as a Subscriber Identity Module (SIM), a User Identity Module (UIM), a memory card for storing information, or the like. The power supply 190 may be disposed at a side of the second rear case 235 to provide power to the mobile terminal, and may be a rechargeable battery, for example, to be attachable/detachable for charging.

Figure 3:
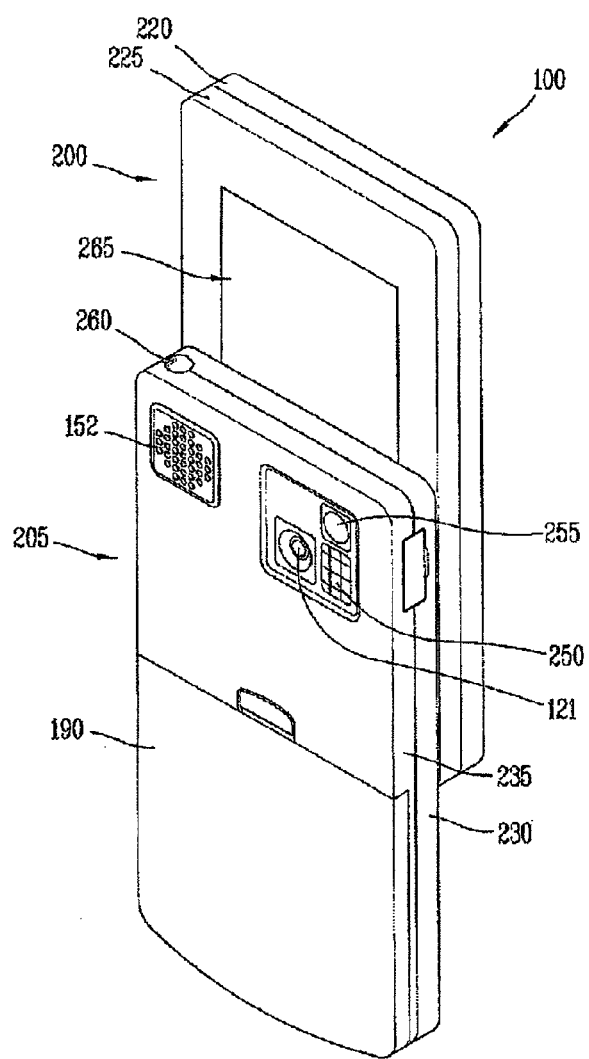
FIG. 3 is a rear perspective view of a mobile terminal implementing an embodiment of the present invention.

Next, FIG. 3 is a rear perspective view of the mobile terminal according to an embodiment of the present invention. As illustrated in FIG. 3, a camera 121 may further be disposed at a rear face of the second rear case 235 of the second body 205. In addition, the camera 121 of the second body 205 faces a direction which is opposite to a direction faced by the camera 121 of the first body 200, and may have different pixels from those of the camera 121 of the first body 200.

For example, the camera 121 of the first body 200 may operate with relatively lower pixels (lower resolution). Thus, the camera 121 of the first body 200 may be useful when a user can capture his face and send it to another party during a video call or the like. On the other hand, the camera 121 of the second body 205 may operate with a relatively higher pixels (higher resolution) such that it can be useful for a user to obtain higher quality pictures for later use. Also, a flash 250 and a mirror 255 may additionally be disposed adjacent to the camera 121 of the second body 205. The flash 250 operates in conjunction with the camera 121 of the second body 250 when taking a picture using the camera 121 of the second body 205. In addition, the mirror 255 can cooperate with the camera 121 of the second body 205 to allow a user to photograph himself in a self-portrait mode.

The second rear case 235 may further include an audio output module 152. Also, the audio output module 152 of the second body 205 can cooperate with the audio output module 152 of the first body 200 to provide stereo output. In addition, the audio output module 152 may be configured to operate as a speakerphone. A broadcast signal receiving antenna 260 may also be disposed at one side of the second rear case 235, in addition to an antenna for communications. The antenna 260 can be configured to retract into the second body 205. One part of a slide module 265 which allows the first body 200 to be slidably coupled to the second body 205 may be disposed at the first rear case 225 of the first body 200.

Further, the other part of the slide module 265 may be disposed at the second front case 230 of the second body 205, such that it may not be exposed to the exterior as illustrated in the drawing of the present invention. As such, it has been described that the camera 121 is disposed at the second body 205; however, the present invention may not be limited to the configuration. For example, it is also possible that one or more of those components (e.g., 260, 121-250, 152, etc.), which have been described to be implemented on the second rear case 235, such as the camera 121, will be implemented on the first body 200, particularly, on the first rear case 225. In this configuration, the component(s) disposed on the first rear case 225 can be protected by the second body 205 in a closed position of the mobile terminal. In addition, without the camera 121 of the second body 205, the camera 121 of the first body 200 can be implemented to be rotatable so as to rotate up to a direction which the camera 121 of the second body 205 faces.

The mobile terminal 100 of FIGS. 1 to 3 may also be configured to operate within a communication system which transmits data via frames or packets, including both wireless and wireline communication systems, and satellite-based communication systems. Hereinafter, a communication system within which the mobile terminal related to the present invention can operate will be described with reference to FIG. 4. Such communication systems utilize different air interfaces and/or physical layers. Examples of such air interfaces utilized by the communication systems include Frequency Division Multiple Access (FDMA), Time Division Multiple Access (TDMA), Code Division Multiple Access (CDMA), and Universal Mobile Telecommunications System (UMTS), the Long Term Evolution (LTE) of the UMTS, the Global System for Mobile Communications (GSM), and the like. By way of non-limiting example only, further description will relate to a CDMA communication system, but such teachings apply equally to other system types including the CDMA wireless communication system.

Figure 4:
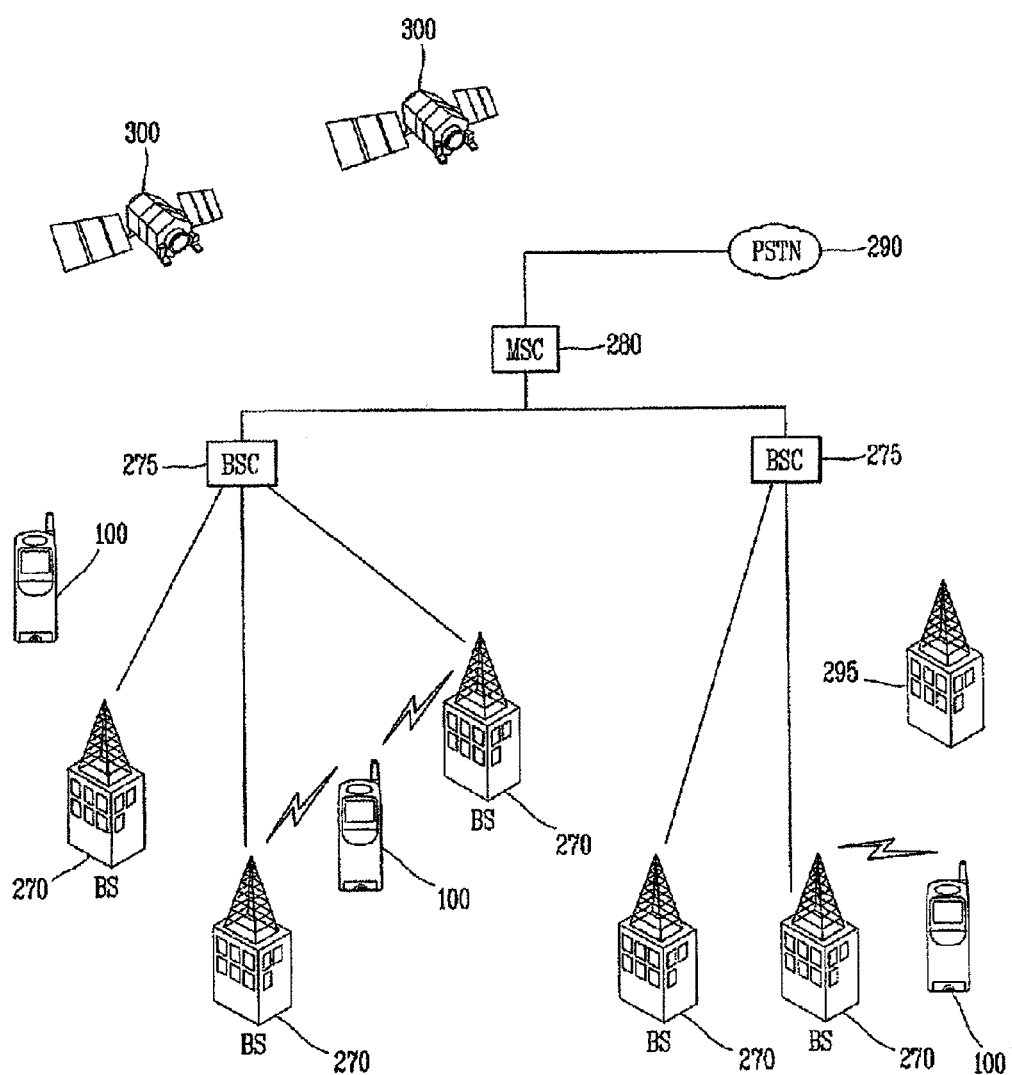
FIG. 4 is a block diagram of a wireless communication system with which the mobile terminal according to an embodiment of the present invention is operable.

Referring now to FIG. 4, a CDMA wireless communication system is shown having a plurality of mobile terminals 100, a plurality of base stations (BSs) 270, base station controllers (BSCs) 275, and a mobile switching center (MSC) 280. The MSC 280 is configured to interface with a conventional Public Switch Telephone Network (PSTN) 290. The MSC 280 is also configured to interface with the BSCs 275. The BSCs 275 are coupled to the base stations 270 via backhaul lines. The backhaul lines may be configured in accordance with any of several known interfaces including, for example, E1/T1, ATM, IP, PPP, Frame Relay, HDSL, ADSL, or xDSL. Hence, the plurality of BSCs 275 can be included in the system as shown in FIG. 4.

Each base station 270 may include one or more sectors, each sector having an omni-directional antenna or an antenna pointed in a particular direction radially away from the base station 270. Alternatively, each sector may include two or more different antennas. Each base station 270 may be configured to support a plurality of frequency assignments, with each frequency assignment having a particular spectrum (e.g., 1.25 MHz, 5 MHz, etc.).

The intersection of sector and frequency assignment may be referred to as a CDMA channel. The base stations 270 may also be referred to as Base Station Transceiver Subsystems (BTSs). In some instances, the term "base station" may be used to refer collectively to a BSC 275, and one or more base stations 270. The base stations may also be denoted as "cell sites." Alternatively, individual sectors of a given base station 270 may be referred to as cell sites. A broadcasting transmitter (BT) 295, as shown in FIG. 4, transmits a broadcast signal to the mobile terminals 100 operating within the system. The broadcast receiving module 111 (FIG. 1) can also be configured inside the mobile terminal 100 to receive broadcast signals transmitted by the BT 295.

FIG. 4 further depicts several Global Positioning System (GPS) satellites 300. Such satellites 300 facilitate locating the position of at least one of plural mobile terminals 100. Two satellites are depicted in FIG. 4, but it is understood that useful position information may be obtained with greater or fewer satellites than two satellites. The GPS module 115 (FIG. 1) can also be configured to cooperate with the satellites 300 to obtain desired position information. It is to be appreciated that other types of position detection technology, (i.e., location technology that may be used in addition to or instead of GPS location technology) may alternatively be implemented. If desired, at least one of the GPS satellites 300 may alternatively or additionally be configured to provide satellite DMB transmissions.

During an operation of the wireless communication system, the base stations 270 receive sets of reverse-link signals from various mobile terminals 100. The mobile terminals 100 are engaging in calls, messaging, and executing other communications, and each reverse-link signal received by a given base station 270 is processed within that base station 270. The resulting data is then forwarded to an associated BSC 275. Further, the BSC 275 provides call resource allocation and mobility management functionality including the orchestration of soft handoffs between base stations 270. The BSCs 275 also route the received data to the MSC 280, which then provides additional routing services for interfacing with the PSTN 290. Similarly, the PSTN 290 interfaces with the MSC 280, and the MSC 280 interfaces with the BSCs 275, which in turn control the base stations 270 to transmit sets of forward-link signals to the mobile terminals 100.

Operations and functions of mobile terminals according to the present invention will now be described from the perspective of their configurations and interfacing methods.

Configuration of a Mobile Terminal According to an Embodiment of the Present Invention A mobile terminal according to an embodiment of the present invention will be divided, according to a structure of a display, into a mobile terminal having a dual display and a mobile terminal having a single display. In more detail, FIG. 5 shows various types of mobile terminals each having the single display, and FIG. 6 shows various types of mobile terminals each having the dual display. Each mobile terminal having the dual display and the single display as shown in FIGS. 5 and 6 may be applicable to various types of mobile terminals, including folder-type (a), flip-type (b), slide-type (c), bar-type (d), rotating-type (e) (e.g., swivel-type or swing-type), watch-type (f), or the like.

Hereinafter, a mobile terminal having the single or dual display may have a transparent display. In addition, a non-transparent display may further be provided. The transparent display and the non-transparent display may be configured to be overlapped with each other or be separately provided. That is, the single display shown in FIG. 5 may be configured as one display module having the transparent display and the non-transparent display being overlapped with each other or be implemented only with the transparent display, whereas the dual display shown in FIG. 6 may be configured to have the transparent display and the non-transparent display separately provided.

In addition, in all embodiments, the transparent display may be defined as a Transparent OLED (TOLED), and the non-transparent display may be defined as the display module 151 or a Liquid Crystal Display (LCD). However, the transparent and non-transparent displays are not limited to the TOLED and the LCD, respectively. Also, the transparent display may be a permeable display having both displayable surfaces (e.g., inner surface-outer surface, or lower surface-upper surface). Further, the embodiments disclosed in the present invention may be applied to all types of mobile terminal; however, depending on embodiments, a certain type of mobile terminal may be illustrated, which is appropriate for the sake of explanation.

Dual Display—Folder-Type Mobile Terminal

FIGS. 7A and 7B are overviews of a folder-type mobile terminal having a dual transparent display according to an embodiment of the present invention, which shows a mobile terminal having variable directions to display information according to a posture of the mobile terminal. As shown in FIGS. 7A and 7B, a folder-type mobile terminal according to an embodiment of the present invention may be configured such that a TOLED 154 is disposed at a folding portion 410 and a LCD 151 is disposed at a main body portion 400. Further, the LCD 151 may operate as a main display and the TOLED 154 may operate as a sub display.

Such positions of the TOLED 154 and the LCD 151 may also be changed, and accordingly, their functions as the main and sub displays may also be changed. For example, under the open position of the folding portion 410, the TOLED 154 may serve as a main display while the LCD 151 may serve as a sub display. Also, the LCD 151 can display an interactive keypad in one embodiment. In addition, under the closed state of the folding portion 410 of the mobile terminal, if the TOLED 154 independently operates, the operation of the LCD 151 at the main body portion 400 can be blocked such that it cannot interrupt the displaying of the TOLED 154.

Further, the TOLED 154 and the LCD 151 may be overlapped by a touchpad on any one of their upper or lower surface, so as to be useable as touch screens. Hereinafter, although not separately mentioned in every embodiment of the present invention, it is assumed that the TOLED 154 and the LCD 151 function as a touch screen. Also, the folder-type mobile terminal may be configured for its folding portion to be folded (closed) or unfolded (opened) in a vertical direction (i.e., up and down direction) or in a horizontal direction (i.e., right and left direction), according to its posture (i.e., its rotational direction). Thus, the mobile terminal may detect its posture (i.e., the rotational direction) and also rotate information output on the TOLED 154 or the LCD 151 for output according to its detected posture (i.e. the rotational direction).

In addition, FIG. 7A is an overview illustrating a method for displaying information when the folding portion 410 is open or closed in the vertical direction, and FIG. 7B is an overview illustrating a method for displaying information when the folding portion 410 is open or closed in the horizontal direction. Further, FIG. 8 is an overview of a folder-type mobile terminal having a dual transparent display according to an embodiment of the present invention, which shows a mobile terminal further having a keypad and a display. Also, the mobile terminal shown in FIG. 8 may be configured such that TOLED 154 is disposed at the folding portion 410 and the LCD 151 and keypad of the user input unit 130 are disposed at the main body portion 400. The TOLED 154 may also operate as a main display.

Preferably, the TOLED 154 serving as the main display executes and displays most of functions and operations of the mobile terminal including a multimedia function and communication function. On the other hand, the LCD 151 at the main body portion 400 executes operations associated with the keypad of the user input unit 130 and calls. When the TOLED 154 independently operates under the closed state of the folding portion 410, the emission of backlights in a dome keypad may preferably be prevented, so as to protect the displaying of the TOLED 154 from the interference of the emission.

FIG. 8(*a*) is a perspective view of a front face of the folder-type mobile terminal having a transparent display according to an embodiment of the present invention, and FIG. 8(*b*) is a perspective view of a rear face thereof. Further, FIG. 9 is an overview of a mobile terminal having a dual transparent display according to an embodiment of the present invention, which shows a mobile terminal having a folding portion rotatable by 360°.

Also, the mobile terminal shown in FIG. 9 may be configured to have the TOLED 154 disposed at the folding portion 410 and the LCD 151 and keypad 131 of the user input unit 130 both disposed on the main body portion 400. Also, the TOLED 154 and the LCD 151 can display various types of information by dividing them according to their purposes of use. For instance, the TOLED 154 may display as the main display information related to most of the functions and operations executed in the mobile terminal as well as the multimedia function and the communication function, while the LCD 151 may display as the sub display telephone numbers input for placing a call or additional information.

Further, the mobile terminal according to this embodiment can implement a dual look by configuring a hinge 402 disposed between the folding portion 410 and the main body portion 400 to be rotatable by 360°. That is, as shown in FIGS. 9(*a*) to 9(*d*), the mobile terminal can be folded by rotating the main body portion 400 by 360° centering around the hinge 402.

Next, FIG. 10 is an overview of a mobile terminal having a dual transparent display according to an embodiment of the present invention, which shows the mobile terminal being capable of photographing in a state of a folder being closed. As shown, the mobile terminal may be configured such that TOLED 154 is disposed at the folding portion 410 and the LCD 151 and keypad 131 of the input unit 130 are both disposed at the main body portion 400. Further, the TOLED 154 may operate as a main display and the LCD 151 may operate as a sub display. For example, the TOLED 154 serving as the main display can display information related to most of the functions and operations of the mobile terminal including the multimedia function and communication function, while the LCD 151 can display a telephone number input for placing a call on the keypad and additional information such as an indicator.

In addition, the mobile terminal may further be provided with the camera 121 disposed between the LCD 151 and the keypad 131. By disposing the camera 121 between the LCD 151 and the keypad 131, a user can photograph an object to be taken or photograph himself in a self-portrait mode not only in the open sate of the folding portion 410 but also in the closed state. This is because the photographing operation can be executed through the TOLED 154.

Also, in the closed state of the folding portion 410, the camera 121 is located at a central portion of the rear side of the TOLED 154. Hence, assuming as mentioned above that a video call is attempted in the closed state of the folding portion 410, another party's image is displayed on the TOLED 154, and the camera 121 is located at the rear side of the other party's image displayed on the TOLED 154. Accordingly, when the user faces the other party's image displayed on the TOLED 154, an effect is generated as if the user directly faces the camera 121. Therefore, the controller 180 can send the user's face image to the other party's terminal by using the camera 121. Thus, the other party can feel like they are directly talking with the user. That is, because the parties are looking directly into the cameras when they are conducting a video call between each other, the parties feel as if they are directly talking to each other.

In another embodiment, a bar-type mobile terminal can be configured such that the camera 121 is disposed at a central portion of a lower side of the TOLED 154 and an object viewed through the TOLED 154 can be photographed. Here, an image (interference image) displayed on the TOLED 154 may be photographed together with the object. In this instance, such image of the object can be compensated using preset compensation data. If the interference image is included in the image of the object by more than a certain reference, the transparency of the TOLED 154 increases such that the interference image can be reduced by a compensatable level.

Also, when using a self-portrait mode, the mobile terminal having the TOLED 154 may be configured to display a preview image of the camera 121 on a non-overlapped portion between the camera 121 and the TOLED 154. For example, when a folding portion having the TOLED 154 is slid up to operate a self-portrait mode in a slide-type mobile terminal, the preview image can be displayed on the slid-up portion of the TOLED 154.

In addition, if other information (e.g., multimedia image information) is being displayed on the TOLED 154, the controller 180 can simultaneously display both the multimedia image information and the preview image of the camera 121 by adjusting the transparency and color of the TOLED 154. Further, an image to be displayed on the TOLED 154 can manually be changed by the user's input. Also, to receive the user's input, the mobile terminal may include a sensor for detecting information such as an inclination, touching, key input, pressure, proximity, voice or the like.

Next, FIG. 11 is an overview of a mobile terminal having a dual transparent display according to an embodiment of the present invention, which shows a method for controlling a size of information output in cooperation with the opening or closing of a folding portion.

Further, as shown, the TOLED 154 is disposed on the folding portion 410 and the LCD 151 is disposed on the main body portion 400. Also, each of the TOLED 154 and the LCD 151 may be obscured by a touchpad on their upper surface or a lower surface, so as to operate as a touch screen. As discussed above, any one of the TOLED 154 or LCD 151 may serve as a main display, and the other as a sub display. For example, the TOLED 154 may be used to display menu information for displaying operational states of the mobile terminal or to control a multimedia playback under the closed state of the mobile terminal. Also, the TOLED 154 may serve as a sub display to assist a main display (e.g., LCD 151) according to various scenarios of user interfaces under the open state of the mobile terminal.

FIGS. 12A and 12B are overviews illustrating a swivel-type mobile terminal having a dual transparent display according to an embodiment of the present invention. As shown in FIGS. 12A and 12B, the swivel-type mobile terminal may be separately provided with the TOLED 154 and LCD 151. Similar to the different types of mobile terminals having the dual display as above, the TOLED 154 and the LCD 151 may serve respectively as main display and sub display so as to display different information from each other.

For example, the TOLED 154 may be used as the main display in the open state of the folding portion 410, the LCD 151 may serve as the sub display to display a keypad in a software configuration. Also, as shown in FIGS. 12A and 12B, the mobile terminal may have a swivel hinge 403 that allows the folding portion 410 to be rotated or moved to a certain angle (or position).

Dual Display—Flip-Type Mobile Terminal

FIG. 13 is an overview illustrating a flip-type mobile terminal having a dual transparent display according to an embodiment of the present invention. As shown in FIG. 13, the flip-type mobile terminal may be configured such that a keypad is disposed on a flip portion 510 and the TOLED 154 and LCD 151 are all disposed on a main body portion 500. Further, the TOLED 154 and the LCD 151 may operate as any of a main display or a sub display. For example, for displaying various information related to the mobile terminal (e.g., a current time, absent calls, message received, additional service related information, and the like) on the TOLED 154, a user can check such information on any portion of a front or rear surface of the mobile terminal even in the closed state.

Next, FIG. 14 is an overview illustrating another embodiment of the flip-type mobile terminal of FIG. 13, in which a separate sub-keypad 511 may be disposed on an outer surface of the flip portion 510. Such arrangement of the sub-keypad 511 on the outer surface of the flip portion 510 allows the user to control the operation of the mobile terminal with reference to information displayed on the TOLED 154 even in the closed state of the flip portion 510.

Further, FIG. 15 is another overview illustrating the flip-type mobile terminal of FIG. 13. As shown in FIG. 15, the TOLED 154 is disposed on the flip portion 510 and the LCD 11 is disposed on the LCD 151. The TOLED 154 and the LCD 151 may operate as any of a main display or a sub display. For example, assuming that the TOLED 154 operates as a main display in the open state of the flip portion 510, the LCD 151 serves as a sub display so as to display a keypad in a software configuration.

Also, if the TOLED 154 operates as a sub display in the closed state of the flip portion 510, the TOLED 154 can display, for example, a software key for manipulating the mobile terminal, an operational state of the mobile terminal, wireless (radio) information transmitted/received to/from the mobile terminal, and various additional information (e.g., current time, absent calls, message received, additional service related information, and the like).

Dual Display—Slide-Type Mobile Terminal

Figure 16:
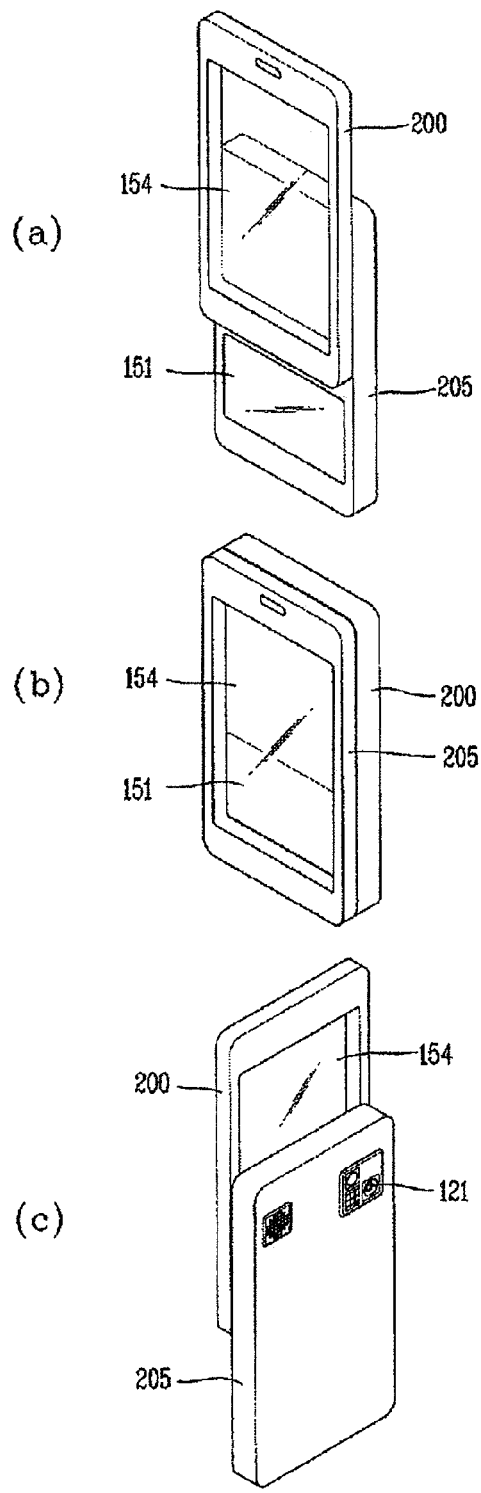
FIG. 16 is an overview of a mobile terminal having a dual transparent display according to an embodiment of the present invention, which shows a method of displaying information on the transparent display in cooperation with opening or closing of a sliding portion of the mobile terminal.

FIG. 16 is an overview illustrating a mobile terminal having a dual transparent display according to an embodiment of the present invention, which shows a method for displaying information on a transparent display in cooperation with the opening or closing of a sliding portion of the mobile terminal.

As shown in FIG. 16, the slide-type mobile terminal may be configured to have TOLED 154 disposed on a first body 200 and the LCD 151 disposed on a second body 205. Further, the TOLED 154 and the LCD 151 may operate as any of a main display or a sub display, and each can display various different types of information. As one example, when the user photographs himself in a self-portrait mode, the user can easily do photograph himself based upon image information output on the TOLED 154.

For example, previously, the user had to photographed himself in the self-portrait mode by using a mirror disposed adjacent to a camera. However, in the embodiment of the present invention, as shown in FIG. 16(c), an image reflected on the camera 121 can be output as a preview image on a partial display region of the TOLED 154 (e.g., a display region seen from the rear side of the mobile terminal when being slid up). Hence, the user can photograph himself more easily by viewing an image displayed on the TOLED 154. Also, as shown in FIG. 16(a), the TOLED 154 transmits an image output on the LCD 151 when the sliding portion is in the closed state. Accordingly, even in the closed state of the sliding portion, it is possible to output and control basic information required to control the mobile terminal.

Dual Display—Bar-Type Mobile Terminal

Figure 17:
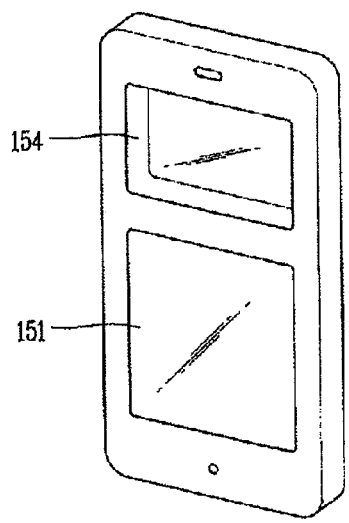
FIG. 17 is an overview of a bar-type mobile terminal having a dual transparent display according to an embodiment of the present invention.

FIG. 17 is an overview illustrating a bar-type mobile terminal having a dual transparent display according to an embodiment of the present invention. As shown in FIG. 17, the bar-type mobile terminal may be configured to have the TOLED 154 disposed on an upper portion of a terminal body and the LCD 151 disposed on a lower portion thereof. Further, the TOLED 154 and the LCD 151 may operate as any of a main display or a sub display, and each can display various different types of information.

Figure 18:
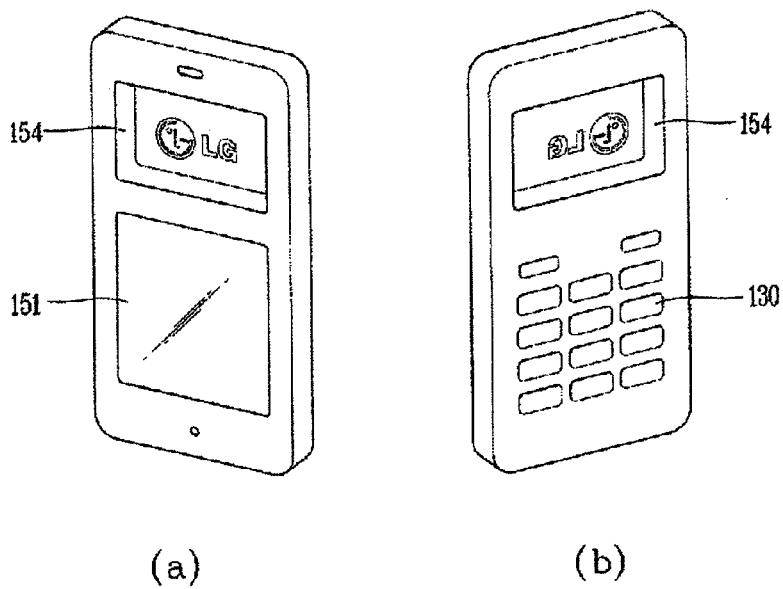
FIG. 18 is an overview of a mobile terminal configured such that the rear surface of the bar-type mobile terminal of FIG. 17 can be used.

FIG. 18 is an overview of another embodiment of the bar-type mobile terminal of FIG. 17, in which the mobile terminal is configured such that its rear surface can be used as another type of mobile terminal. As shown in FIG. 18, the mobile terminal may be configured such that the LCD 151 is disposed below the TOLED 154 on a front surface of the mobile terminal and the keypad 131 is disposed below the TOLED 154 on a rear surface of the mobile terminal. Further, information displayed on the TOLED 154 is provided in order to represent that the information displayed on the front surface of the TOLED 154 is transmitted and displayed on the rear surface. Such information may be displayed by converting or rotating a displaying direction according to the user's manipulation.

Watch-Type Mobile Terminal

Figure 19:
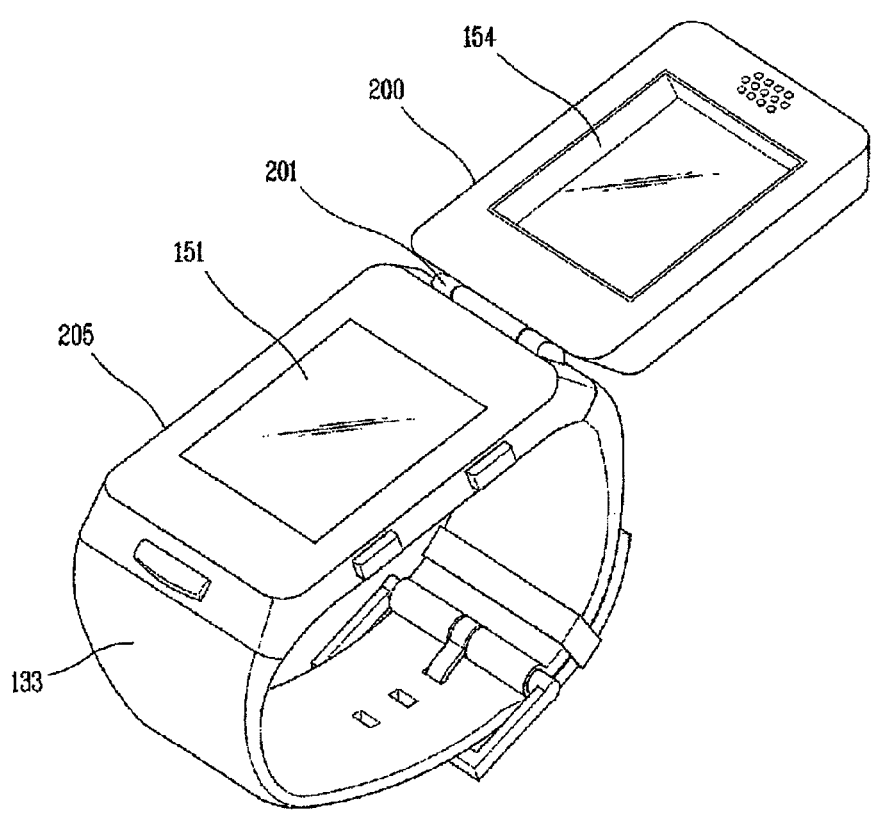
FIG. 19 is an overview of a watch-type mobile terminal having a single transparent display according to an embodiment of the present invention.

FIG. 19 is an overview illustrating a watch-type mobile terminal having a dual transparent display according to an embodiment of the present invention. As shown FIG. 19, the watch-type mobile terminal may include the second body 205 having a watchstrap 133 connected thereto and having the LCD 151, and the first body 200 connected to one side of the second body 205 by a hinge 201 to be open or closed and having the TOLED 154. Hereinafter, the first body 200 may also be referred to as a cover.

Similar to the different types of mobile terminals having the dual display as discussed above, the TOLED 154 and the LCD 151 may operate as any of a main display or a sub display, and each can display various different types of information. Also, because the TOLED 154 is transparent, it can transmit information displayed on the LCD 151 in the closed state of the cover so as to output such information thereon, namely, the first body 200. Also, in the open state of the first body 200, the TOLED 154 and the LCD 151 can display different information from each other. Further, in the open state of the first body 200, the TOLED 154 and the LCD 151 may be used either as displays or keypads.

Single Display—Folder-Type Mobile Terminal

FIG. 20 is an overview illustrating a folder-type mobile terminal having a single transparent display according to an embodiment of the present invention. As shown in FIG. 20, the mobile terminal may be configured to have the TOLED 154 disposed on the folding portion 410 and the keypad 131 disposed on the main body portion 400. The keypad 131 may also be configured as a dome key or have backlights (not shown). Thus, when the folding portion 410 is in the open state, a user can input information by pressing the keypad 131. Conversely, when the folding portion 410 is in the closed state, the user can input information by touching keys on corresponding positions with referring to the positions of the keys on the keypad 131, which is viewable by being transmitted through the TOLED 154.

Next, FIG. 21 is an overview illustrating an information input method in a folder-type mobile terminal having a single transparent display according to an embodiment of the present invention. As shown in FIG. 21, the mobile terminal may be configured to have the TOLED 154 disposed on the folding portion 410 and a keypad or touchpad 155 disposed on the main body portion 400. Further, the TOLED 154 may operate as a touch screen with a touchpad (or touch film) attached on its upper surface or lower surface. In addition, the keypad may include dome keys, or be configured as a printed pattern having various key-like patterns (e.g., numeral keys, navigation keys, symbol keys, character keys, and the like). Also, the keypad or touchpad 155 may be provided with backlights. The backlights may be configured by using Light Emitting Diodes (LEDs) or an Electroluminescence Sheet (EL).

Further, the backlight may automatically be driven by the controller 180 according to the user's manipulation or the opening/closing operation of the folding portion 410. For example, when the folding portion is closed while specific information is being displayed on the TOLED 154, the backlights may not be driven in order to prevent the keypad from being transmitted as a background. Also, in order to prevent the keypad from being transmitted as a background even when the backlights are not driven, the keypad or touchpad 155 may preferably be implemented to be flat or with a dark color. On the other hand, in the open state of the folding portion 410, the user can input information by touching the keypad or touchpad 155. That is, the user can touch the touchpad 155 to input cursive letters or to perform a touch and drag operation when the backlight is not driven.

Next, FIG. 22 is an overview illustrating a configuration of a keypad on a folder-type mobile terminal having a single transparent display according to an embodiment of the present invention. As shown in FIG. 22, the mobile terminal may be configured such that the TOLED 154 is disposed on the folding portion 410. Also, the touchpad 155, various key patterns 156 and an EL 157 for backlights are disposed on the main body portion 400.

In addition, the EL 157 may be a material emitting light onto a space to which an electrical force can come up to. Also, an EL Sheet is a planar light source in a paper form based on EL, and has many advantages that neon or phosphor does not have. As a material in a form of flexible thin-film, it requires low power consumption and can be cut in various forms suitable for applications. Also, the input unit 130 uses multi-layered EL sheets to activate EL sheets suitable for each backlight control algorithm. For example, the EL sheet may be configured as a key pattern combining numeral keys and navigation keys, a symbol key pattern, QWERTY key pattern, and the like. The controller 180 can then activate one of such key patterns according to the user's control or a preset backlight control algorithm. The input unit 130 using the EL sheets may also be implemented by a keypad or by a touchpad.

FIG. 23 is an overview illustrating a folder-type mobile terminal having a transparent display according to an embodiment of the present invention, which shows a configuration of the mobile terminal in which information displayed on one surface of the transparent display can be restricted. As shown in FIG. 23(a), the mobile terminal may be configured such that the TOLED 154 is disposed on the folding portion 410 and the input unit 130 using a dome keypad, touch keypad, EL sheets or the like is disposed on the main body portion 400.

In the closed state of the mobile terminal, the folding portion 410 is designed to expose part of the TOLED 154 as shown in FIG. 23(b). Thus, the part of the TOLED 154 can be exposed to the user. Further, the folding portion 410 according to this embodiment may be provided with the TOLED 154 on both surfaces (i.e., inner surface and outer surface) such that displaying information can be executed both in the open and closed states of the mobile terminal.

FIG. 24 is an overview illustrating a swivel-type mobile terminal having a single transparent display according to an embodiment of the present invention. As shown in FIG. 24, the swivel-type mobile terminal may be configured with the TOLED 154 and the keypad 131 separately disposed and the swivel hinge 403 connecting the folding portion 410 to the main body portion 400. The swivel hinge 403 allows the folding portion 410 to be rotated or moved to a certain angle (or position).

Further, the controller 180 can change a displaying direction of information output on the TOLED 154 according to the rotation of the folding portion 410. In addition, the TOLED 154 is allowed to display on both surfaces thereof. Accordingly, the controller 180 can allow information, which is displayed on a front surface (first surface) of the TOLED 154, to be displayed on a rear surface (second surface) thereof, according to the rotation of the folding portion 410 or the opening/closing of the folding portion 410.

Single Display—Slide-Type Mobile Terminal

Figure 25:
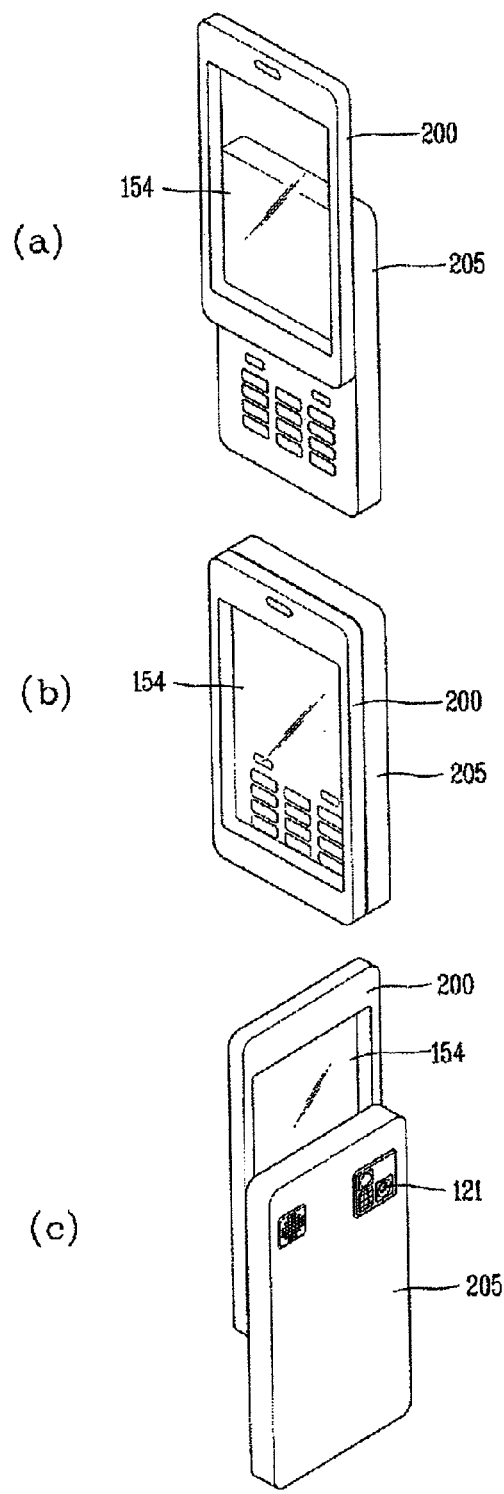
FIG. 25 is an overview of a slider-type mobile terminal having a single transparent display according to an embodiment of the present invention, which shows an information displaying method on the transparent display in cooperation with opening or closing of a sliding portion of the mobile terminal.

FIG. 25 is an overview of a slide-type mobile terminal having a single transparent display according to an embodiment of the present invention, which shows a method for displaying information on the transparent display in cooperation with the opening or closing of a sliding portion. As shown in FIG. 25, the slide-type mobile terminal may be configured to have the TOLED 154 disposed on the first body 200 and the keypad 131 disposed on the second body 205. Also, the camera 121 is disposed at a rear surface of the second body 205.

Thus, when a user wants to photograph himself or herself using the camera 121 disposed at the rear surface, the controller 180, as shown in FIG. 25(c), can output an image reflected on the camera 121 as a preview image on a partial display region of the TOLED 154 (i.e., a display region exposed to the rear surface when the mobile terminal is slid open). Accordingly, the user can view his own image displayed on the TOLED 154 so as to photograph himself or herself more easily.

Also, as shown in FIG. 25(a), because the keypad 131 disposed on the second body 205 is transmitted through the TOLED 154 when the sliding portion is in the closed state, the user can input information by touching keys on corresponding positions and referring to the positions of the keys transmitted and displayed on the TOLED 154. As such, the basic operations of the mobile terminal can be controlled even in the closed state of the sliding portion.

Single Display—Bar-Type Mobile Terminal

Figure 26:
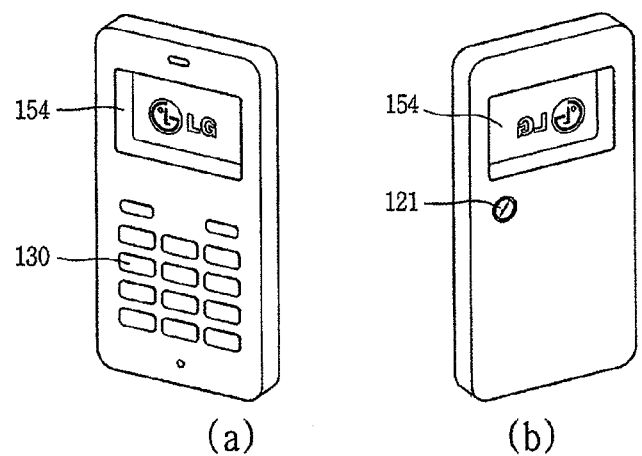
FIG. 26 is an overview of a bar-type mobile terminal having a single transparent display according to an embodiment of the present invention.

FIG. 26 is an overview illustrating a bar-type mobile terminal having a single transparent display according to an embodiment of the present invention. As shown in FIG. 26, the bar-type mobile terminal may be configured to have the TOLED 154 disposed at an upper portion of a front surface of a terminal body and the keypad 131 disposed at a lower portion thereof. The TOLED 154 is also exposed to the rear surface of the mobile terminal.

Figure 27:
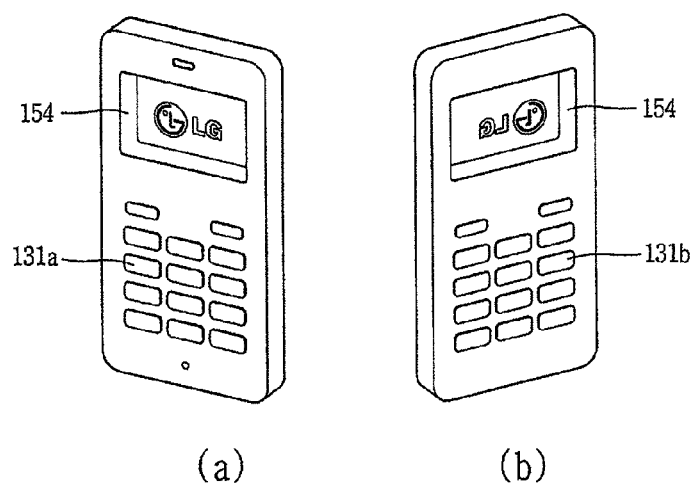
FIG. 27 is an overview of a bar-type mobile terminal having keypads at both surfaces of the mobile terminal of FIG. 26.

Therefore, as shown in FIG. 27, the keypad 131 may further be disposed below the TOLED 154 shown on the rear surface of the terminal body. Accordingly, when an error is generated on a keypad (e.g., 131*a*) on one surface, the user can use a keypad (e.g., 131*b*) on another surface. Further, the information displayed on the TOLED 154 is provided in order to represent that information displayed on the front surface of the TOLED 154 is transmitted and displayed on the rear surface thereof. Such information may be displayed on any one of both surfaces of the TOLED 154, according to a keypad which the user manipulates, or be displayed by converting or rotating its displaying direction.

Figure 28:
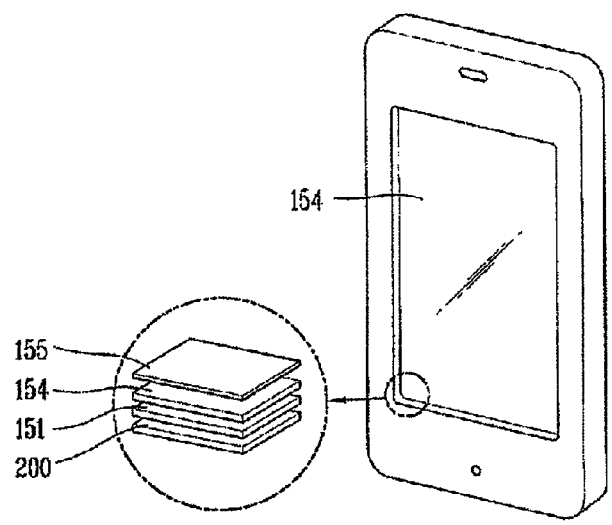
FIG. 28 is an overview showing a configuration of a single display configured by overlapping a transparent display with a non-transparent display.

Next, FIG. 28 is an overview illustrating a configuration of a single display obtained by overlapping a transparent display with a non-transparent display according to an embodiment of the present invention. In this description, a bar-type mobile terminal having such a single display will be described. As shown in FIG. 28, the single display may be configured as a single module in which the TOLED 154 is overlapped with the LCD 151.

Also, a touchpad (or a touch film) 155 may be attached to the upper surface of the module so as to be used as a touch screen. Further, the LCD 151 and TOLED 154 having such a single display may operate as one of a main display or sub display. That is, the LCD 151 and the TOLED 154 may display different information from each other or output the same information, and can make various visual effects according to a method for outputting such information. For example, when a user manipulates and outputs a menu or image, the image or menu can be shown with a cubic effect. In addition, the display may be applied not only to the bar-type mobile terminal but also every type of mobile terminal, such as folder-type, flip-type, slide-type, rotating-type (e.g., swivel-type, swing-type), or the like), or a watch-type.

Figure 29:
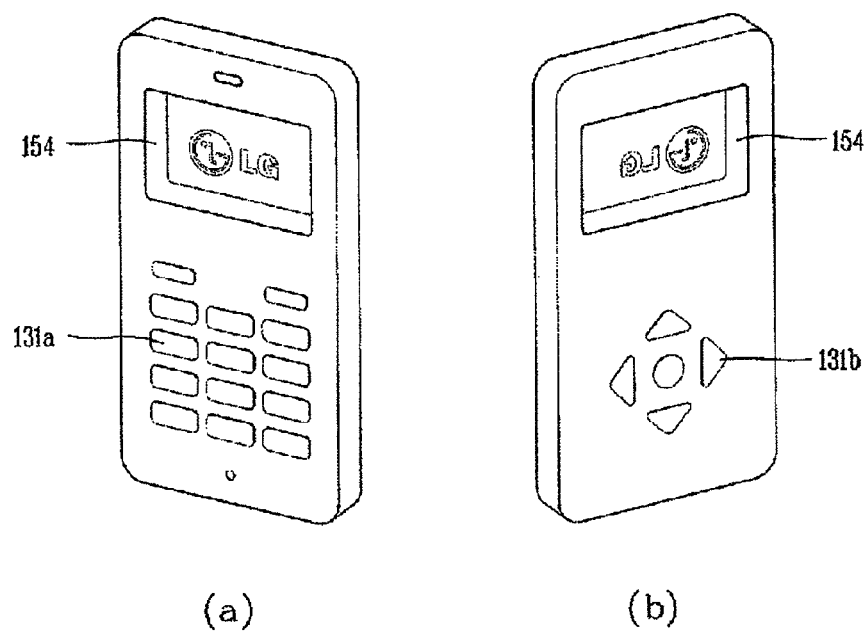
FIG. 29 is an overview of a bar-type mobile terminal having keypads with different functions at both surfaces of the mobile terminal of FIG. 26.

FIG. 29 is an overview of a bar-type mobile terminal having keypads with different functions disposed on both surfaces of the bar type mobile terminal of FIG. 26. As shown in FIG. 29, the mobile terminal is configured to have a first keypad 131*a* disposed below the TOLED 154 on a front surface of the mobile terminal, and a second keypad 131*b* disposed below the TOLED 154 on a rear surface of the mobile terminal. Further, information displayed on the TOLED 154 is provided in order to represent that information displayed on the front surface of the TOLED 154 is transmitted and displayed onto the rear surface thereof. Such information may be displayed by converting or rotating its displaying direction according to the user's manipulation.

In addition, the first keypad 131*a* may have keys for inputting letters and numerals and several short keys for allowing an immediate execution of certain functions. The second keypad 131*b* may have navigation keys and short keys for allowing an immediate execution of other certain functions. Also, the short keys may be disposed both on the first and second keypads 131*a* and 131*b*.

Accordingly, such keys having different functions can be disposed on both of the front and rear surfaces of the mobile terminal such that the keys can be arranged with wider intervals therebetween, which ensures a simple keypad configuration, thereby preventing key input errors. For example, communication functions can effectively be executed on the surface having the first keypad 131*a* (e.g., the keypad containing keys for letters and numerals), while various multimedia functions such as playing games can effectively executed on the surface having the second keypad 131*b* (e.g., the keypad containing navigation keys or function keys).

Watch-type Mobile Terminal

Figure 30:
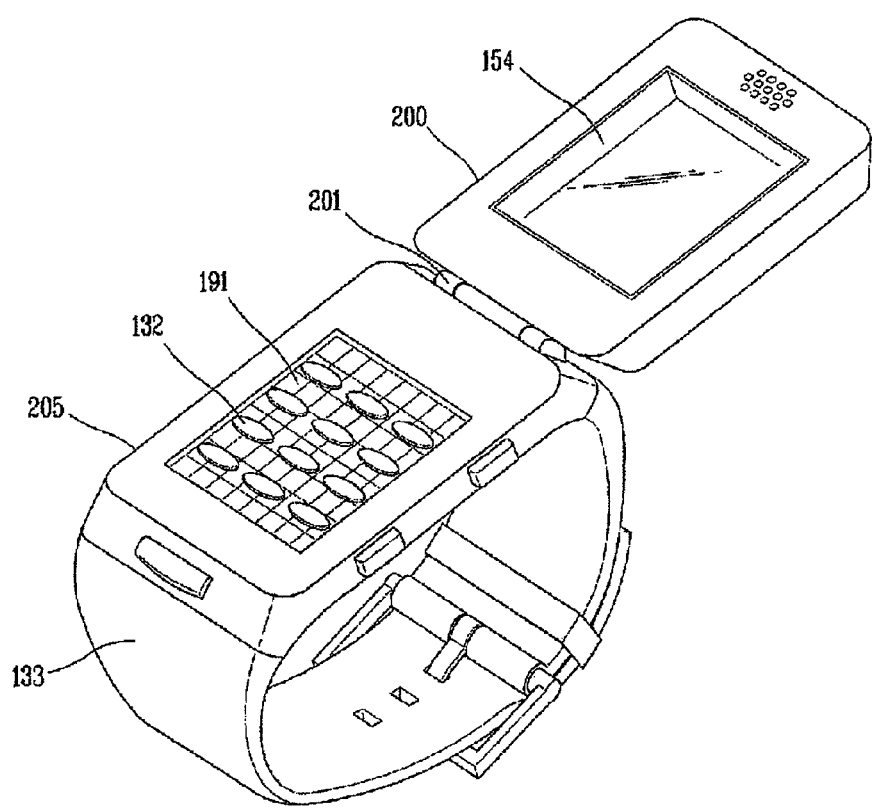
FIG. 30 is an overview of a watch-type mobile terminal having a single transparent display and a solar cell in a rear surface thereof according to an embodiment of the present invention.

FIG. 30 is an overview illustrating a watch-type mobile terminal having a single transparent display and a solar cell on a rear surface thereof according to an embodiment of the present invention. As shown in FIG. 30, the watch-type mobile terminal may include the second body 205 having a watchstrap 133 connected thereto and having a solar cell 191 disposed therein, and the first body 200 connected to one side of the second body 205 by the hinge 201 to be open or closed and having the TOLED 154. The first body 200 may also be referred to as a cover.

In addition, the solar cell 191 is disposed inside the second body 200, and the TOLED 154 is structurally disposed to cover the solar cell 191. The first body 200 having the TOLED 154 may be configured using a sliding unit or the hinge 201 such that one side of the TOLED 154 can be opened or closed with respect to the second body 205. Also, under the closed state of the first body 200, the controller 180 can receive a user's command input via a touchpad disposed on an upper portion (upper surface, upper end, outer side) of the TOLED 154.

In addition, dome keys 132 may be disposed on an upper portion of the solar cell 191. Thus, when the TOLED 154 is opened, the controller 180 can receive a command input by a user using the dome keys 132. The result of the command input using the dome keys 132 can be output on any one of both surfaces of the TOLED 154 according to the control of the controller 180. Further, the solar cell 191 can generate electricity by using light transmitted through the TOLED 154. Also, by arranging the solar cell 191 to receive light transmitted through the TOLED 154, a greater area of the solar cell 191 is ensured, resulting in an increase in an amount of electricity generated.

Figure 31:
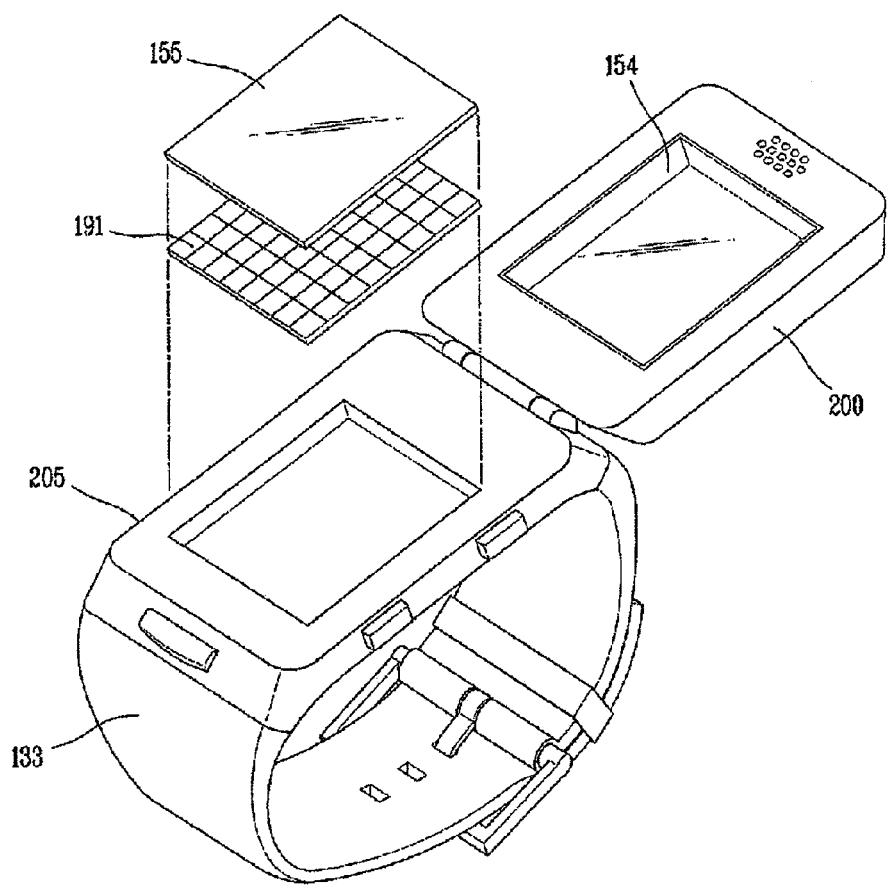
FIG. 31 is an overview of a mobile terminal having a touch pad at an upper surface of the solar cell of FIG. 30.

Next, FIG. 31 is an overview of a mobile terminal having a touchpad on an upper surface of the solar cell of FIG. 30. As shown in FIG. 31, the second body 205 may include the solar cell 191 therein, and a touchpad 155 is disposed on an upper surface of the solar cell 191. Also, the first body 200 having the TOLED 154 may be configured using a sliding unit or the hinge 201 such that at least one side thereof can be opened or closed with respect to the second body 205.

Further, because the solar cell 191 is configured to be structurally covered with the TOLED 154, the solar cell 191 can generate electricity by using light transmitted through the TOLED 154 even in the closed state of the first body 200. In addition, the controller 180 may receive a command input by a user using the touchpad 155 in the open state of the first body 200. The result of the command input using the touchpad 155 can be output on any one of both surfaces of the TOLED 154 according to the control of the controller 180.

Figure 32:
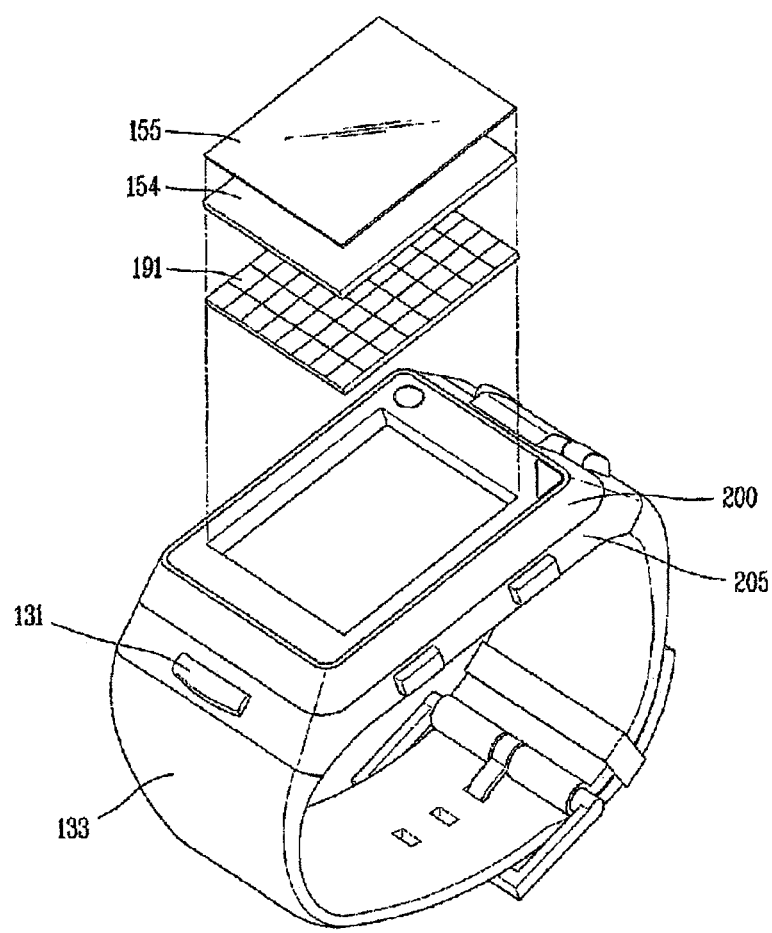
FIG. 32 is an overview of a watch-type mobile terminal having a transparent display according to an embodiment of the present invention, which shows a mobile terminal having a touch pad at an upper surface of the transparent display.

In addition, FIG. 32 is an overview of a watch-type mobile terminal having a transparent display according to an embodiment of the present invention, which shows a mobile terminal having a touchpad on an upper surface of the transparent display. As shown in FIG. 32, the second body 205 may include the solar cell 191 therein, and the first body 200 is overlapped on the second body 205. Further, the first body 200 may include the TOLED 154, which is structurally located on an upper surface of the solar cell 191. The touch-pad 155 is also disposed on an upper surface of the TOLED 154.

Therefore, the user can input a command through the touch pad 155 disposed on the upper surface of the TOLED 154. Further, the solar cell 191 can generate electricity using light transmitted through the TOLED 154, regardless of whether or not the TOLED 154 displays information. Also, the amount of transmitted light depends on the transmittance of the TOLED 154, and accordingly the amount of generated electricity may be different. In addition, when the solar cell 191 is configured with black color, the color sensitivity of the TOLED 154 may be effectively improved.

2. Operation of a Mobile Terminal According to an Embodiment of the Present Invention (Manipulation of User Interface (UI))

As mentioned above, a mobile terminal with a single display is configured as a display module in which a transparent display is overlapped with a non-transparent display, and a mobile terminal with a dual display is configured as two display modules in which a transparent display and a non-transparent display are separately disposed.

Further, the folder-type mobile terminal is a representative type of mobile terminal configured to have the dual display. The folder-type mobile terminal can display independent information on each display in cooperation with the opening or closing of a folding portion, or display several information associated with each other by overlapping each display. When displaying such information associated with each other by overlapping each display, a new visual effect can be generated.

Next, the operations and functions of a mobile terminal having the single display configured by overlapping a transparent display with a non-transparent display will be described according to embodiments of the present invention. Further, the operations and functions may be applied to all aforementioned types of mobile terminals (e.g., flip-type, folder-type, bar-type, slide-type, swivel-type and watch-type), etc.

A detailed description will now be given of a display controlling method according to operational states of a mobile terminal having a transparent display according to an embodiment of the present invention, a power saving method, and a display controlling method in connection with a specific function (e.g., a camera function) provided in the mobile terminal.

Screen Displaying Method of the Mobile Terminal with Transparent Display

A method for displaying a screen in a mobile terminal with a transparent display according to an embodiment of the present invention may be divided into a displaying method of the LCD 151 and the TOLED 154, a controlling method related to a touching operation, and a controlling method related to a displaying operation.

Displaying Method of the LCD and TOLED

Next a description will be given of a method in which a user executes a photo album function and selects one image in the album to thereby display the selected image on a preview screen or link the image with another function according to an embodiment of the present invention. Also, in the method, the LCD 151 and the TOLED 154 are defined respectively as a main display and a sub display, and information to be displayed on each display is also classified, so as to provide a cubic effect.

Figure 33:
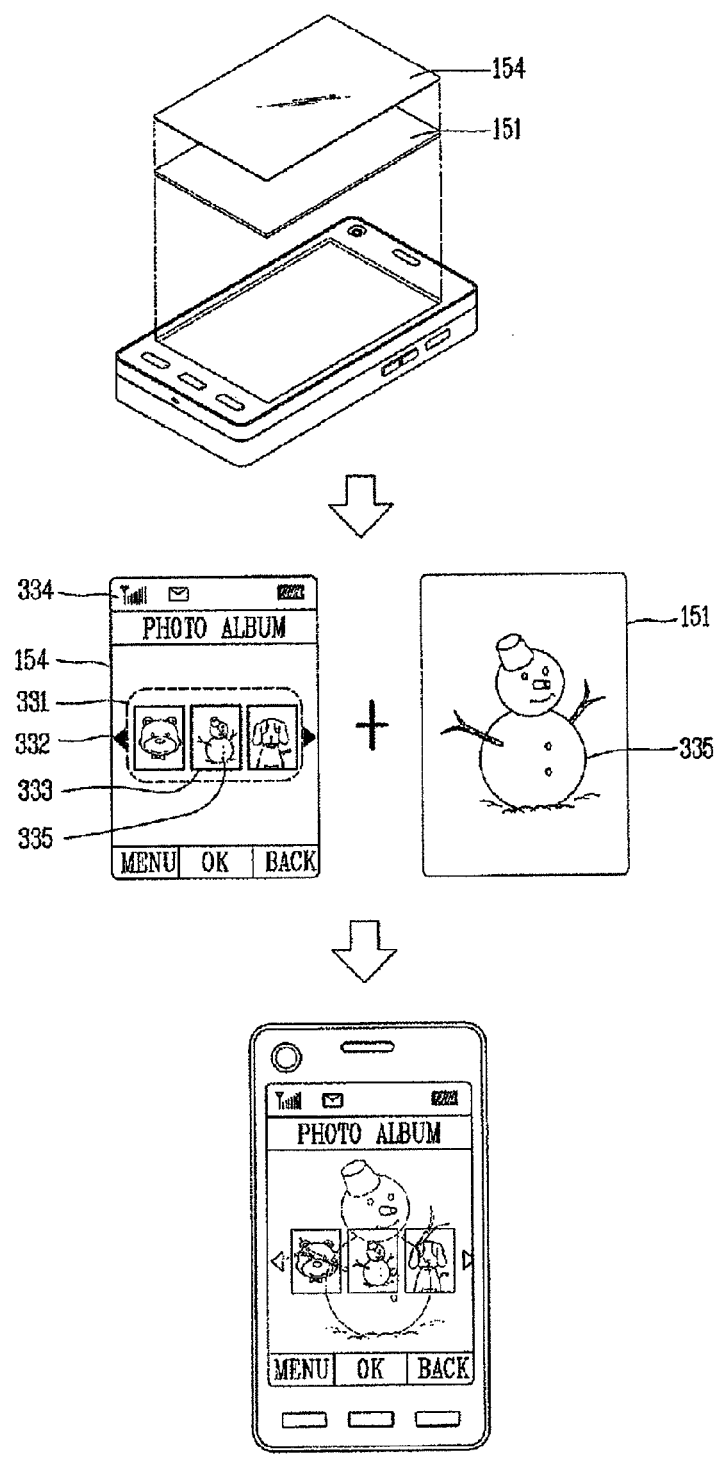
FIGS. 33 to 38 are overviews showing a method for controlling a display of a mobile terminal which has a single transparent display according to an embodiment of the present invention.
Figure 34:
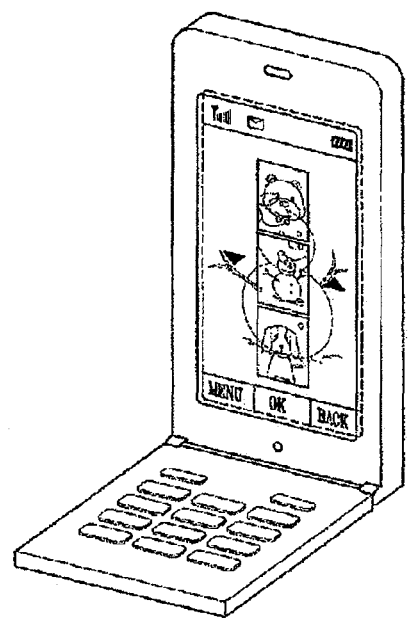
Figure 35:
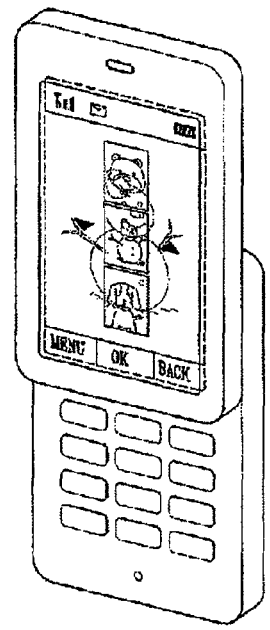
Figure 36:
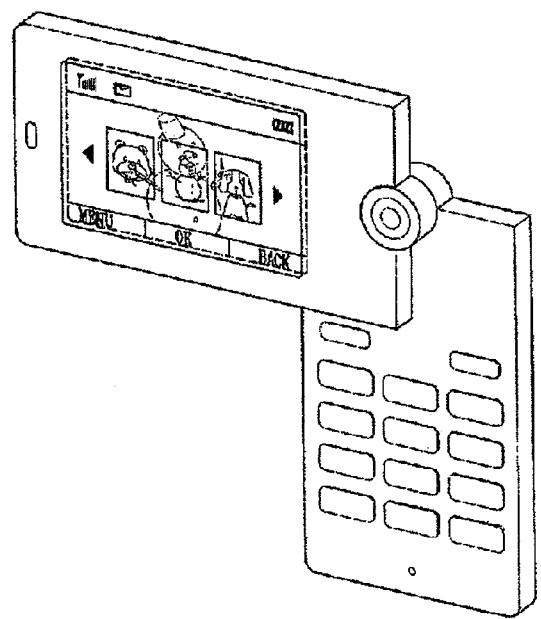
Figure 37:
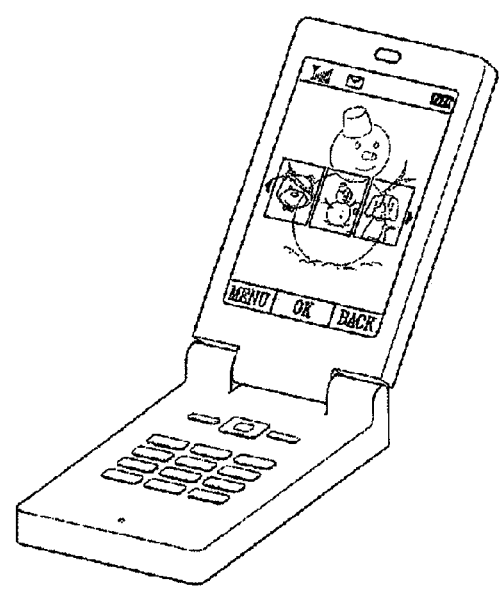
Figure 38:
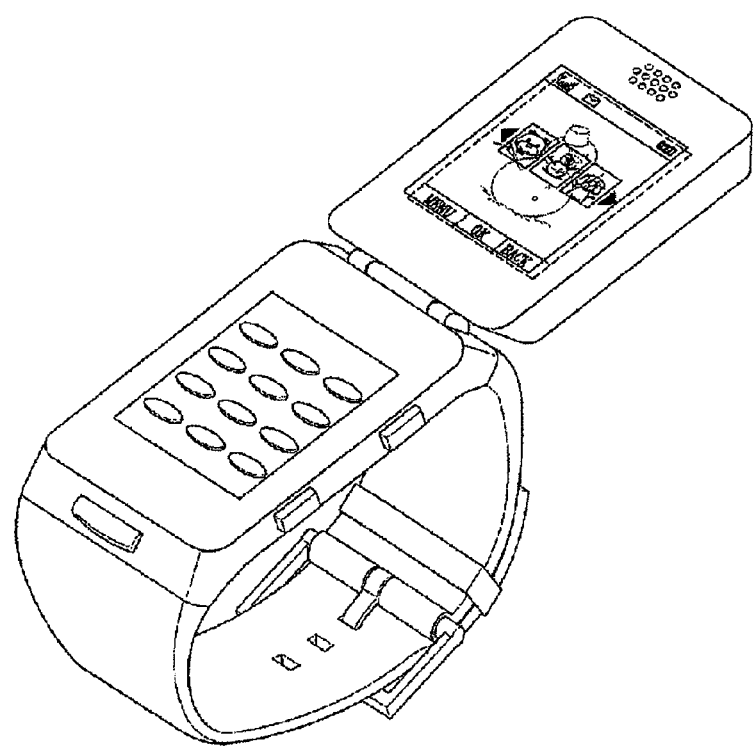

FIGS. 33 to 38 are overviews for illustrating a displaying control method of a mobile terminal having a single transparent display according to an embodiment of the present invention, and particularly, illustrating a displaying control method of the LCD 151 and TOLED 154 when a photo album function is executed. In more detail, Next, a method for controlling a display provided at each type of mobile terminal will be described representatively with respect to the bar-type mobile terminal shown in FIG. 33. As shown in FIG. 33, a display disposed on each type of mobile terminal is configured by overlapping the TOLED 154 and the LCD 151. Further, the controller 180 may display a screen for executing or activating a photo album on the TOLED 154. Also, an indicator 334 for indicating an operational state of the mobile terminal may also be displayed. The screen for executing the photo album may include images 331, navigation keys 332 (hereinafter, referred to as 'software navigation keys') for moving the images 331, and a cursor 333 for selecting one of the images 331.

Also, a user can select one (e.g., image 335) of the images 331 displayed on the photo album execution screen. Further, the controller 180 can display the selected image 335 on the LCD 151 as a preview image. The controller 180 can also change the selected image 335 into an image for an idle screen of the LCD 151. FIGS. 34-38 illustrate the selected image being displayed in different configurations and on different types of mobile terminals.

In addition, the controller 180 can support an animation effect that the selected image is first dropped and then unfolded. Also, because the TOLED 154 has transmittance, even in the state of the photo album execution screen being displayed on the TOLED 154, the user can view the idle screen image set for the LCD 151. On the other hand, when the TOLED 154 is displayable on both of its surfaces, the same operation as aforementioned can be executed by controlling each front and rear surface of the TOLED 154 other than the LCD 151. In addition, a component which controls the displaying operations of the LCD 151 and TOLED 154 according to an embodiment of the present invention may be a multimedia processor or a separate processor having a control function.

Also, the controller 180 can move the object between the TOLED 154 and the LCD 151 based on a double touch operation. For example, the user can touch an object displayed on the TOLED 154 and then touch a portion of the LCD 151. Then, upon receiving a signal corresponding to the double touch operation, the controller 180 moves the object displayed on the TOLED 154 to the LCD 151 are where the user touched the LCD 151. The user can also move the object displayed on the LCD 151 to the TOLED 154 using the reverse procedure. The controller 180 can also automatically move the displayed object between the first and second displays (i.e., the TOLED 154 and the LCD 151) when there is insufficient area on a particular display (i.e., the TOLED 154 and the LCD 151).

Hereinafter, a description will be given of operations of a mobile terminal separately having the transparent display and the non-transparent display in the following embodiments. In addition, the operations of the mobile terminal having the dual display may be applied to all aforementioned types of mobile terminals (e.g., flip-type, folder-type, bar-type, slide-type, swivel-type and watch-type, etc.).

FIGS. 39 to 44 are overviews illustrating a method for controlling a display of a mobile terminal having a transparent display according to an embodiment of the present invention, which shows a method for controlling the LCD 151 and TOLED 154 when executing a photo album function in a mobile terminal having a dual display. In more detail, FIGS. 39 to 44 respectively show a folder-type mobile terminal, a swivel-type mobile terminal, flip-type mobile terminal, slide-type mobile terminal, bar-type mobile terminal, and watch-type mobile terminal.

Figure 39:
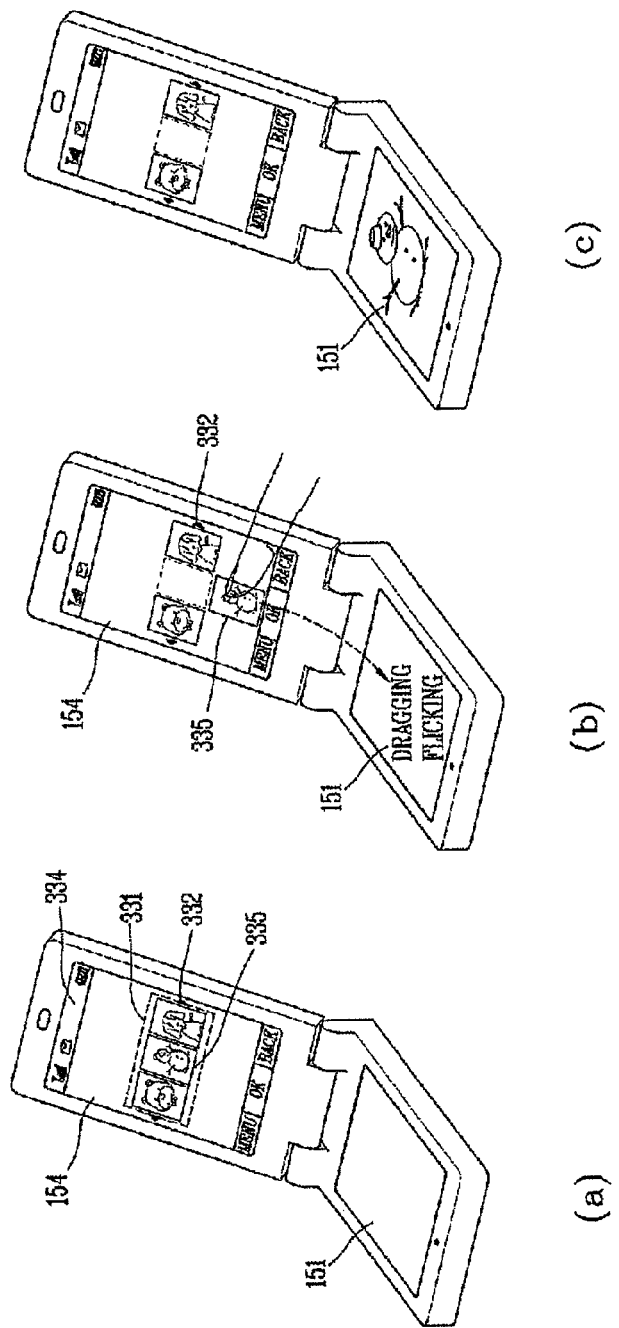

Next, a method for controlling a display provided at each type of mobile terminal will be described representatively with reference to a folder-type mobile terminal shown in FIG. 39. As shown in FIG. 39, in the mobile terminal having the TOLED 154 and LCD 151 separately provided, the controller 180 can display a screen for executing a photo album on the TOLED 154. In addition, the controller 180 may display on the TOLED 154 the images 331, the software navigation keys 332, and the cursor 333 for selecting one of the images 331. The indicator 334 for indicating an operational state of the mobile terminal may also be displayed on the TOLED 154 as shown in FIG. 39.

In addition, the user can select one image (e.g., image 335) of the images 331 displayed on the screen for activating the photo album (see FIG. 39(*a*)), and drag or flick the selected image 335 in a direction from the TOLED 154 to the LCD 151(see FIG. 39(*b*)). Accordingly, the controller 180 can display the dragged or flicked image 335 on the LCD 151 as a preview image (see FIG. 39(*c*)). Also, the controller 180 can change the selected image 335 to be an idle screen image of the LCD 151. In addition, the controller 180 can provide an animation effect that the selected image 335 is moved onto the LCD 151 to be then unfolded. FIGS. 40-44 illustrate the touching and dragging (or flicking) operation being performed on different types of mobile terminals.

Also, one embodiment of the present invention may separately provide a function key (hereinafter referred to as a screen switching function key) for switching contents respectively displayed on the TOLED 154 and the LCD 151. The screen switching function key may have a toggling function. Also, the screen switching function key may be configured as a software key (or an execution icon) at one side (e.g., an indicator region or the like) of the TOLED 154 or be provided as a hardware key.

Upon selecting the screen switching function key, the controller 180 can change an icon shape of the screen switching function key, and simultaneously switch contents respectively displayed on the TOLED 154 and the LCD 151. That is, the controller 180 can indicate that the screen switching function key has been selected. Afterwards, when the screen switching function key is selected again, the controller 180 converts the screen switching function key into its original shape, and then switches one more time the contents respectively displayed on the TOLED 154 and the LCD 151.

A Method for Controlling a Touching Operation on the LCD and TOLED

The method for controlling the touching operation depends on overlapped states between the LCD 151 and the TOLED 154, including a completely overlapped state, a partially overlapped state and a completely separated state. The mobile terminal having the transparent display according to an embodiment of the present invention uses different touching operations according to the overlapped states between the LCD 151 and the TOLED 154.

FIG. 45 is an overview of a mobile terminal having a dual transparent display according to an embodiment of the present invention, which shows a method for controlling displays according to an overlapped state between the displays. Here, examples will be shown having a completely overlapped state (a), a partially overlapped state (b and c) and a completely separated state (d) between the LCD 151 and the TOLED 154.

Complete Overlapped State Between the LCD and TOLED

Figure 46A:
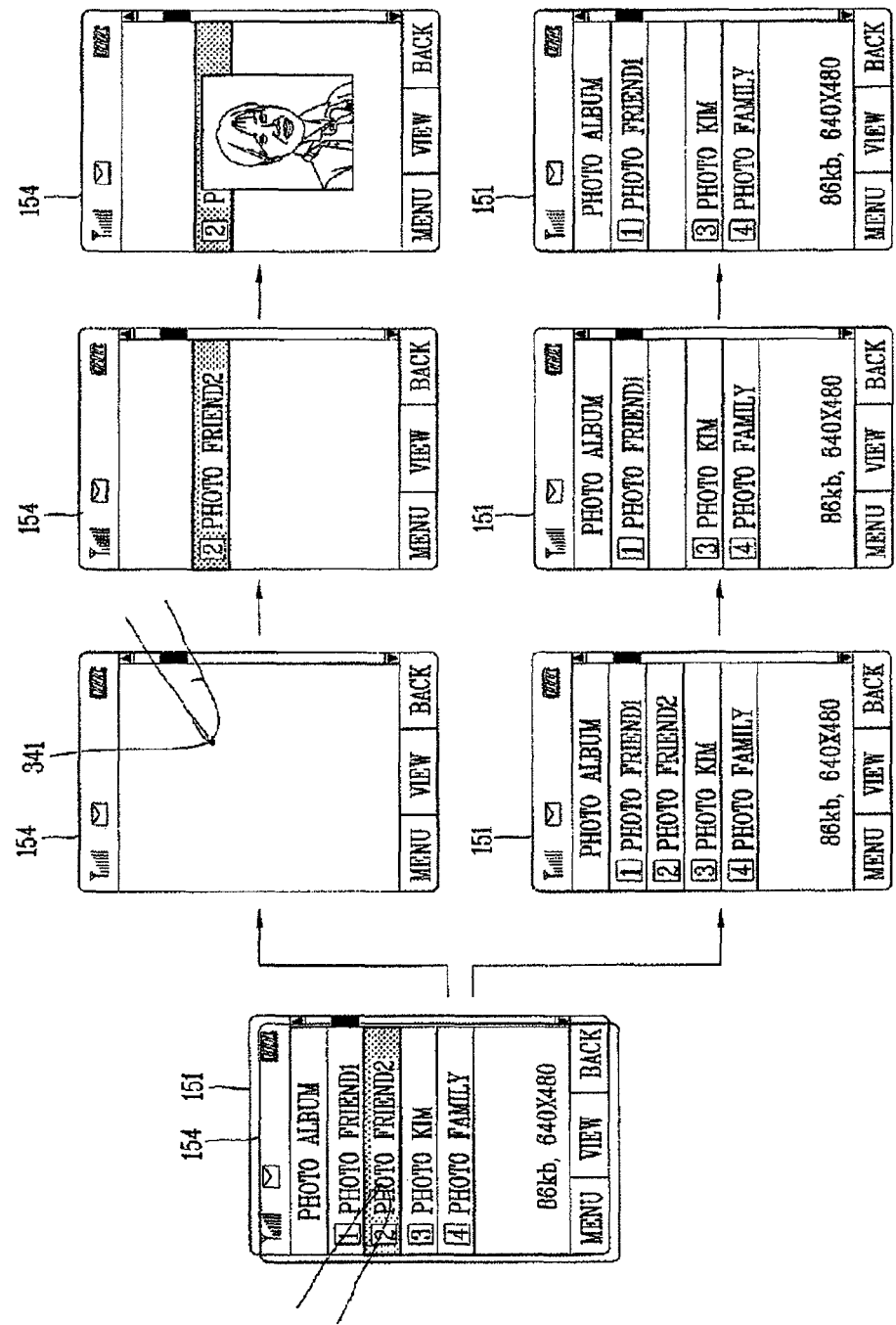
FIGS. 46A to 46C are overviews showing a method for controlling a touching operation under the state that the displays of FIG. 45 are completely overlapped with each other according to an embodiment of the present invention.
Figure 46B:
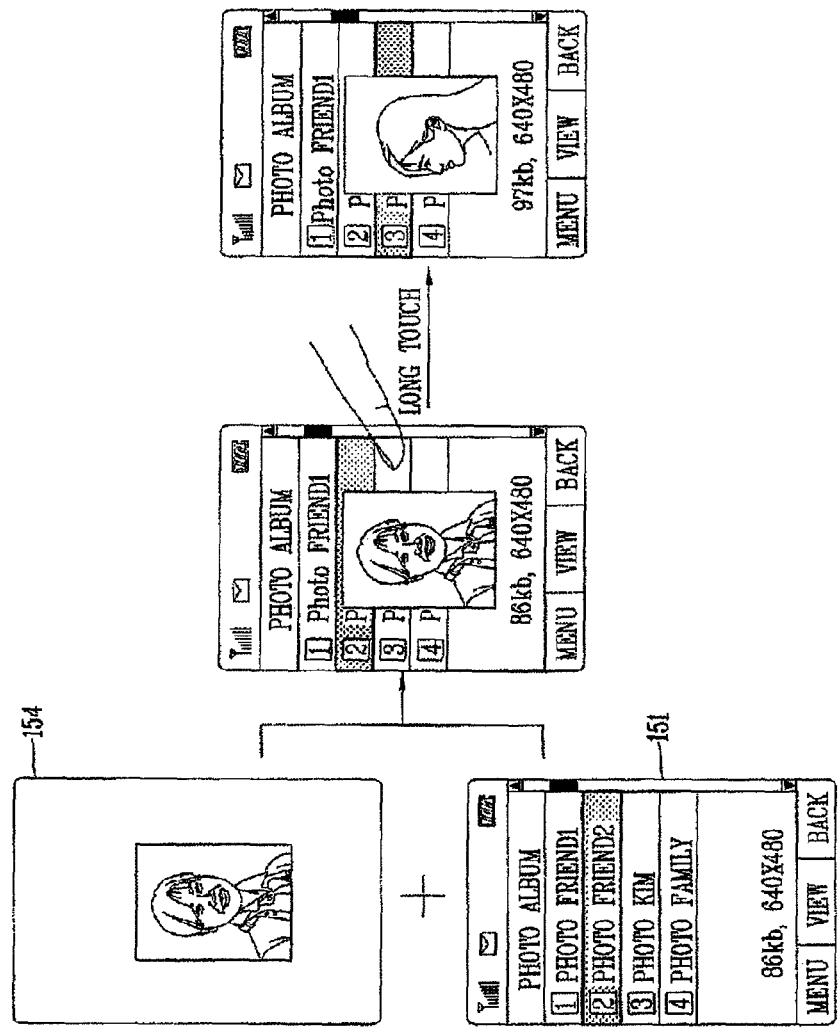
Figure 46C:
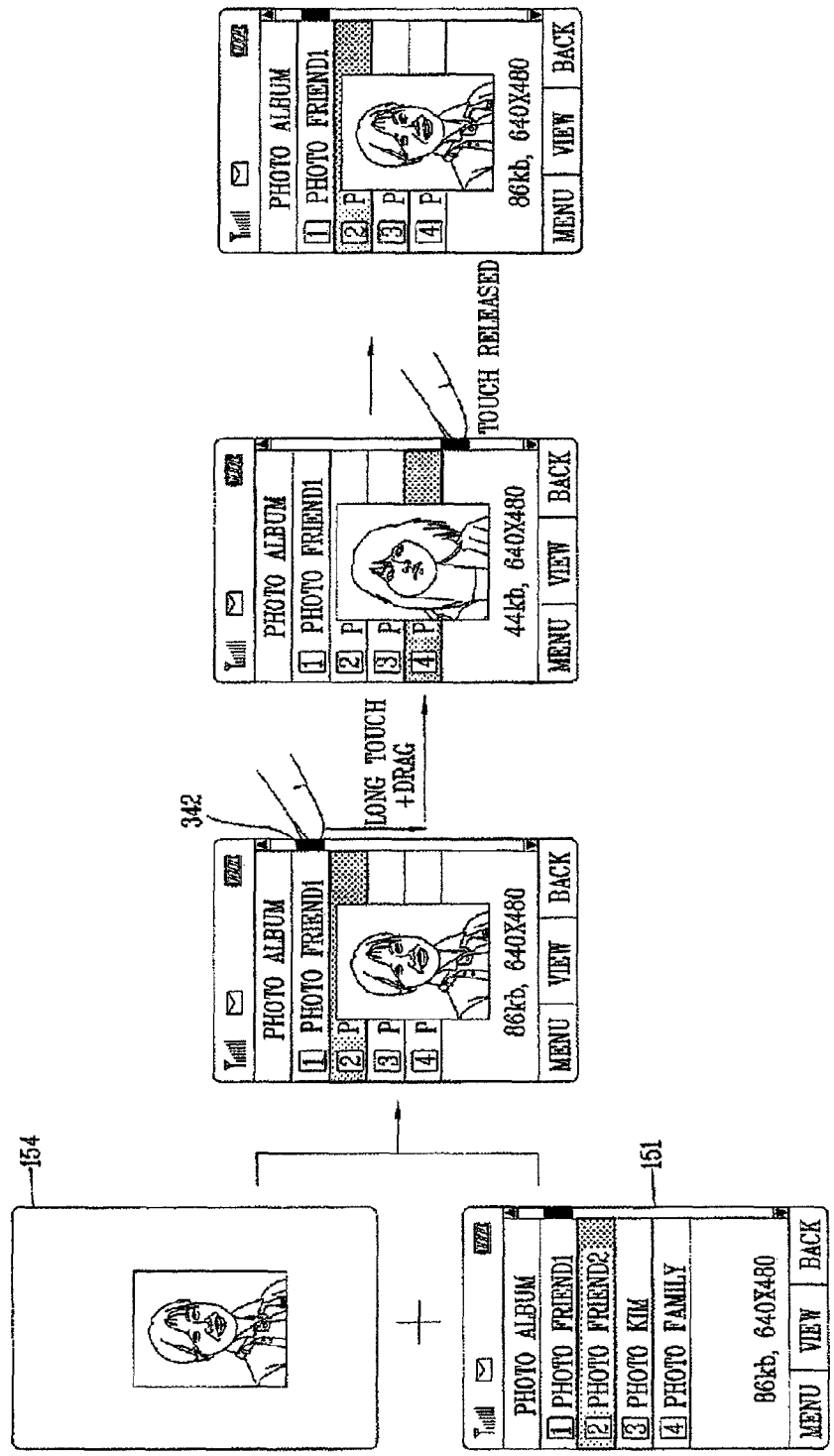

FIGS. 46A to 46C are overviews illustrating a method for controlling a touching operation in the completely overlapped state between each display shown in FIG. 45(*a*). Hereinafter, a touching operation sensed in the state that the TOLED 154 is completely overlapped on the LCD 151 will be described by being divided into a touch (or proximity-touch) operation, long touch operation, long touch & drag operation, and the like.

First, as shown in FIG. 46A, upon selecting a photo album function by a user, the controller 180 displays an image list on the LCD 151. Afterwards, when a touch (real touch) or proximity-touch is sensed from the exterior, the controller 180 selects an image corresponding to the corresponding touched point 341. Further, the controller 180 carries the selected image from the LCD 151 onto the TOLED 154 so as to display the selected image on the TOLED 154.

The mobile terminal according to an embodiment of the present invention may have various sensors for performing different sensing functions, and may further have a proximity sensor or tactile sensor provided in the sensing unit 140 for sensing the proximity-touch. As shown in FIG. 46B, if the external touch sensed is a long touch (e.g., a touch lasted for at least two or three seconds), the controller 180 runs or executes the selected image and displays it on the TOLED 154. The long touch may also be used when selectively moving a desired object among objects displayed on the LCD 151 to the TOLED 154. In addition, when the TOLED 154 is displaying many unnecessary objects, a certain touch input may be made to move objects from the TOLED 154 to the LCD 151 for display.

If a dragging operation or action is also sensed together with the long touch from the exterior, the controller 180 may display a preview screen for an image selected by the long touch on the TOLED 154 as shown in FIG. 46C. Afterwards, a selection cursor (or selection bar) 342 of the LCD 151 is moved by the dragging action, and a selected image by the selection cursor 342 is then displayed on the preview screen. After the external touch is not sensed any more, an initial image selected by the long touch action is displayed. The touching operation (i.e., long touch+drag) of FIG. 46C may equally be applied to the case of sensing a sliding (e.g., an operation of proximity-touch corresponding to the dragging) together with a long proximity touch (e.g., proximity touch lasted for at least two or three seconds) from the exterior. Also, upon sensing any touching operation other than the above-mentioned ones, the controller 180 can operate as done in a general method of controlling a touching operation.

In addition, the method for controlling the touching operation in the completely overlapped state may be applied to all types of mobile terminals having the single display (e.g., folder-type, flip-type, slide-type, rotating-type (e.g., swivel-type or swing-type), bar-type, watch-type and the like all having the single display).

Partially Overlapped State Between the LCD and TOLED

Figure 47A:
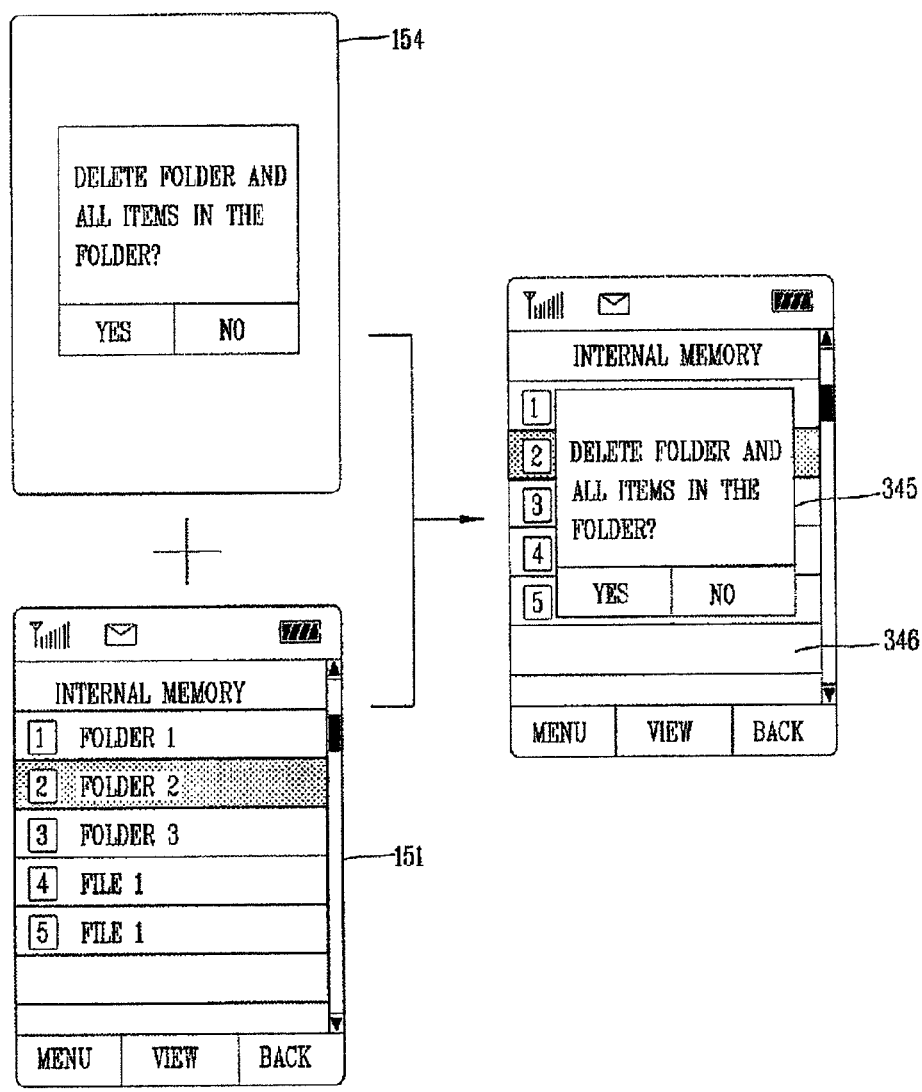
FIGS. 47A and 47B are overviews showing a method for controlling a touching operation under the state that the displays of FIG. 45 are partially overlapped with each other according to an embodiment of the present invention.
Figure 47B:
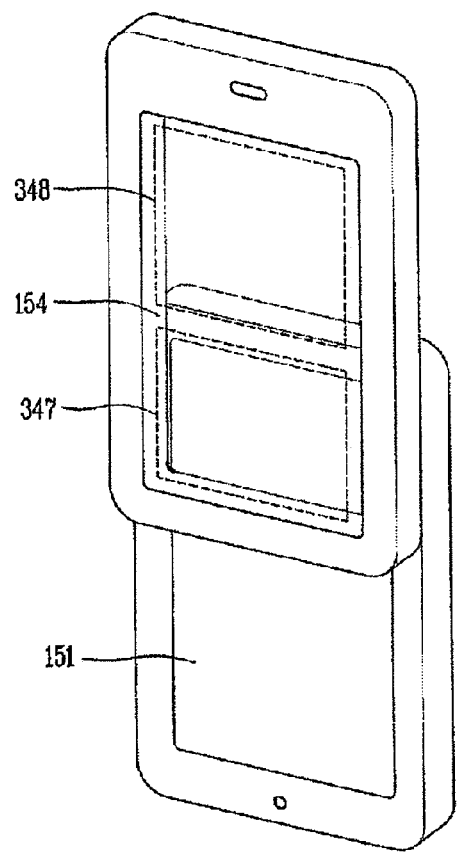

FIGS. 47A and 47B are overviews illustrating a method for controlling a touching operation in a partially overlapped state between each display. Hereinafter, a touching operation sensed in the partially overlapped state will be described by dividing the operation into a touch (or proximity-touch) operation, long touch operation, long touch & drag operation, and touch & drag operation.

FIG. 47A is an overview illustrating a pop-up selection window region of the TOLED 154. As shown in FIG. 47A, the controller 180 senses an external touch (real touch) or external proximity-touch. Upon sensing the touch, the controller 180 detects a touched point. That is, the controller 180 detects whether a pop-up selection window region has been touched or another region excluding the pop-up selection window has been touched, and thereafter performs a different processing according to the detected touched point.

For example, when a touch is sensed on the pop-up selection window region, the controller 180 may select a certain object (e.g., menu list, execution icon, or the like) and perform the function of the selected object. If the touch is sensed from the other region excluding the pop-up selection window, then the controller 180 may take no action or close or cancel the pop-up selection window.

FIG. 47B shows an overlapped region 347 and a non-overlapped region 348. As shown in FIG. 47B, if a long touch is sensed from the exterior, the controller 180 may perform a different processing depending on whether the touch is sensed on the non-overlapped region 348 or on the overlapped region 347. For example, when a touch is sensed on the non-overlapped region 348, the controller 180 may select a certain object (e.g., menu list, execution icon, or the like) and perform the function of the selected object. If a touch is sensed on the overlapped region 347, the controller 180 may apply the same method of controlling the touching operation as applied in the completely overlapped state.

Also, if a sliding of a proximity-touch is sensed together with the long proximity-touch from the exterior, the processing may be the same as that for the touching operation (i.e., long touch & drag). In addition, when a dragging is sensed together with a real touch from the exterior, the controller 180 may equally apply a method for controlling a touching operation in a separated state between the LCD 151 and the TOLED 154 which will be explained later. Even when a proximity-touch and a sliding of proximity-touch are sensed from the exterior, the controller 180 may equally apply the method for controlling the touching operation in the separated state between the LCD 151 and the TOLED 154.

As mentioned above, the method for controlling the touching operation in the partially overlapped state between the LCD 151 and the TOLED 154 can be applied to mobile terminals having a dual display (e.g., an open state of a slide-type mobile terminal, an open state of a rotating-type (e.g., swivel or swing type) mobile terminal and the like).

Completely Separated State Between the LCD and TOLED

Hereinafter, a description will be given of a touching operation sensed in the completely separated state between the LCD 151 and TOLED 154 by being divided into a touch (or proximity-touch) operation, a long touch operation, a long touch & drag operation, and the like. Thus, when a real touch (or proximity-touch) or long touch is sensed from the exterior, the controller 180 may select a certain object (e.g., menu list or execution icon) located at the corresponding touched point of the TOLED 154 and perform the function of the selected object.

If a dragging action is sensed together with the real touch from the exterior, the controller 180 may select or move the touch-selected object (e.g., menu list or execution icon) and perform the function of the selected object. For example, the TOLED 154 is allowed to display copied contents (or contents in a clipboard), and such contents are attached onto the LCD 151 by the aforementioned operation (i.e., touch & drag action).

As another example, such operation (i.e., touch & drag) is performed to move the object displayed on the TOLED 154 onto the LCD 151. As still another example, such operation (i.e., touch & drag) is performed to enlarge (or reduce) a webpage on the LCD 151, to thusly be displayed on the TOLED 154. Further, a scroll operation may also be available. Also, when a touching operation other than the above-mentioned operations is sensed, the controller 180 may operate the same as done in the general method of controlling a touching operation.

As mentioned above, the method for controlling the touching operation in the separated state between the LCD 151 and the TOLED 154 can be applied to mobile terminals having a dual display (e.g., an open state of a folder type mobile terminal, an open state of a flip type mobile terminal, an open state of a bar type mobile terminal, an open state of a watch type mobile terminal and the like).

Control Method Related to Setting of the LCD and TOLED

One embodiment of the present invention may be configured to generate a separate vibration feedback or sound feedback according to which one of the LCD 151 and TOLED 154 is manipulated. Thus, by differently setting the vibration feedback or sound feedback for the LCD 151 or TOLED 154, it is possible to recognize which display (LCD 151 or TOLED 154) a user has manipulated. For example, in the completely (or partially) overlapped state between the LCD 151 and the TOLED 154, if a user's touch (e.g., a real touch or long touch) is sensed, the controller 180 controls the operation of the LCD 151 or TOLED 154 according to the type of touch input (or according to a user's purpose). Also, the controller 180 may generate different vibration or sound feedbacks when controlling the operation of the LCD 151 and the TOLED 154.

Also, one embodiment of the present invention is configured such that a transmittance, color or brightness of the TOLED 154 can be set according to peripheral circumstances. In order to prevent information displayed on the TOLED 154 from being obscured due to a background reflected on the TOLED 154, the color or brightness of the TOLED 154 can also be controlled according to the peripheral circumstances.

Furthermore, when providing a camera or solar cell at a rear surface of the TOLED 154, in order to solve a problem that the operation of the camera or solar cell is affected by information displayed on the TOLED 154 or transmittance thereof, the transmittance can selectively be controlled with respect to a certain region of the TOLED 154. In addition, the vibration (or sound) feedback related to the TOLED 154 and the control of the transparency, color or brightness of the TOLED 154 according to the peripheral circumstances may automatically be performed by the controller 180 based upon a preset algorithm, or directly be set by a user through an environment setup option.

Concepts of Main/Sub Window of the LCD and TOLED

As discussed above, the present invention can operate displays such that the LCD 151 and the TOLED 154 can operate as a main window (or first window) and a sub window (or second window). For better understanding of a displaying method employing such concepts of the main/sub windows, an Internet browsing method will be described as one example. Further, the main and sub windows may be applied to a mobile terminal having a dual display (e.g., folder-type, slide-type, rotating-type (e.g., swivel-type, swing-type), watch-type or the like).

Figure 48:
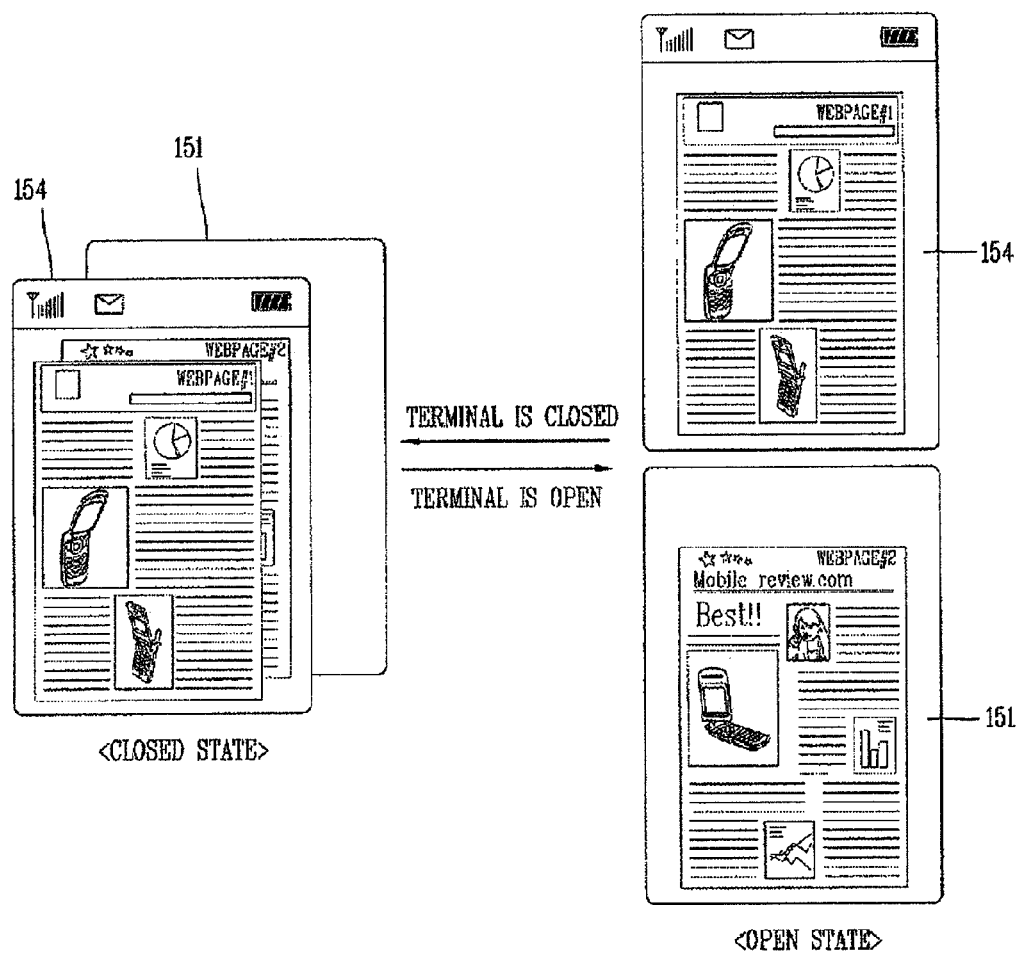
FIG. 48 is an overview showing a web browsing method for describing a main/sub window operation method in a mobile terminal according to an embodiment of the present invention.

FIG. 48 is an overview of a web browsing method for showing a method of operating main and sub windows in a mobile terminal according to an embodiment of the present invention. As shown in FIG. 48, a webpage (e.g., a main webpage) first opened when executing a web browser may be displayed on a main window (e.g., the TOLED 154), and a webpage or pop-up page linked to the first-opened webpage may be displayed on a sub window (e.g., the LCD 151).

Such webpages displayed on the main or sub windows may be displayed in an opposite window according to the environment setup option. Alternatively, when using any one of two displays provided in the mobile terminal, a webpage displayed on a display (e.g., sub window) disposed at a lower side of the mobile terminal may be moved to a display (e.g., main window) disposed at an upper side of the mobile terminal, thereby being displayed on the moved display. For example, upon closing the mobile terminal, a webpage displayed on a sub window may be moved to and displayed a main window.

Figure 49A:
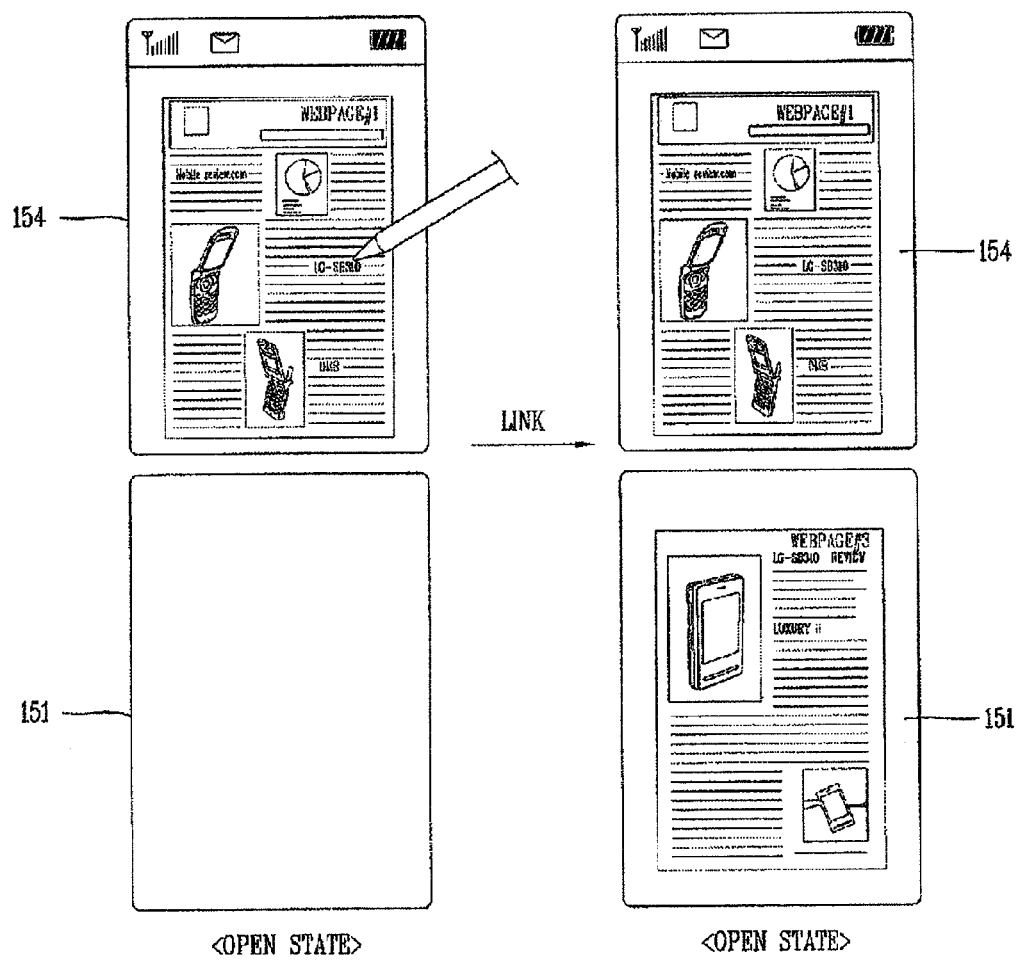
FIGS. 49A and 49B are overviews showing a method for displaying a webpage in cooperation with a main/sub window operation method in a mobile terminal according to an embodiment of the present invention.
Figure 49B:
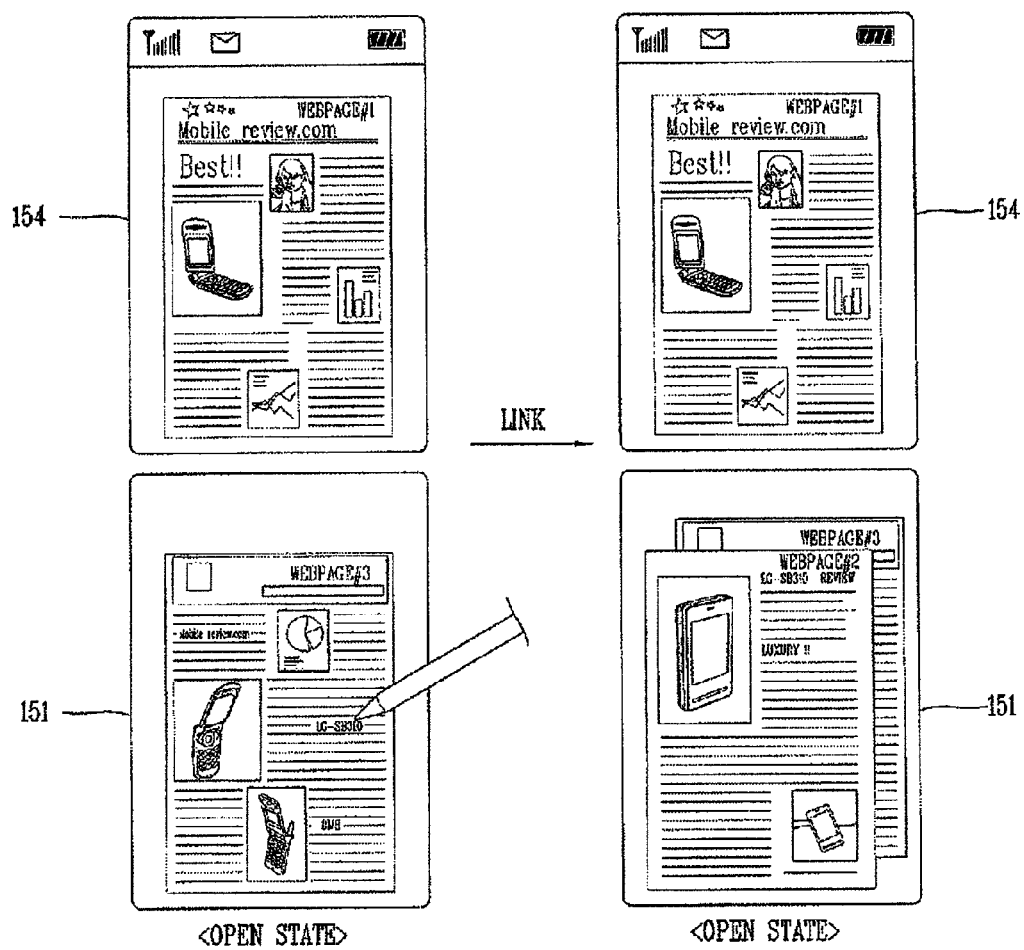

FIGS. 49A and 49B are overviews illustrating a method for displaying a webpage according to a method of operating main and sub windows in a mobile terminal according to an embodiment of the present invention. As shown in FIG. 49A, if a certain text (or certain object) on a webpage #1 displayed on a main window (e.g., the TOLED 154) is selected by a user's touch input (or proximity-touch), the controller 180 may display a webpage (e.g., webpage #3) linked to the text on a sub window (e.g., the LCD 151).

In the state that the sub window (e.g., the LCD 151) is displaying the webpage #3, as shown in FIG. 49B, if a certain text (or object) on the webpage #3 is selected, the controller 180 may display a webpage (e.g., webpage #2) linked to the selected text on the sub window (e.g., the LCD 151), as well as the webpage #3. Further, the main and sub windows may be converted by a user's selection, and also contents displayed on each window may be converted.

In addition, if the user's input is a proximity-touch and touch is sensed on a certain content (e.g., text, English word, image, video, flash or the like) displayed on a main window (e.g., the TOLED 154), the controller 180 may display information related to the corresponding content on a sub window (e.g., the LCD 151). Also, if the proximity distance sensed becomes farther away, the sub window can return to its initial state.

Display Control according to an Open/Closing Operation of the Mobile Terminal

An open/closing operation of a mobile terminal denotes an opening or closing of the mobile terminal, namely, an operation of folding, sliding or rotating (swiveling or swinging) one body of a mobile terminal having at least two bodies, such as folder-type mobile terminal, flip-type mobile terminal, slide-type mobile terminal, rotating-type (swivel or swing-type) mobile terminal, watch-type mobile terminal or the like.

Figure 50A:
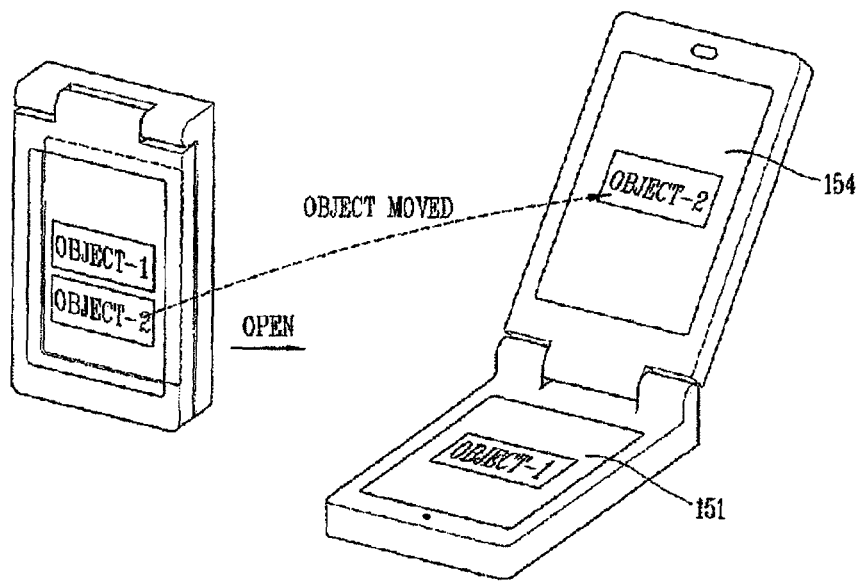
FIGS. 50A and 50B are overviews showing a method for moving a displayed object in cooperation with an open/closing operation of a mobile terminal having a dual transparent display according to an embodiment of the present invention.
Figure 50B:
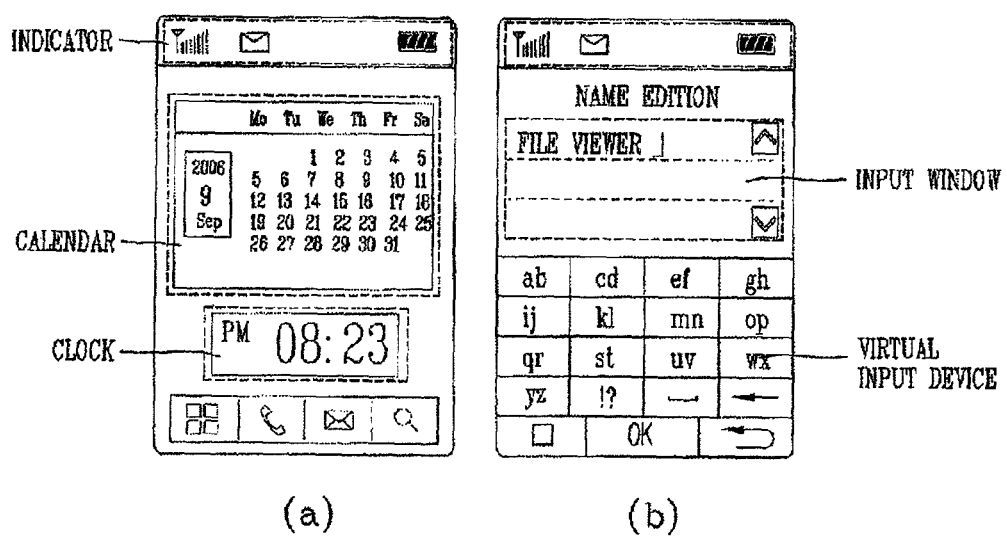

FIGS. 50A and 50B are overviews illustrating a method for moving a displayed object in cooperation with an opening/closing operation of a mobile terminal having a dual transparent display according to an embodiment of the present invention. Upon closing a mobile terminal having the LCD 151 and TOLED 154, information (or objects) displayed on each of the displays are overlapped with each other. Such overlapped information are then displayed on any one of the two displays. Hereinafter, a display having the overlapped information displayed thereon is referred to as 'main display'.

When the mobile terminal is open, the controller 180 moves and displays a part of object displayed on the main display (e.g., the LCD 151) onto a sub display (e.g., the TOLED 154). As such, an object which is moved to each display for display in cooperation with the opening/closing of the mobile terminal is referred to as 'moving object'. The moving object may include an indicator, clock and calendar, as shown in FIG. 50B(*a*), and further include background memo, multitasking menu, input window and the like.

As shown in FIG. 62B(*b*), when being displayed on a sub display, an object such as a virtual input unit or device (e.g., keypad or wheel) may be overlapped with other objects on a main display, causing inconvenience of input. Thus, such object is preferably displayed on the main display. That is, the input window is small in size and difficult to be recognized at a glance, and thus it is displayed on the sub display in greater size. The positions of the virtual input device and the input window may be changed to each other for display.

Figure 51A:
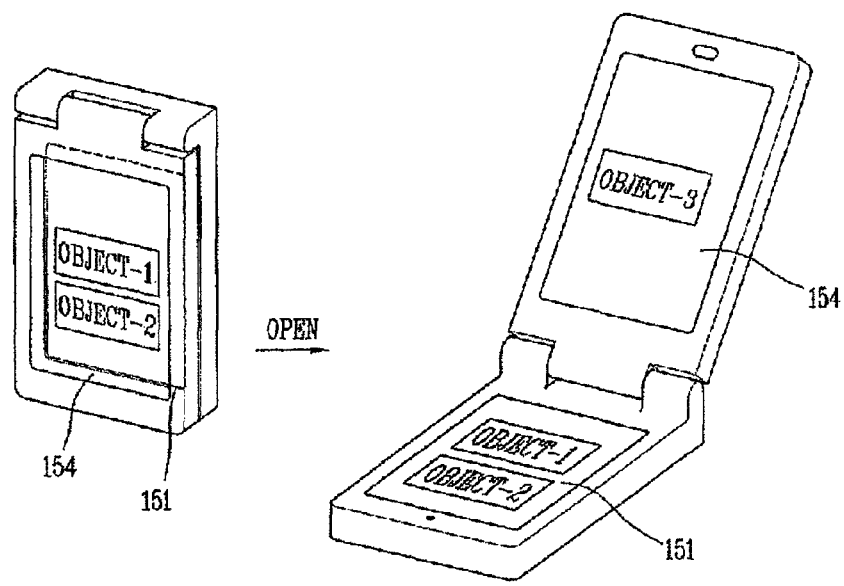
FIGS. 51A and 51B are overviews showing a method for generating a displayed object in cooperation with an open/closing operation of a mobile terminal having a dual transparent display according to an embodiment of the present invention.
Figure 51B:
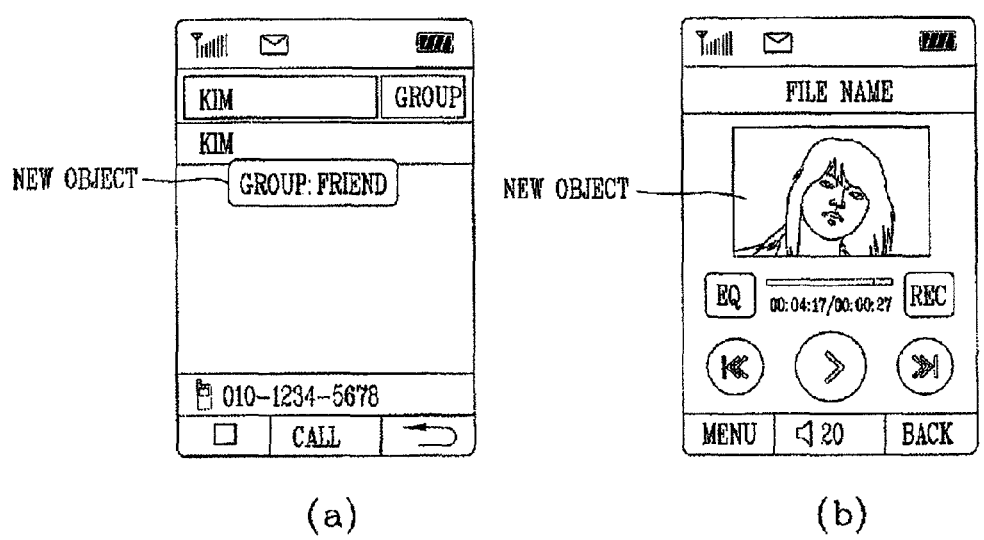
Figure 52:
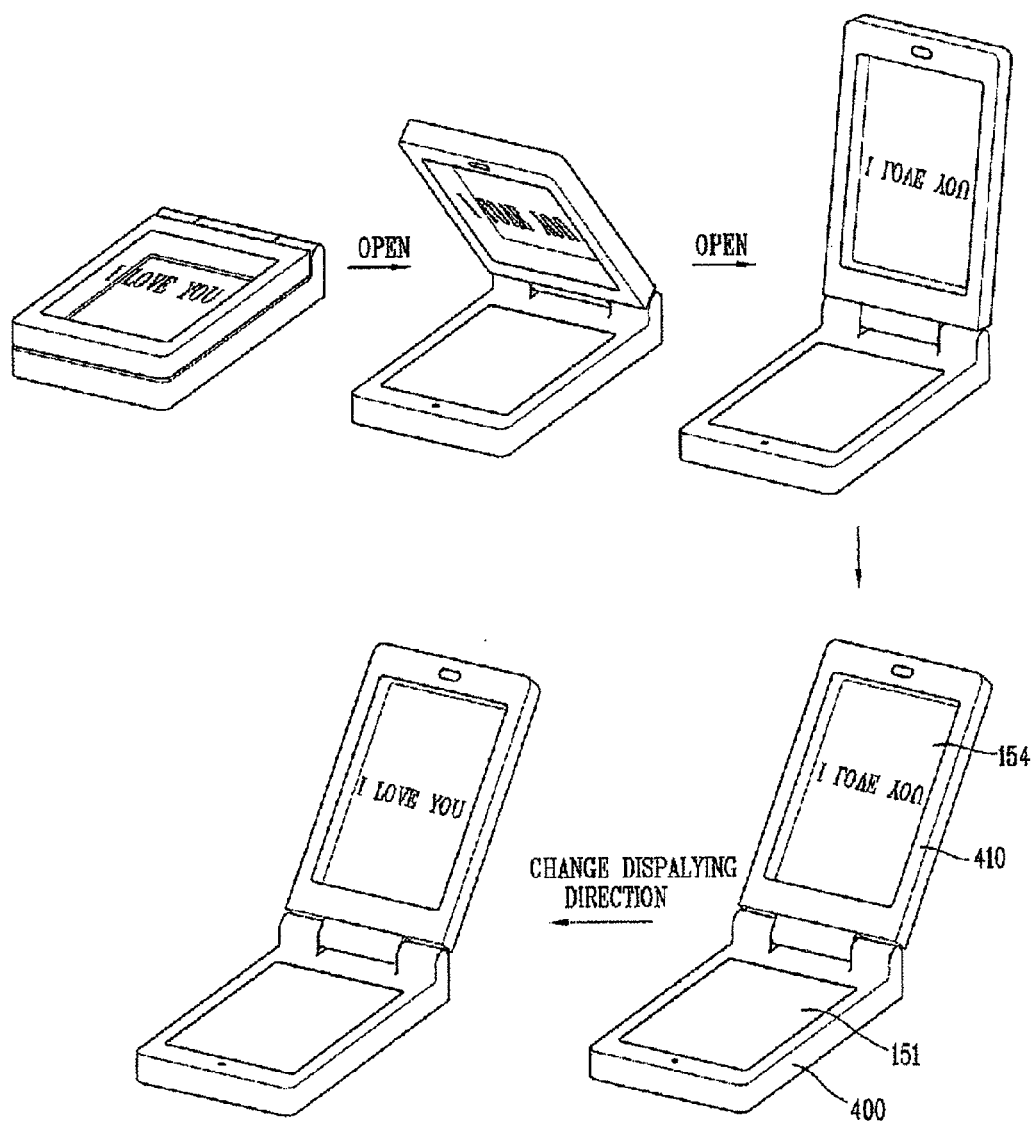
FIGS. 52 and 53 are overviews showing a method for changing an information display direction in a mobile terminal having a dual transparent display according to an embodiment of the present invention.
Figure 53:
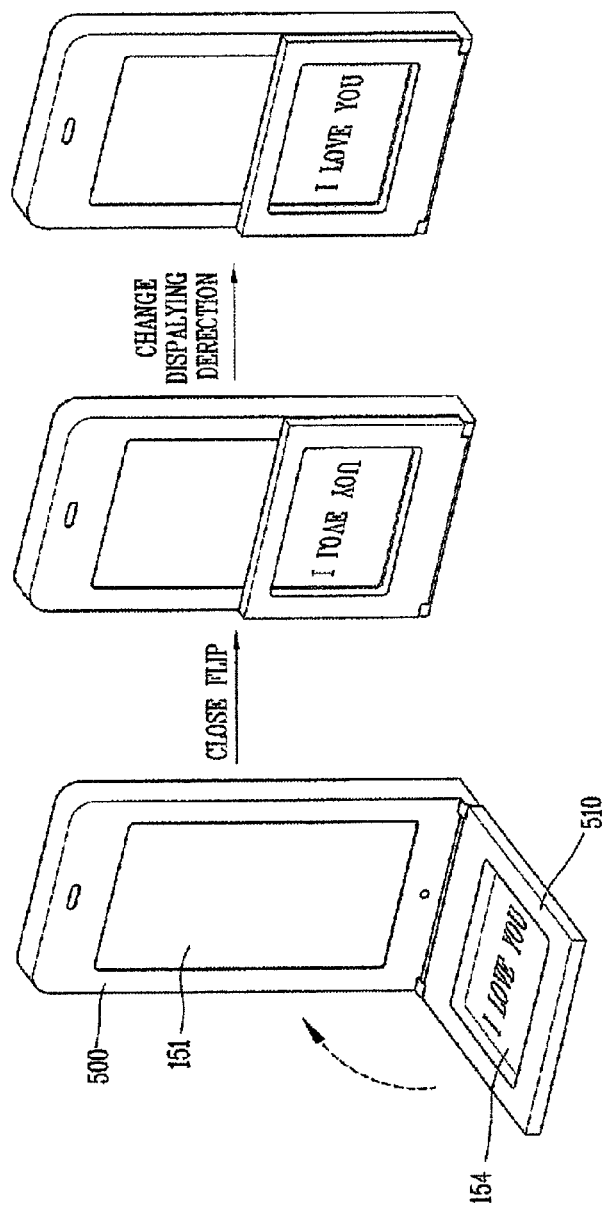
Figure 54:
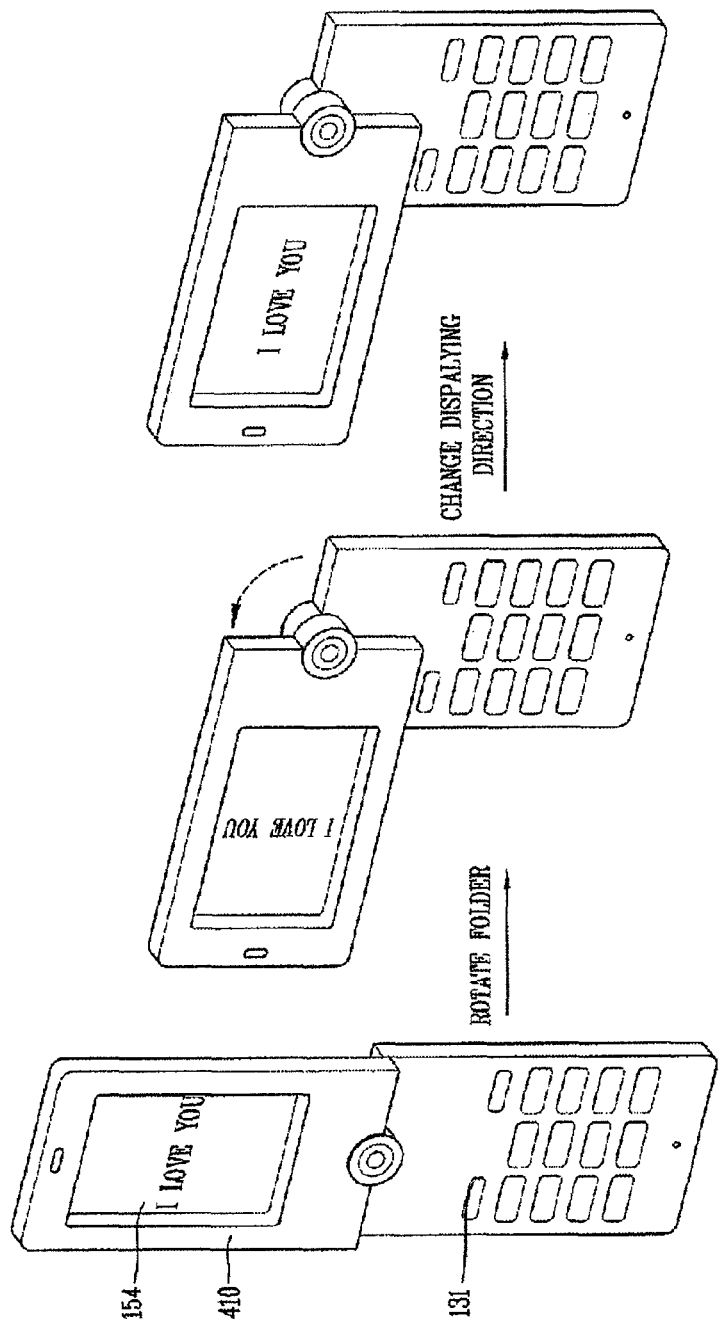
FIGS. 54 and 55 are overviews showing a method for changing an information display direction in a mobile terminal having a single transparent display according to an embodiment of the present invention.
Figure 55:
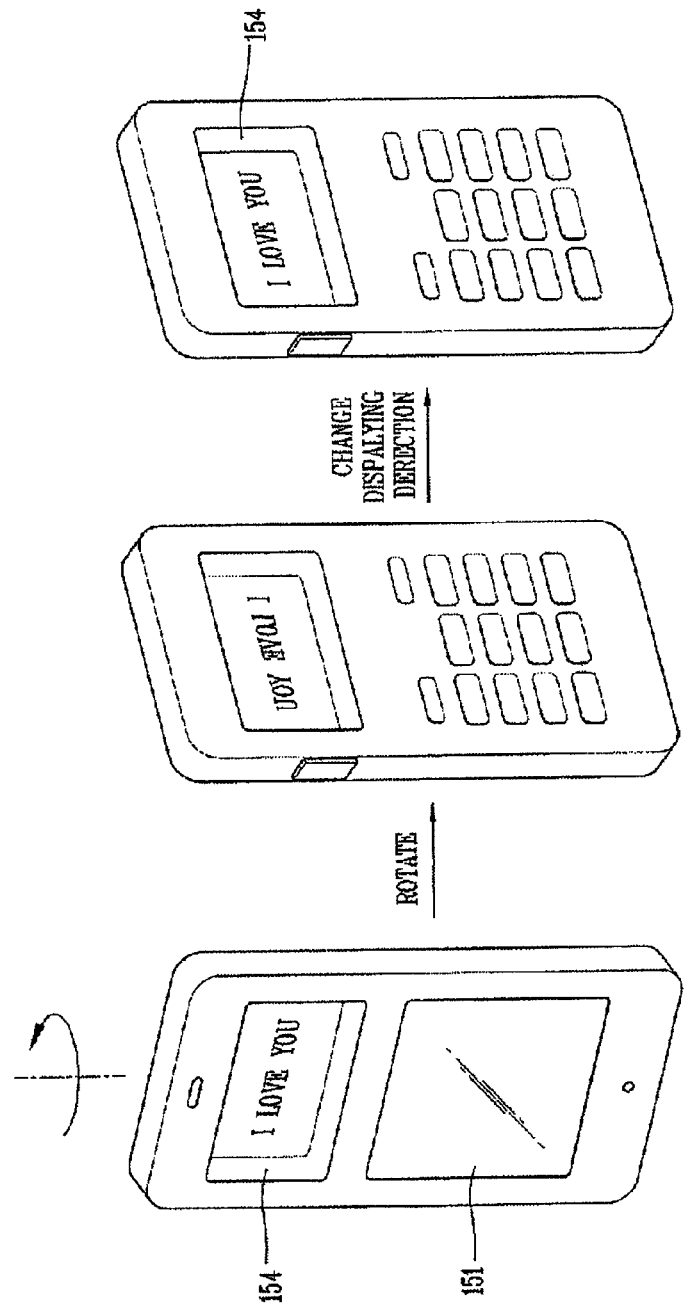

Next, FIGS. 51A and 51B are overviews illustrating a method for generating a displayed object in cooperation with an opening/closing of a mobile terminal having a dual transparent display according to an embodiment of the present invention. As shown in FIG. 51A, upon opening the mobile terminal, an object may be newly generated on a sub display (e.g., the TOLED 154). Such object is referred to as a new object. The new object is not displayed, for example, due to the lack of displaying space when two displays are overlapped with each other.

Then, when the two displays are separated after the mobile terminal is opened, the new object may further be displayed on a sub display (e.g., the TOLED 154). For example, as shown in FIG. 51B, such new objects may include detailed information (additional information) related to specific information, a sub menu for a specific list or multimedia player.

Change in Information Displaying Direction on Screen of Mobile Terminal

A mobile terminal having a transparent display according to an embodiment of the present invention may be configured such that information displayed on a display can be reversed (or rotated) suitable for a user's eye in cooperation with an opening/closing of the mobile terminal (or rotating operation thereof) so as to be displayed. FIGS. 52 to 55 are overviews illustrating a method for changing an information displaying direction in a mobile terminal having a transparent display according to an embodiment of the present invention, which respectively show a folder-type mobile terminal, flip-type mobile terminal, rotating-type (swivel-type or swing-type) mobile terminal and bar-type mobile terminal.

Each type of mobile terminal is configured such that information displayed on a display can be rotated or reversed suitable for a position (pose, posture) of the mobile terminal according to the same method. For example, the controller 180 senses when the folding portion 410 or flip portion 510 starts to be opened. When the folding portion 410 is opened by more than a certain angle, the controller 180 rotates or reverses information displayed on the folding portion 410. The certain angle may be set differently depending on manufacturers or designs of mobile terminals or based on user input.

If the mobile terminal is provided with a tilt sensor (or gyro sensor), a displaying direction of information displayed on any of two displays is changed according to the posture of the mobile terminal detected by the tilt sensor. For example, if the posture of the mobile terminal which was a vertical direction is changed into a horizontal direction, the information displaying direction of the mobile terminal can be changed from the vertical direction into the horizontal direction. Also, the mobile terminal according to the present invention may be provided with a separate software key (or hardware key) for allowing a user to selectively change the information displaying direction.

Automatic Execution of Specific Function Based Upon Opening/Closing of the Mobile Terminal When a mobile terminal in which a locking function has been set to protect private information or prevent others from using the terminal, the controller 180 automatically displays a pop-up window to allow an input of a password, and releases the locked state of the mobile terminal when an accurate password is input. When the locking function is not yet released, if the mobile terminal is closed again, the controller 180 closes the pop-up window to obtain the password. Further, when the locking function has been set in order to simply prevent an unintended touch input or to protect a screen, when the mobile terminal is opened, the controller 180 may automatically release the locked state without requiring a password input, and automatically reset such locking function when the mobile terminal is closed.

Figure 56:
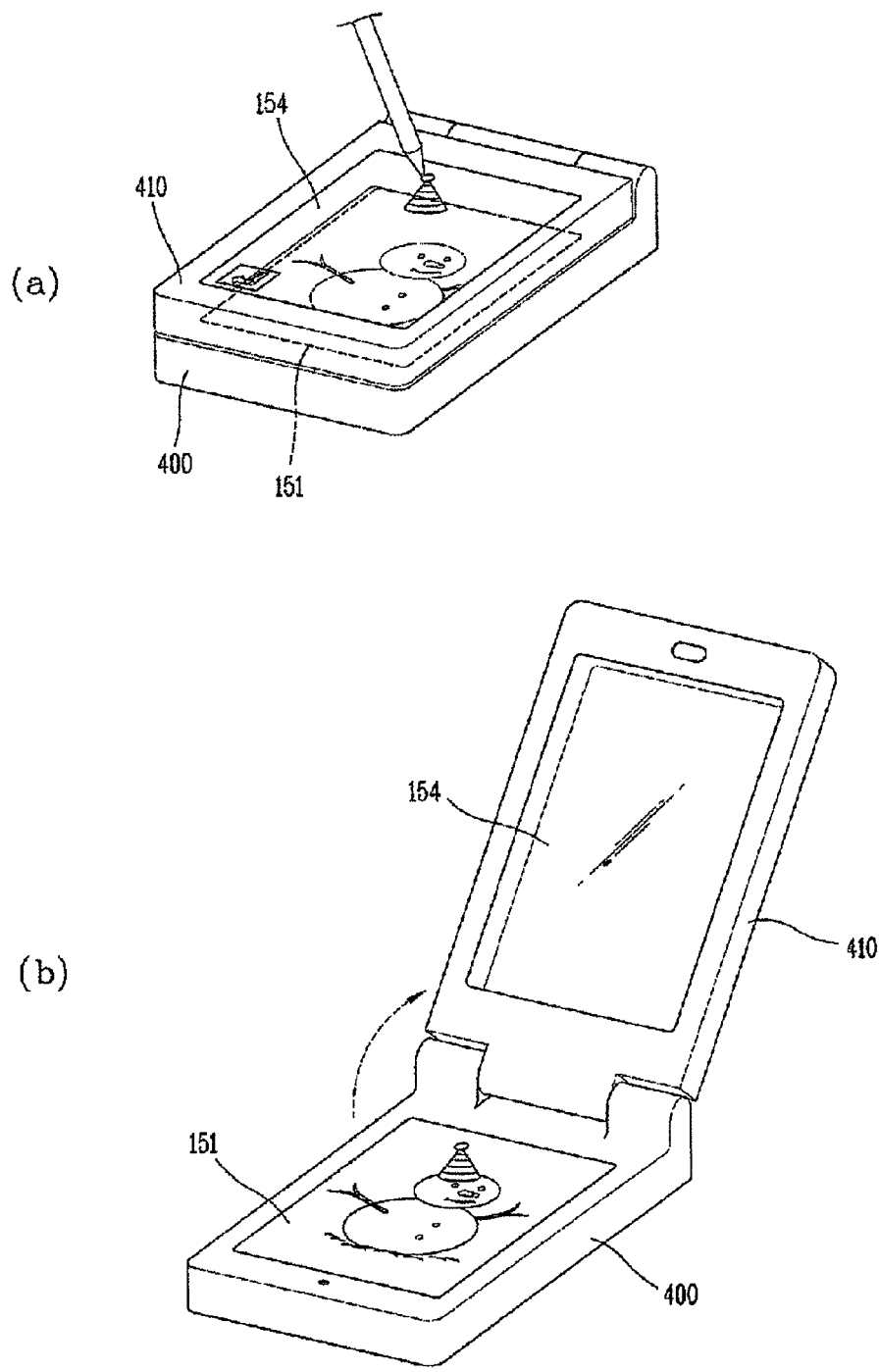
FIG. 56 is an overview showing an operation related to the movement of a displayed object executed in cooperation with an open/closing operation of a mobile terminal having a dual transparent display according to an embodiment of the present invention.

Next, FIG. 56 is an overview illustrating operations related to the movement of a displayed object executed in cooperation with the opening/closing of a mobile terminal having a dual transparent display according to an embodiment of the present invention, and more particularly, illustrating a function of automatically reflecting an image edited on the TOLED 154 onto an image displayed on the LCD 151.

As shown in FIG. 56(*a*), it is assumed that a folder-type mobile terminal is in a closed state and an image editor is being executed on the TOLED 154. Further, a user may refer to an image displayed on the LCD 151 which is transmitted through the TOLED 154, and draw or edit a specific image (e.g., cap or hat image) related to the image (e.g., snowman image) displayed on the LCD 151 through the image editor. Also, while the user draws or edits the image, such drawing operation may not directly affect the image displayed on the LCD 151.

During the drawing operation, if it is sensed the folding portion 410 is open, the controller 180 can apply the drawn image on the TOLED 154 onto the image displayed on the LCD 151. For example, the cap or hat image is displayed (attached) onto the head of the snowman image displayed on the LCD 151. When the folding portion 410 is closed, the controller 180 can move the image back to the TOLED 154 (i.e., release the image). As such, the user can repeat the application and release an image during the drawing operation by opening or closing the folding portion 410. The user can also determine if the drawn image is correctly disposed over the image on the LCD 151 and drawn as desired. The controller 180 may also keep the drawn image on the LCD 151 based on a preset condition, user input, tactile input, etc. That is, once the user is satisfied with the drawn image, the user can input a preset condition to instruct the controller 180 to maintain the drawn image on the LCD 151.

In addition to the above-mentioned functions, a mobile terminal according to embodiments of the present invention can output information associated with dually executed functions through a dual display (e.g., the TOLED 154 and the LCD 151). For example, the mobile terminal may output both navigation and a digital multimedia broadcast, perform both navigation and web browser functions, perform a dual electronic book (e-BOOK) function, display an original picture during picture edition, automatically display a list of devices for transmission, display a dual webpage, and the like.

Display Controlling Method for Saving Power

A mobile terminal according to an embodiment of the present invention may also control the TOLED 154 according to external environments, such as a peripheral illumination, peripheral color, time slot and the like. In more detail, the mobile terminal may adjust a background transparency of the TOLED 154 according to the peripheral illumination sensed by an illumination sensor. For example, when the peripheral illumination increases, the mobile terminal decreases the background transparency of the TOLED 154, whereas increasing the background transparency when the peripheral illumination decreases.

In addition, the mobile terminal my sense the peripheral color by a color sensor and an image sensor. Accordingly, if a color which is equal to the sensed peripheral color exists in an information object displayed on the TOLED 154, the mobile terminal may adjust a brightness and saturation of the corresponding color. The mobile terminal may also adjust the background transparency of the TOLED 154 according to time slots. For example, the mobile terminal may decrease the background transparency of the TOLED 154 in a daytime slot having a higher peripheral illumination, while increasing it in a nighttime slot having a lower peripheral illumination.

A method for controlling the transparent display to visibility of the mobile terminal according to an embodiment of the present invention will now be described.

The transparent display (TOLED) 154 is one example of a display device providing transparency and can be applied the window of a building or front glass of a vehicle. For example, if the TOLED 154 is applied to a front glass of a vehicle, the TOLED 154 may display navigation or warning signals. When the TOLED 154 is applied to a mobile terminal, the display can display various information. In addition, the TOLED 154 may be overlaid on a touch panel in a layered manner so as to be used as an input device as well as a display device.

In addition, the TOLED 154 may be configured to include light emitting elements that emit light by itself bidirectionally, and in one embodiment, only a light emitting element corresponding to a position where information is display may be turned on. Thus, light emitting elements corresponding to other remaining pixels than the pixels for displaying the information are in an OFF state, so the corresponding region of the TOLED 154 may become transparent. In this instance, the transparent region will be referred to as a background, while various information displayed on the TOLED 154 will be referred to information object. The information object includes information such as text, a photo, an image, video, etc., status information, icon, or the like.

The mobile terminal 100 according to an embodiment of the present invention detects a surrounding environment via the sensing unit 140 and changes at least one of a color tone, brightness and saturation with respect to one or more of the background and the information object of the TOLED 154. Further, the surrounding environment may include information such as an ambient illumination, an ambient color, time, and the like.

The sensing unit 140 includes an illumination sensor 142 for sensing an ambient illumination and a color sensor 143 for detecting ambient color information (color tone, saturation and brightness). The ambient color information (referred to as 'ambient color tone') may be detected via an image sensor. The image sensor is an element (electronic component) for detecting subject information and converting it into an electrical image signal. Also, the time information may be received from a base station via the mobile communication module 112, or via the location information module 115. In addition, the time information may be calculated by using a counter installed in the mobile terminal 100.

Figure 57:
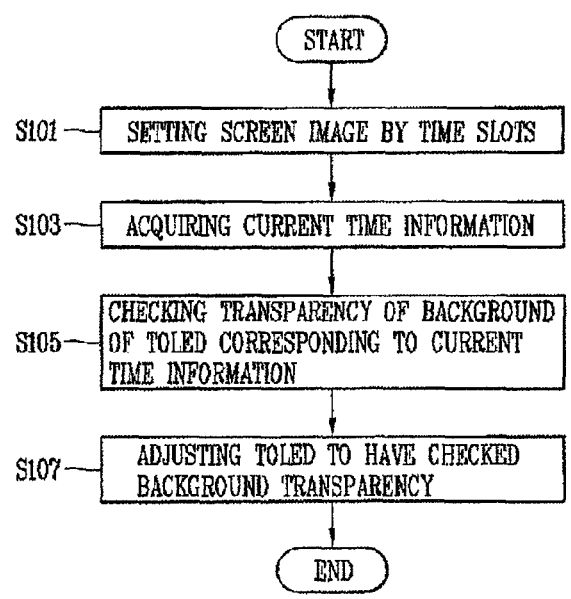
FIG. 57 is a flow chart illustrating a method for controlling a transparent display of a mobile terminal according to an embodiment of the present invention.

A method for controlling the transparent display according to a surrounding environment will now be described in detail. First, controlling the transparent display of the mobile terminal by time slots will be described with respect to the flow chart illustrated in FIG. 57.

As shown, the controller 180 sets a display control function of each time slot according to input data generated by the user input unit 130 (S101). The display control function includes, for example, adjusting the transparency of the background of the TOLED 154 based on a time slot. Further, the transparency of the background of the TOLED 154 based on a time slot may be set as a predetermined value or set arbitrarily by the user.

Then, when the screen setting of the TOLED 154 is completed, the controller 180 acquires current time information via the wireless communication unit 110 (S103). For example, the controller 180 may receive current time information from a satellite via the location information module 115 or from a base station via the mobile communication module 112. Also, in this embodiment, the time information is acquired via the wireless communication unit 110, but it may be also implemented such that the current time information may be calculated by using a counter installed in the mobile terminal 100.

The controller 180 then checks transparency of the background of the TOLED 154 corresponding to the acquired current time information based on a reference table stored in the memory 160 (S105). In addition, the reference table may include a transparency value of the background previously set by time slots. When the transparency of the background of the TOLED 154 corresponding to the current time information is checked, the controller 180 adjusts the transparency of the background of the TOLED 154 into the checked transparency (S107). The adjustment of the transparency may be performed by changing one or more of a color tone, saturation and brightness of the background. This embodiment described adjusting case the transparency of the background as an example. However, it is also possible to change one or more values of a color tone, saturation and brightness of the information object according to a detected surrounding environment.

Figure 58A:
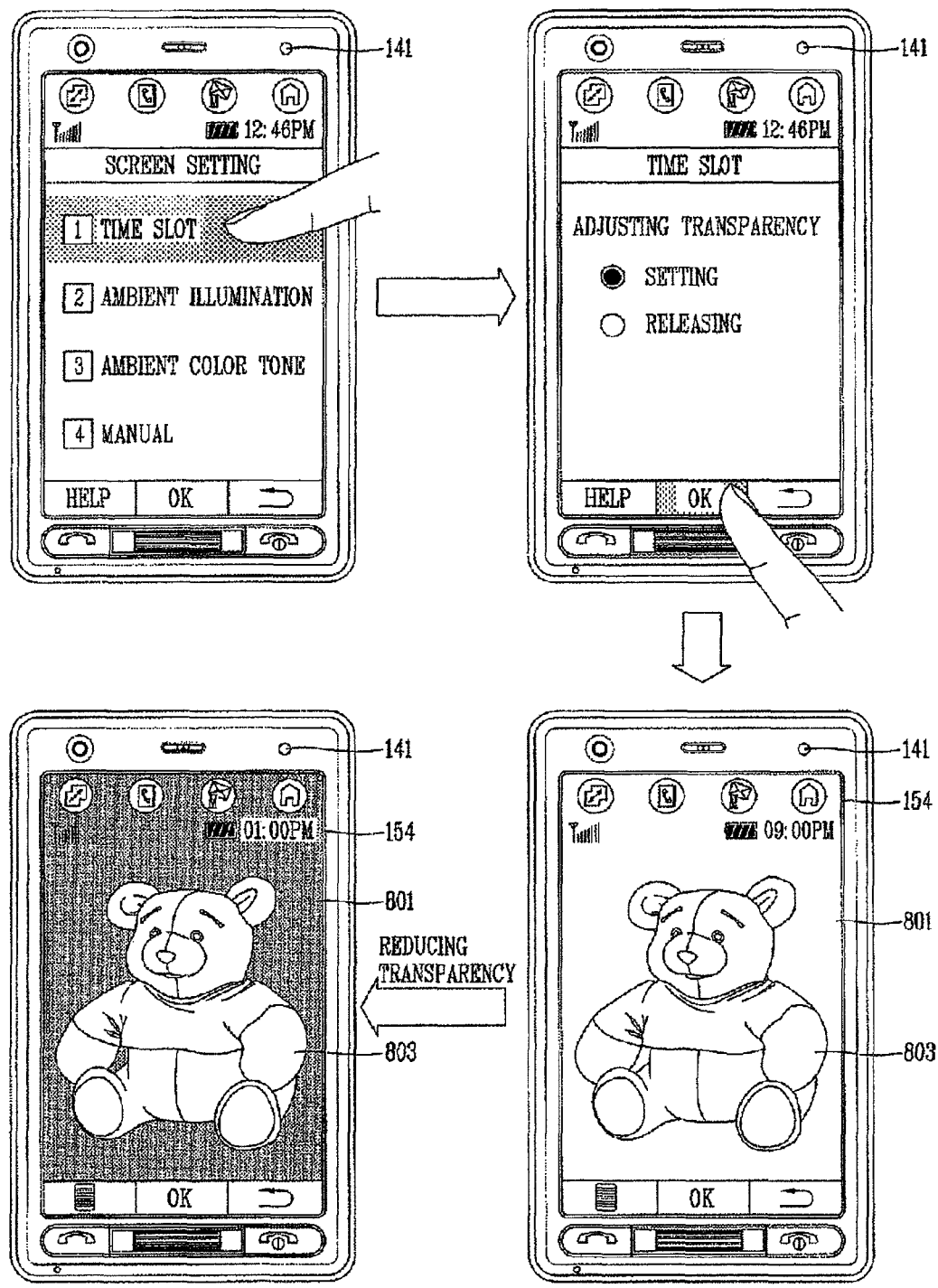
FIGS. 58A to 58D are overviews of display screens showing a process of setting transparency of a background image of the transparent display of the mobile terminal by time zone according to an embodiment of the present invention.

FIGS. 58A to 58D are overviews of display screens illustrating a process of setting a transparency of a background image of the transparent display of the mobile terminal by time zone according to an embodiment of the present invention. In more detail, FIG. 58A illustrates the process of setting display screens for adjusting the transparency of the background of the TOLED 154 based on the predetermined transparent information of each time slot. As shown in FIG. 58A, the user can select the time slot option and set or select the adjustment transparent feature and the controller 180 controls the TOLED 154 to discriminately display background information 801 from an information object 803 (picture of a bear). In FIG. 58A, the transparency of the background information 801 is reduced. (e.g., during a day time slot).

That is, the mobile terminal 100 adjusts the transparency of the background of the TOLED 154 by time slots based on the predetermined reference table. Further, the reference table includes a transparent value of the background according to each time slot. For example, when a current time changes from 9:00 p.m. (e.g., nighttime) to 1:00 p.m. (e.g., daytime), the mobile terminal 100 reduces the transparency of the background 801 based on the reference table.

Figure 58B:
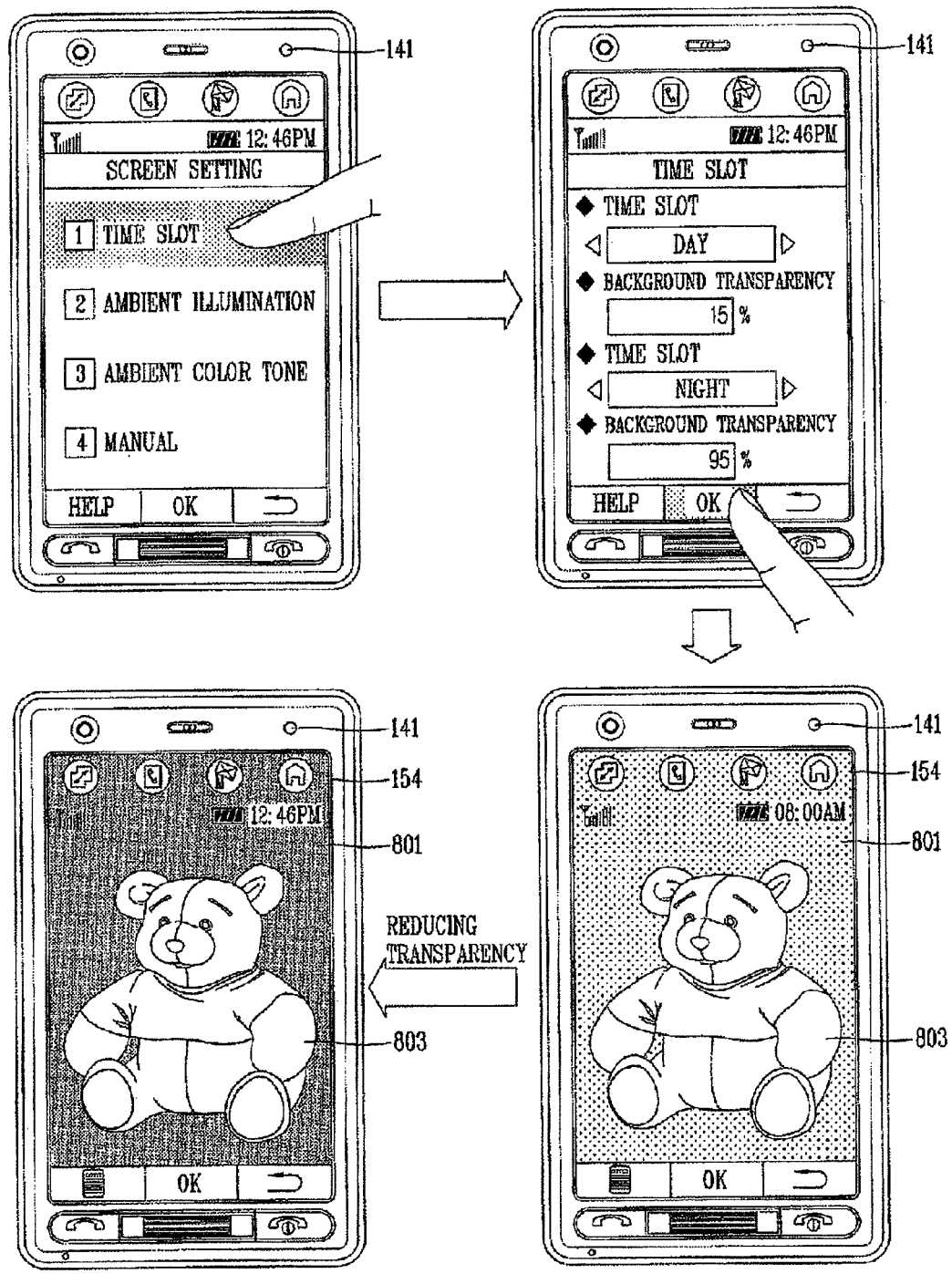

FIG. 58B shows a process of setting the transparency of the background of the TOLED by time slots according to another embodiment of the present invention. With reference to FIG. 58B, when the user selects a corresponding menu to set a screen display, the controller 180 displays sub-menu items of the selected menu on the TOLED 154. Then, when the user selects the 'time slot' item or option from the sub-menu items displayed on the TOLED 154, the controller displays a setting screen image corresponding to the selected menu item on the TOLED 154.

The user can then select a time slot and corresponding background transparency on the displayed setting screen and input the 'OK' option. The controller 180 then stores the set information in the memory 160. For example, when the user selects 'day' and 'night' as the time slots and the background transparencies as 15 percent and 95 percent, respectively, the controller 180 stores the selected time slots and the corresponding set transparency information of the background 801 in the memory 160.

Thereafter, when the mobile terminal 100 operates, the controller 180 detects a current time and checks a time slot to which the detected current time belongs. If the current time is the 'day' time slot, the transparency of the background of the TOLED 154 is adjusted into 15 percent, and if the current time is the 'night' time slot, the transparency of the background of the TOLED 154 is adjusted into 95 percent.

Figure 58C:
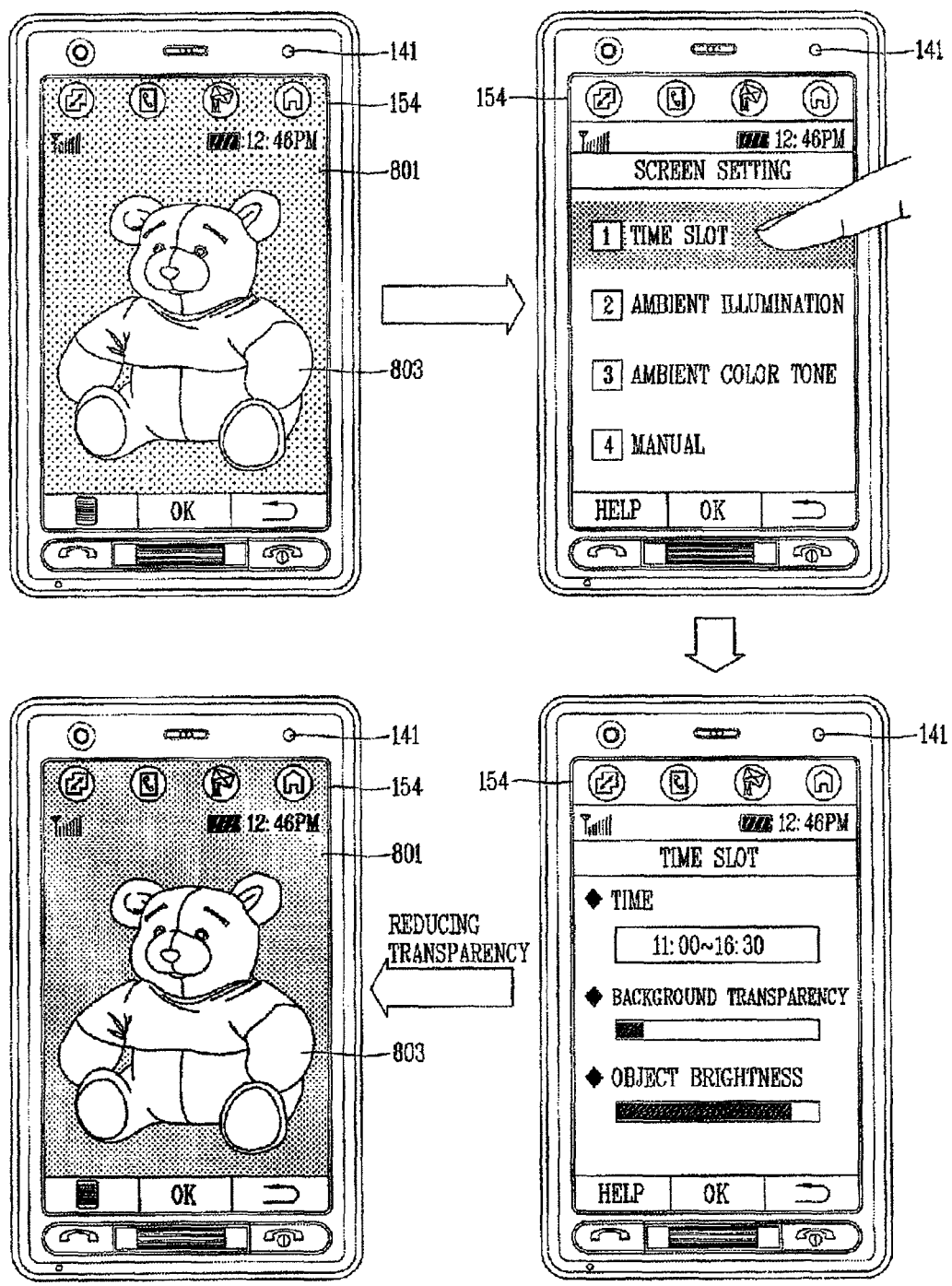

FIG. 58C shows a process of setting a time slot and corresponding transparency of the background of the transparent display according to yet another embodiment of the present invention. In a state that the TOLED 154 has a certain transparency, the controller 180 displays sub-menu items for setting a screen display on the TOLED 154 according to a menu manipulation by the user. When the 'time slot' item among the sub-menu items displayed on the TOLED 154 is selected, the controller 180 displays a setting screen image corresponding to the selected sub menu item on the TOLED 154.

When the user inputs a desired time slot and its corresponding background transparency on the setting screen image displayed on the TOLED 154 via the user input unit 130, the controller 180 sets a screen image based on the input data generated via the user input unit 130. When the screen setting is completed, the controller 180 checks a current time based on the set information (i.e., the time slot and the corresponding background transparency) and adjusts the background transparency of the TOLED 154 into the transparency corresponding to the checked time information.

For example, if the user inputs the time slot as 11:00~16:30 and sets a corresponding background transparency, the controller 180 checks whether the current time belongs to the set time slot. If the current time belongs the set time slot, the controller 180 changes the background transparency of the TOLED 154 into the set background transparency. In addition, as shown in FIG. 58C, the user can request that brightness of the object (e.g., picture of a bear) displayed on the TOLED 154, as well as the background transparency of the TOLED 154, adjusted.

Figure 58D:
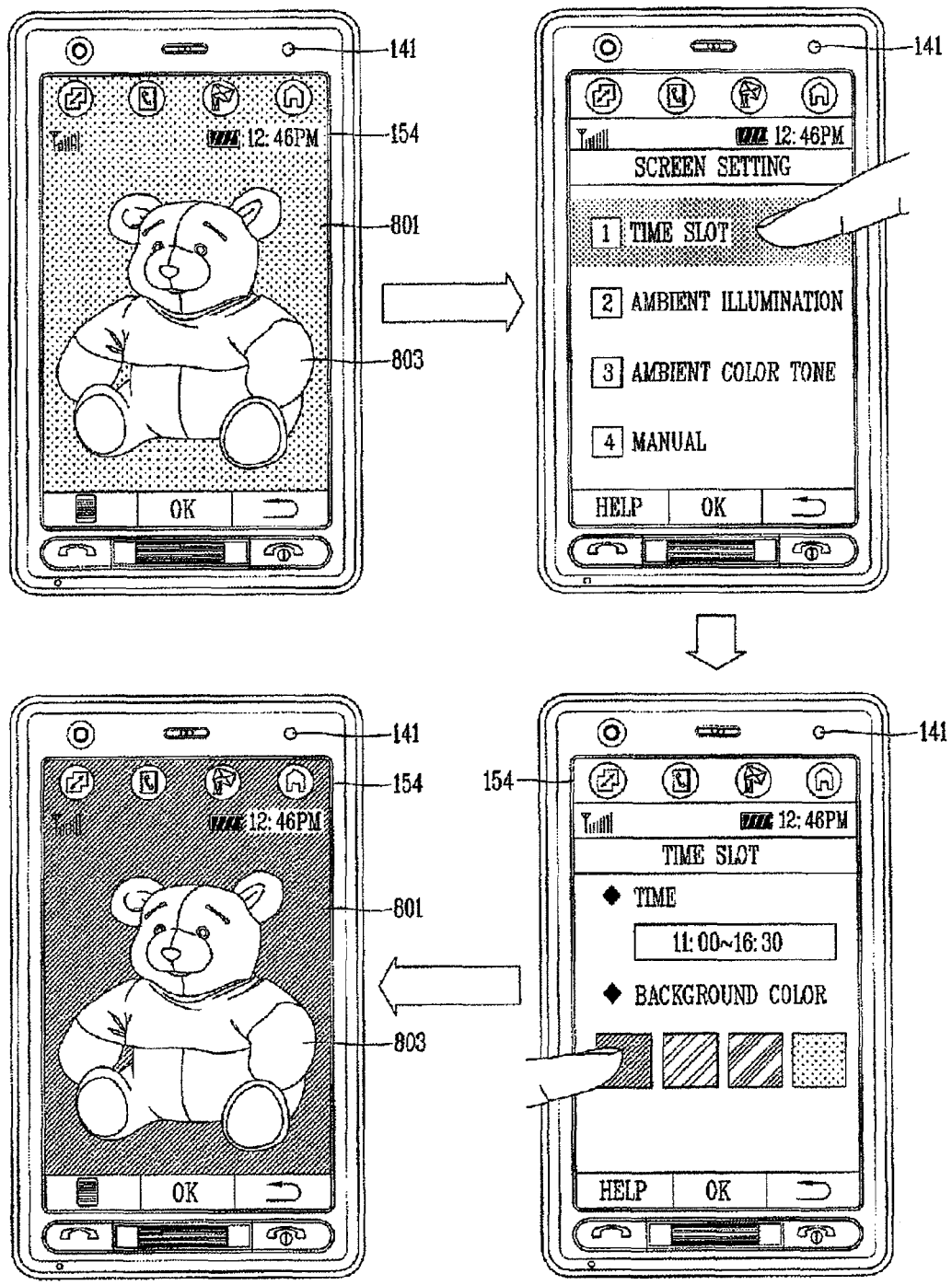

Next, FIG. 58D shows a process of setting a background color tone of the TOLED by time slots according to an embodiment of the present invention. In more detail, when the user wants to change a color tone of the background of the TOLED 154 during the day time slot because of the bright surroundings that make it difficult to identify the object displayed on the TOLED 154, the user can have the controller 180 display a setting screen image for setting a screen display on the TOLED 154 by manipulating the appropriate menu. The user then inputs a desired time slot on the setting screen image and selects a background color tone. Then, the controller 180 stores the input time slot and the selected color tone information in the memory 180.

Thereafter, the controller 180 checks whether a current time belong to the time slot which has been set by the user. If the current time belongs to the set time slot, the controller 180 changes the background color tone of the TOLED 154 into the set color tone. In this embodiment, the color tone of the background is changed as an example. However, the saturation and/or brightness of the background may be adjusted. Also, in this embodiment, a single time slot is set as an example, but at least two or more time slots may be discriminated and a color tone of the background may be set by the discriminated time slots.

Figure 59:
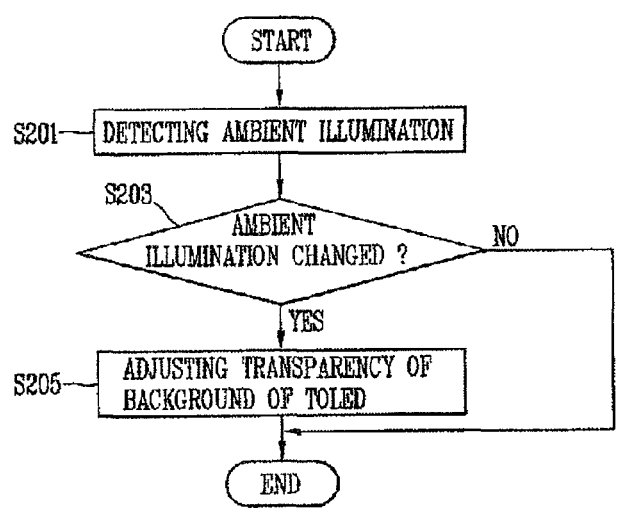
FIG. 59 is a flow chart illustrating a method for controlling a display of the mobile terminal according to an embodiment of the present invention.

FIG. 59 is a flow chart illustrating a method for controlling a display of the mobile terminal according to an embodiment of the present invention. In this embodiment, the transparency of the background of the TOLED 154 is adjusted according to a brightness of surroundings. In more detail, the controller 180 periodically detects an ambient brightness or illumination via the sensing unit 140 (S201). Further, the illumination sensor 142 may be configured to detect the amount of incident light.

Also, the controller 180 checks whether the ambient illumination detected via the sensing unit 140 is different from a previously detected ambient illumination (S203). In other words, the controller 180 checks whether there has been a change in the ambient illumination via the illumination sensor 142. If the detected ambient brightness is different from the previous ambient brightness (Yes in S203), the controller 180 checks the transparency of the background of the TOLED 154 corresponding to the detected ambient brightness based on an illumination table stored in the memory 160.

Subsequently, the controller 180 adjusts the transparency of the background of the TOLED 154 into the checked transparency of the background (S205). For example, if the user walks into a movie theater and operates the mobile terminal 100, the controller 180 detects the ambient illumination via the sensing unit 140. If the detected ambient illumination is reduced compared with the previously detected ambient illumination, the controller 180 increases the transparency of the background of the TOLED 154 to make the background of the TOLED transparent. Also, if the user walks out of the movie theatre and the ambient brightness is increased, the mobile terminal 100 lowers the transparency of the background of the TOLED 154 to make the background of the TOLED 154 opaque.

Figure 60A:
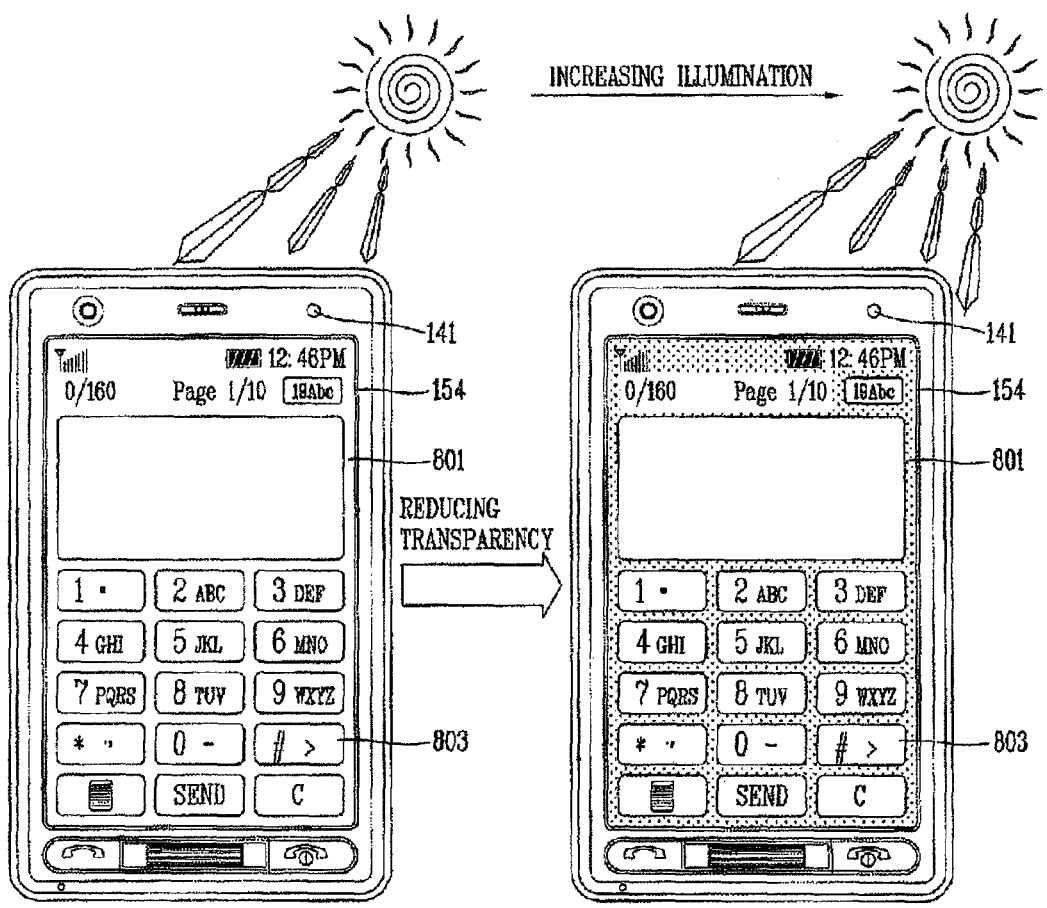
FIGS. 60A and 60B are overviews of display screens showing controlling of transparency of a background image of the transparent display according to illumination of the mobile terminal according to the embodiment of FIG. 59.
Figure 60B:
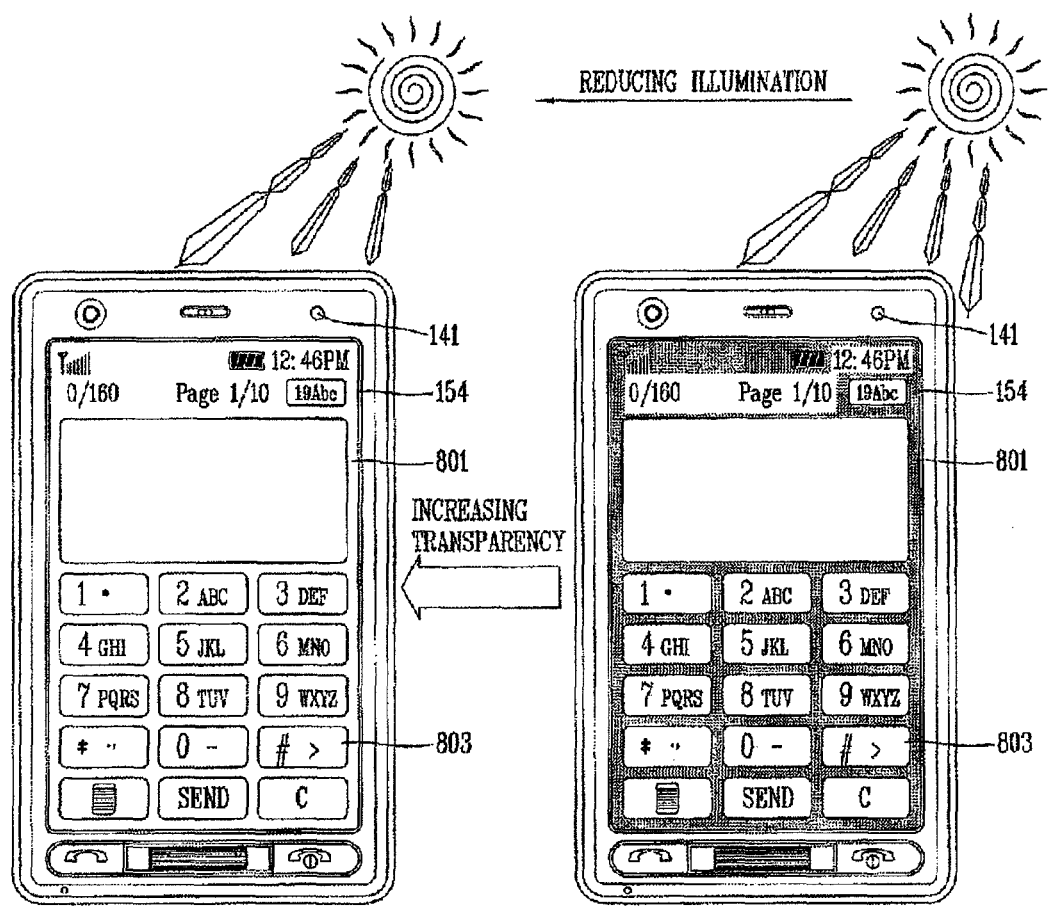

Next, FIGS. 60A and 60B are overviews of display screens for illustrating a controlling of transparency of a background image of the TOLED according to illumination according to the embodiment of FIG. 59. In more detail, when the user moves from a dark area such as the interior of the movie cinema to the outside, the mobile terminal 100 detects the increase in the ambient illumination via the sensing unit 140 and changes the background transparency of the TOLED 154 into a transparency corresponding to the detected ambient illumination. As shown in FIG. 60A, when the surroundings becomes gradually bright, the controller 180 gradually reduces transparency of the background of the TOLED 154 to make it opaque.

Meanwhile, as shown in FIG. 60B, as the surroundings gradually darkens, the controller 180 gradually increases the transparency of the background of the TOLED 154 to make it transparent. In addition, in this embodiment, only the transparency of the background of the TOLED 154 is adjusted as an example. However, it is also possible to adjust the brightness of the backlight of the LCD 151 as well as the transparency of the background of the TOLED 154 according to an ambient brightness if a dual display including the TOLED 154 and the LCD 151 is provided.

Figure 61:
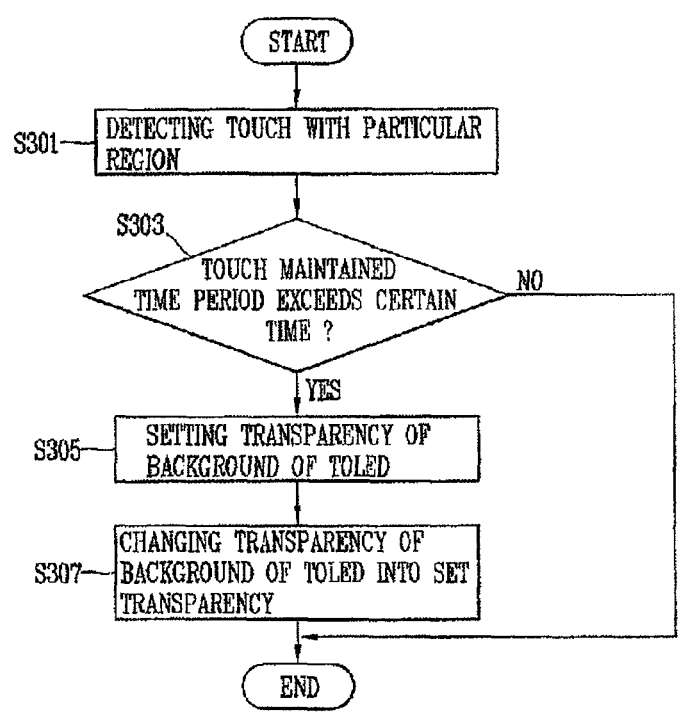
FIG. 61 is a flow chart illustrating a display control method of the mobile terminal according to an embodiment of the present invention.

Next, FIG. 61 is a flow chart illustrating a display control method of the mobile terminal according to an embodiment of the present invention. In this embodiment, when a long touch in a particular region of the TOLED is detected, the controller 180 displays a menu for adjusting transparency of the background so the user can adjust the transparency of the background of the TOLED. That is, when the user touches a particular region of the TOLED 154 to change the transparency of the background of the TOLED 154 while the mobile terminal 100 is in use, the sensing unit 140 detects the touch input and transmits a sense signal to the controller 180 (S301).

Upon receiving the sense signal, the controller 180 checks whether the touch input is maintained for a certain time period (S303). If the touch input exceeds the certain time period (Yes in S303), the controller 180 displays a control menu for changing the transparency of the background of the TOLED 154. The control menu may be provided in the form of pop-up, an icon, a bar, etc. In addition, the control menu can be executed by an external input such as a key input and a touch input. The controller 180 then changes the transparency of the background of the TOLED 154 to a pre-set transparency according to manipulation of the control menu displayed on the TOLED 154 (S305, and S307).

Figure 62:
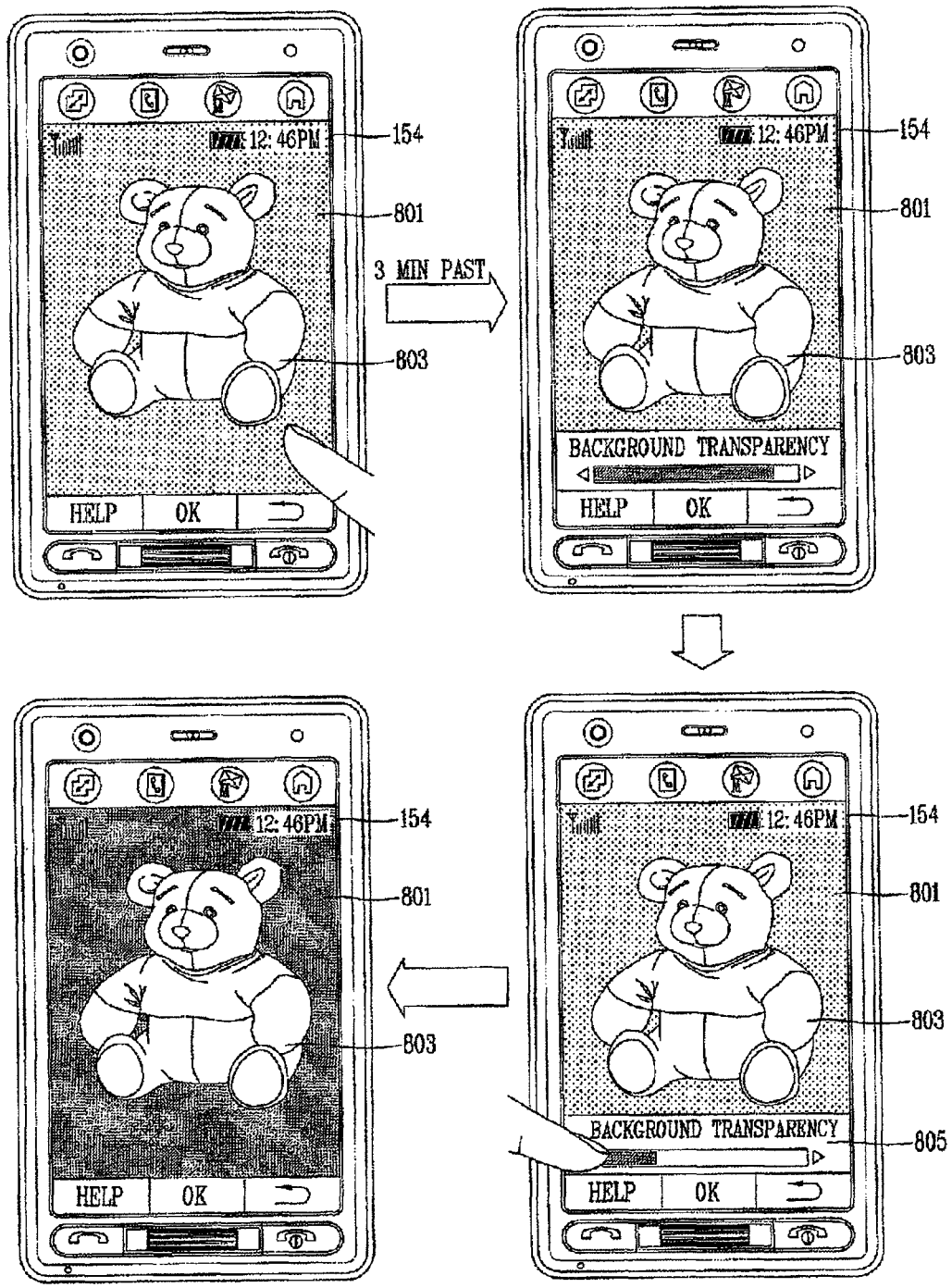
FIG. 62 is an overview of display screens for setting transparency of the background image of the transparent display of the mobile terminal according to the embodiment of FIG. 61.

FIG. 62 is an overview of display screens for setting the transparency of the background image of the transparent display according to the embodiment of FIG. 61. With reference to FIG. 62, when the user touches a particular region of the TOLED 154 to change the transparency of the background of the TOLED 154, the controller 180 checks whether the touch input is maintained for a certain time period (e.g., three seconds). When the touch input is maintained for three seconds, for example, the controller 180 displays a control menu for changing the transparency of the background of the TOLED on the TOLED 154. The controller 180 then reduces the transparency of the background of the TOLED 154 based on the manipulation of the control menu displayed on the TOLED 154.

In addition, in FIG. 6, the control menu includes a background transparency slide button the user can slide back and forth to change the background transparency. In addition, the user can view different transparencies by sliding the slide button back and forth and then select a desired background transparency by selecting an 'OK' button. The controller 180 then sets the transparency of the background of the TOLED 154 into the changed background transparency.

Figure 63:
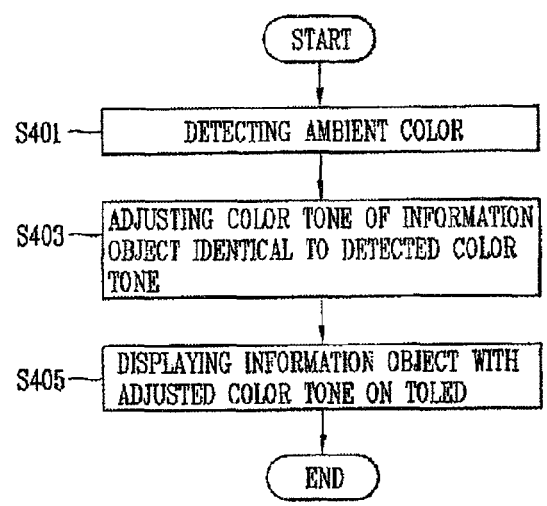
FIG. 63 is a flow chart illustrating a display control method of the mobile terminal according to an embodiment of the present invention.

Next, FIG. 63 is a flow chart illustrating a display control method of the mobile terminal according to an embodiment of the present invention. In this embodiment, a color tone (e.g., color, brightness, saturation) of an object displayed on the TOLED is adjusted using ambient color tone information. In more detail, the mobile terminal 100 detects an ambient color tone via the camera 121 (S401). Alternatively, the controller 180 may be implemented to detect ambient color information (brightness, color tone, saturation) via the color sensor 143 instead of the camera 121.

Further, the controller 180 compares the color tone information of the information object displayed on the TOLED 154 and the detected ambient color tone information. If the ambient color tone information and the object color tone information are the same, the controller 180 reduces the saturation of the color tone of the object and displays the object with the reduced (S403, S405). For example, if the ambient color tone is equal to a value of #FF5675 and the color tone used for the object displayed on the TOLED 154 is equal to a value of #FF5675, the controller 180 reduces the saturation of the color tone used for the object.

Figure 64:
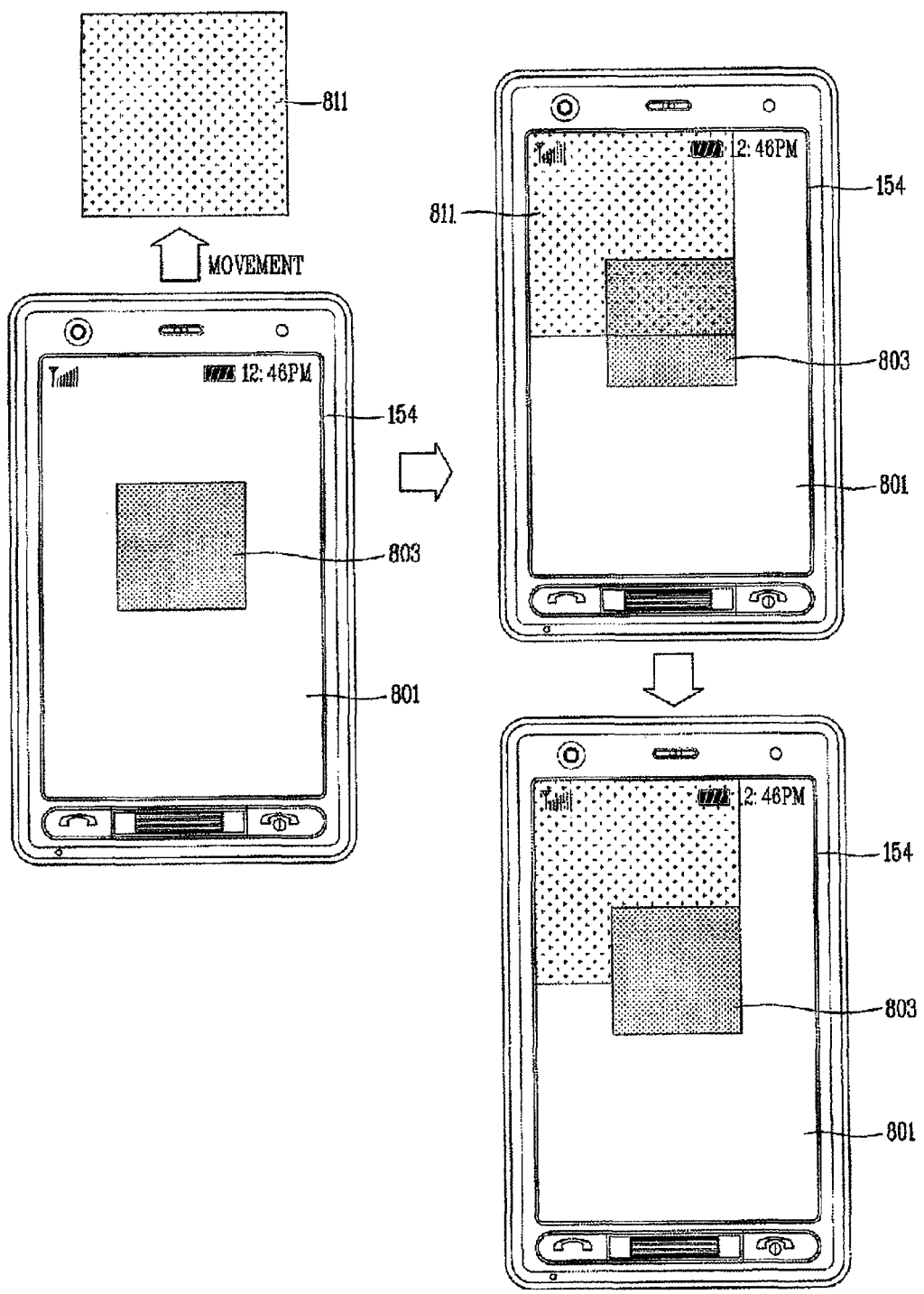
FIG. 64 is an overview showing an example of performing the embodiment of FIG. 63.

FIG. 64 is an overview of display screens illustrating an example of performing the embodiment of FIG. 63. As shown, the controller 180 may adjust the saturation of the information object 803 displayed on the TOLED 154 according to ambient color information. When the mobile terminal 100 is manipulated, the controller 180 may capture (scan) an image of a subject via the camera 121, and check the ambient color information via the captured image information. If the captured image has a color tone equal to a value of #FF0000 and there is an object with a color tone (color tone of the same group) similar to the color tone information detected from the captured image of the object displayed on the TOLED 154, the controller 180 adjusts the saturation of the corresponding object and outputs the same.

As shown in FIG. 64, if the information object 803 displayed on the TOLED 154 overlaps with the subject 811, the controller 180 detects the color tone information of the subject 811 via the sensing unit 140. If the detected color information is a color tone of the same group as that of the information object displayed on the TOLED 154, the controller 180 detects the region of the information object 803 overlapping with the subject 811 and changes the saturation of the detected corresponding region. In this embodiment, the color tone of the information object is changed according to the ambient color information, but without being limited thereto, a color tone of the background can also be adjusted.

Next, FIG. 65 is an overview of display screens illustrating a process of opening/closing a folder of a mobile terminal according to an embodiment of the present invention. As discussed previously, the mobile terminal 100 includes a folder part having the TOLED 154 and a main body part 400 having a keypad. Also, when the folder part is closed when particular information is being displayed on the TOLED 154, the controller 180 may not drive a backlight of the keypad to prevent the keypad from being transparently seen as a background. In addition, when the backlight is not driven, in order to prevent the keypad from being transparently seen as a background, the keypad or the touch pad may be configured to be flat and have a dark color.

Further, the keypad provided on the main body part may include a TOLED, an LCD, a touch pad, a touch screen, or the like. The main body part also controls an ON/OFF operation of the backlight of the keypad according to whether or not the folder part is opened or closed. When the folder part is completely open, the controller 180 turns on the backlight of the keypad to output the shape of the keypad on the main body part. Thereafter, when the folder part is closed by more than one-third, the controller 180 turns off the backlight. In addition, the main body part does not output the keypad shape and has a particular color such as black, blue, yellow, etc.

Also, when the folder part of the mobile terminal is closed by more than two-thirds, the controller 180 reverses the information object displayed in a reversed form on the TOLED 154 to allow the information object to be displayed in a normal state. When the folder part of the mobile terminal 100 is completely closed, the controller 180 uses the keypad of the main body part as a background, and changes the transparency of the background of the TOLED 154 into a maximum value. In addition, as shown in FIG. 65, if the folder is closed from an open state in which a message has been created, the controller 180 may display a message edited content and a keypad icon on the TOLED 154.

Namely, when the folder part is closed while a particular function is being executed, an executed screen image with various menus, icons, or the like, related to the execution of the particular function re-aligned may be displayed on the TOLED 154. Thereafter, if there is no input until after a certain time lapses, the power supply to the TOLED 154 may be cut off or the creation of the message may be interrupted.

Figure 66:
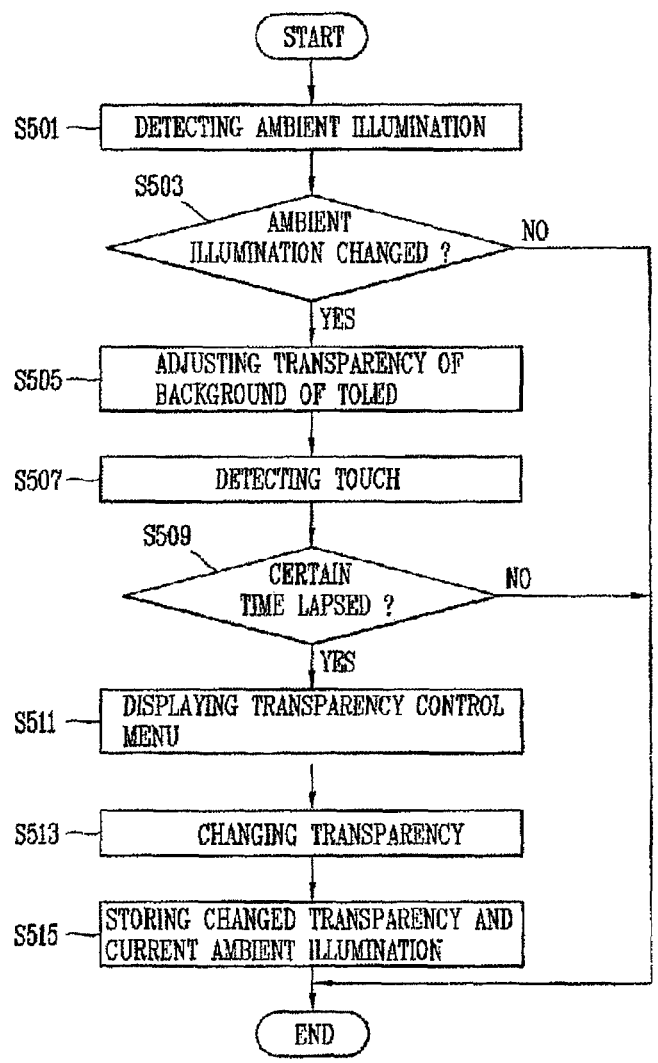
FIG. 66 is a flow chart illustrating a display control method of a mobile terminal according to an embodiment of the present invention.

FIG. 66 is a flow chart illustrating a display control method of a mobile terminal according to an embodiment of the present invention. First, the sensing unit 140 detects an ambient brightness or illumination under the control of the controller 180 (S501). Namely, the sensing unit 140 detects the brightness of a surrounding environment by measuring the amount of light applied per unit area. When the illumination of the surrounding environment is detected, the controller 180 checks the transparency of the background corresponding to the detected illumination based on an illumination table stored in the memory 160 (S503).

After checking the transparency of the background, the controller 180 adjusts the transparency of the background of the TOLED 154 into the checked background transparency (S505). When the transparency of the background of the TOLED 154 is adjusted, if the user wants to adjust the transparency of the background of the TOLED 154, the user may touch a particular region of the TOLED 154, and the sensing unit 140 detects the touch (S507).

After the touch is detected, if the touch state is maintained for longer than a certain time, the controller 180 displays a control menu for adjusting the transparency of the background on the TOLED 154 (S509 and S511). The control menu may be implemented in the form of a menu or an icon. Upon receiving a signal generated according to the manipulation of the control menu displayed on the TOLED 154, the controller 180 adjusts the transparency of the background of the TOLED 154 according to the received signal (S513).

Further, when the transparency of the background is completely adjusted, the controller 180 stores the adjusted transparency of the background of the TOLED 154 together with the current ambient illumination in the memory 160 (S515). When the detected ambient illumination is identical to the stored ambient illumination, the controller 180 controls the TOLED 154 with the transparency of the background of the TOLED 154.

Figure 67:
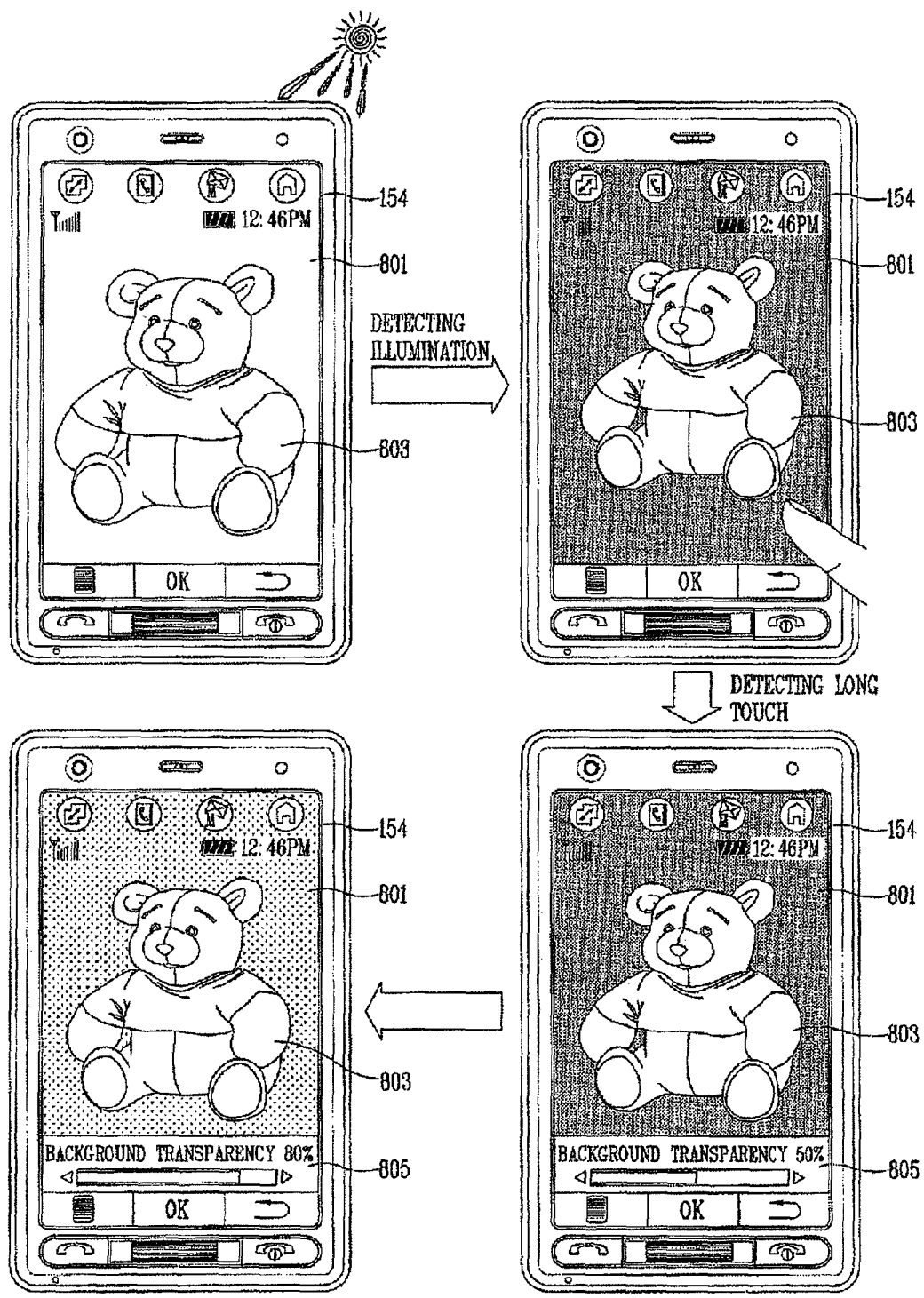
FIG. 67 is a view showing an example of the embodiment of FIG. 66.

Next, FIG. 67 is an overview of display screens illustrating an example of the embodiment of FIG. 66. As shown in FIG. 67, when the user touches a particular region of the TOLED 154 in a state that the transparent of the background of the TOLED 154 has been adjusted to the pre-set transparency according to the ambient illumination, the controller 180 displays a control menu for controlling the transparency of the background of the TOLED 154 on the TOLED 154.

When the transparency of the background of the TOLED 154 is changed through the control menu, the controller 180 controls the TOLED 154 with the changed background transparency. Thereafter, when a detected ambient illumination is the same as the ambient illumination, the controller 180 does not adjust the transparency of the background of the TOLED 154 based on the illumination table, but adjusts the TOLED 154 with the changed background transparency.

In the embodiments of the present invention, the above-described method can be implemented as codes that can be read by a computer in a program-recorded medium. The computer-readable medium includes various types of recording devices in which data read by a computer system is stored. The computer-readable medium may include a ROM, a RAM, a CD-ROM, a magnetic tape, a floppy disk, an optical data storage device, and the like. The computer-readable medium also includes implementations in the form of carrier waves or signals (e.g., transmission via the Internet). The computer may include the controller 180 of the terminal.

The configurations and methods according to the above-described embodiments of the mobile terminal are not limitedly applied but the entirety of portions of the respective embodiments may be selectively combined to configurations to form various modifications.

The mobile terminal according to embodiments of the present invention improves visibility by controlling the transparency of the background of the transparent display according to the surrounding environment conditions such as an ambient illumination, a color tone, a time slot, or the like. In addition, because the brightness of an object displayed on the transparent display is controlled according to the surrounding environment conditions, the visibility can be improved.

Also, because the transparent display is controlled according to the surrounding environment conditions, the power consumption can be reduced and thus power saving effect can be obtained. Moreover, because the color tone of an object displayed on the transparent display is adjusted according to an ambient color tone, the same effect as the color tone of the object being corrected can be obtained.

As the exemplary embodiments may be implemented in several forms without departing from the characteristics thereof, it should also be understood that the above-described embodiments are not limited by any of the details of the foregoing description, unless otherwise specified, but rather should be construed broadly within its scope as defined in the appended claims. Therefore, various changes and modifications that fall within the scope of the claims, or equivalents of such scope are therefore intended to be embraced by the appended claims.

What is claimed is:

1. A mobile terminal comprising:
    a camera;
    a transparent display configured to display an information object which has a first color tone, wherein a surrounding environment of the transparent display is seen via the transparent display;
    a sensing unit configured to detect a color tone of a subject; and
    a controller configured to:
    display the information object on the transparent display while the subject is seen via the transparent display;
    capture an image of the subject via the camera;
    detect whether or not the information object on the transparent display overlaps with the image of the subject via the transparent display;
    detect, via the sensing unit, a color tone of the image of the subject being captured by the camera when the information object on the transparent display overlaps with the image of the subject via the transparent display;
    compare the first color tone of the information object displayed on the transparent display with the color tone of the image of the subject being captured;
    when the color tone of the image of the subject is in a same color group as the first color tone of the information object, identify an overlapping region of the information object overlapping with the image of the subject; and
    change a color tone of the overlapping region of the information object into a second color tone from the first color tone such that the information object is distinguished from the image of the subject seen via the transparent display while the image of the subject is seen via the transparent display,
    wherein a region displaying the information object other than the overlapping region maintains the first color tone, and
    wherein a shape of the information object is maintained although the color tone of the overlapping region of the information object is changed into the second color tone from the first color tone.

2. The mobile terminal of claim 1, wherein the controller is further configured to detect an ambient illumination.

3. The mobile terminal of claim 2, wherein when the ambient illumination is increased, the controller is further configured to reduce a transparency of a background of the transparent display, and when the ambient illumination is decreased, the controller is further configured to increase the transparency of the background of the transparent display.

4. The mobile terminal of claim 3, further comprising a memory configured to store particular transparency levels corresponding to particular time slots,
    wherein the controller is further configured to change the transparency of the background of the transparent display into a corresponding transparency level among the particular transparency levels stored in the memory according to each of the particular time slots.

5. The mobile terminal of claim 3, further comprising a memory configured to store particular background colors corresponding to particular time slots,
    wherein the controller is further configured to change a background color of the background of the transparent display into a corresponding background color among the particular background colors stored in the memory according to each of the particular time slots.

6. The mobile terminal of claim 1, wherein the controller is further configured to:
    detect a touch input on a particular region of the transparent display; and
    display a control menu for changing a transparency of a background of the transparent display or the color tone of the information object displayed on the transparent display if the touch input is maintained for longer than a predetermined amount of time.

7. The mobile terminal of claim 6, wherein the control menu comprises a slide bar displayed on the transparent display that can be slid back and forth to change the transparency of the background as desired.

8. The mobile terminal of claim 6, wherein the controller is further configured to store the transparency of the background set according to the control menu as a background transparency to be used for the surrounding environment.

9. The mobile terminal of claim 1, wherein the controller is further configured to change a transparency of a background on the transparent display by changing one or more values of a color tone, a saturation and a brightness of the background according to the surrounding environment.

10. A method of controlling a mobile terminal with a transparent display, the method comprising:
    displaying an information object which has a first color tone on a transparent display;
    displaying the information object on the transparent display while a subject is seen via the transparent display;
    capturing an image of the subject via the camera;
    detecting that the information object on the transparent display overlaps with the image of the subject via the transparent display;
    detecting, via the sensing unit, a color tone of the image of the subject being captured by the camera of the mobile terminal when the information object on the transparent display overlaps with the image of the subject via the transparent display;
    comparing the first color tone of the information object displayed on the transparent display with the color tone of the image of the subject being captured; and
    when the color tone of the image of the subject is in a same color group as the first color tone of the information object, identifying an overlapping region of the information object overlapping with the image of the subject; and
    changing a color tone of the overlapping region of the information object into a second color tone from the first color tone such that the information object is distinguished from the image of the subject on the transparent display, wherein a region displaying the information object other than the overlapping region maintains the first color tone, and wherein a shape of the information object is maintained although the color of the information object is changed into the second color tone from the first color tone.

11. The method of claim 10, wherein the detecting step further comprises detecting an ambient illumination.

12. The method of claim 11, wherein when the ambient illumination is increased, the changing step reduces a transparency of the background of the transparent display, and when the ambient illumination is decreased, the changing step increases the transparency of the background of the transparent display.

13. The method of claim 12, further comprising storing particular transparency levels corresponding to particular time slots in a memory of the mobile terminal,
  wherein the changing step further comprises changing the transparency of the background of the transparent display into a corresponding transparency level among the particular transparency levels stored in the memory according to each of the particular time slots.

14. The method of claim 12, further comprising storing particular background colors corresponding to particular time slots in a memory of the mobile terminal,
  wherein the changing step further comprises changing a background color of the background of the transparent display into a corresponding background color among the particular background colors stored in the memory according to each of the particular time slots.

15. The method of claim 10, further comprising:
  detecting a touch input on a particular region of the transparent display; and
  displaying a control menu for changing a transparency of a background of the transparent display or the color tone of the information object displayed on the transparent display if the touch input is maintained for longer than a predetermined amount of time.

16. The method of claim 15, wherein the control menu comprises a slide bar displayed on the transparent display that can be slid back and forth to change the transparency of the background as desired.

17. The method of claim 15, further comprising:
  storing the transparency of the background set according to the control menu as a background transparency to be used for a surrounding environment of the transparent display.

18. The method of claim 10, wherein the changing step further comprises changing a transparency of a background on the transparent display by changing one or more values of a color tone, a saturation and a brightness of the background according to a surrounding environment of the transparent display.

* * * * *